United States Patent
Zhang et al.

(10) Patent No.: US 12,244,794 B2
(45) Date of Patent: *Mar. 4, 2025

(54) ADAPTIVE LOOP FILTERING FOR CHROMA COMPONENTS

(71) Applicants: Beijing Bytedance Network Technology Co., Ltd., Beijing (CN); Bytedance Inc., Los Angeles, CA (US)

(72) Inventors: Li Zhang, San Diego, CA (US); Na Zhang, Beijing (CN); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,975

(22) Filed: Jul. 21, 2022

(65) Prior Publication Data

US 2022/0377325 A1 Nov. 24, 2022

Related U.S. Application Data

(63) Continuation of application No. 17/494,956, filed on Oct. 6, 2021, now Pat. No. 11,477,449, which is a
(Continued)

(30) Foreign Application Priority Data

May 30, 2019 (WO) ................ PCT/CN2019/089218

(51) Int. Cl.
*H04N 19/117* (2014.01)
*H04N 19/186* (2014.01)
*H04N 19/70* (2014.01)

(52) U.S. Cl.
CPC ......... *H04N 19/117* (2014.11); *H04N 19/186* (2014.11); *H04N 19/70* (2014.11)

(58) Field of Classification Search
CPC ..... H04N 19/117; H04N 19/186; H04N 19/70
(Continued)

(56) References Cited

U.S. PATENT DOCUMENTS 8,929,462 B2 1/2015 Wang et al.
9,591,331 B2 3/2017 Chong et al.
(Continued)

FOREIGN PATENT DOCUMENTS

AU 2020232135 A1 8/2021
CN 103518374 A 1/2014
(Continued)

OTHER PUBLICATIONS

Document: JVET-N1001-v10, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 407 pages.
(Continued)

*Primary Examiner* — Amir Shahnami
(74) *Attorney, Agent, or Firm* — Conley Rose, P.C.

(57) ABSTRACT

Devices, systems and methods related to management of syntax flags with respect chroma formats in video processing are described. In one representative aspect, a video decoding method includes determining, for a conversion between a video and a coded representation of the video, whether a syntax element associated with an adaptive loop filtering (ALF) operation for a chroma component of the video is included in the coded representation based on a condition. The method also includes performing the conversion according to the determining.

20 Claims, 46 Drawing Sheets

Related U.S. Application Data continuation of application No. PCT/CN2020/093675, filed on Jun. 1, 2020.

(58) Field of Classification Search
USPC .................................................. 375/240.02
See application file for complete search history.

(56) References Cited

U.S. PATENT DOCUMENTS

| | | | |
|---|---|---|---|
| 9,813,719 B2 | 11/2017 | Wang | |
| 10,057,574 B2 | 8/2018 | Li et al. | |
| 10,271,052 B2 | 4/2019 | Zhang et al. | |
| 10,277,909 B2 | 4/2019 | Ye et al. | |
| 10,404,988 B2 | 9/2019 | Ye et al. | |
| 10,506,230 B2 | 12/2019 | Zhang et al. | |
| 10,582,213 B2 | 3/2020 | Li et al. | |
| 10,694,202 B2 | 6/2020 | Zhang et al. | |
| 10,694,204 B2 | 6/2020 | Chen et al. | |
| 10,721,469 B2 | 7/2020 | Zhang et al. | |
| 10,764,576 B2 | 9/2020 | Li et al. | |
| 10,778,974 B2 | 9/2020 | Karczewicz et al. | |
| 10,855,985 B2 | 12/2020 | Zhang et al. | |
| 10,904,530 B2 | 1/2021 | Tourapis et al. | |
| 10,944,976 B2 | 3/2021 | Zhao et al. | |
| 11,232,020 B2 | 1/2022 | Hicks | |
| 12,022,130 B2 | 6/2024 | Zhang | |
| 2007/0058713 A1 | 3/2007 | Shen et al. | |
| 2009/0116558 A1 | 5/2009 | Chen et al. | |
| 2013/0101018 A1* | 4/2013 | Chong | H04N 19/82 375/E7.026 |
| 2013/0107973 A1 | 5/2013 | Wang et al. | |
| 2013/0223542 A1 | 8/2013 | Kim et al. | |
| 2013/0266074 A1 | 10/2013 | Guo et al. | |
| 2014/0072033 A1 | 3/2014 | Chuang et al. | |
| 2014/0072215 A1 | 3/2014 | Terada et al. | |
| 2015/0003518 A1 | 1/2015 | Nguyen | |
| 2015/0043637 A1 | 2/2015 | Morigami et al. | |
| 2015/0049821 A1 | 2/2015 | Chen et al. | |
| 2015/0092862 A1 | 4/2015 | Yu et al. | |
| 2015/0195523 A1 | 7/2015 | Sato | |
| 2015/0373327 A1 | 12/2015 | Zhang et al. | |
| 2015/0373343 A1 | 12/2015 | Hendry et al. | |
| 2016/0057434 A1 | 2/2016 | Lai et al. | |
| 2016/0100167 A1 | 4/2016 | Rapaka et al. | |
| 2016/0234492 A1 | 8/2016 | Li et al. | |
| 2016/0241881 A1 | 8/2016 | Chao et al. | |
| 2016/0373745 A1 | 12/2016 | Joshi et al. | |
| 2017/0214923 A1 | 7/2017 | He et al. | |
| 2017/0238020 A1 | 8/2017 | Karczewicz et al. | |
| 2017/0272759 A1 | 9/2017 | Seregin | |
| 2017/0318301 A1 | 11/2017 | Li et al. | |
| 2017/0374384 A1 | 12/2017 | Xiu et al. | |
| 2018/0041778 A1 | 2/2018 | Zhang et al. | |
| 2018/0041779 A1 | 2/2018 | Zhang et al. | |
| 2018/0167637 A1 | 6/2018 | Yin et al. | |
| 2019/0124366 A1 | 4/2019 | Zhao et al. | |
| 2019/0238845 A1 | 8/2019 | Zhang et al. | |
| 2019/0260996 A1 | 8/2019 | Zhang et al. | |
| 2019/0306502 A1 | 10/2019 | Gadde et al. | |
| 2020/0177910 A1 | 6/2020 | Li et al. | |
| 2020/0267381 A1 | 8/2020 | Vanam et al. | |
| 2020/0322602 A1 | 10/2020 | Huang et al. | |
| 2020/0322632 A1 | 10/2020 | Hanhart et al. | |
| 2020/0344473 A1* | 10/2020 | Seregin | H04N 19/70 |
| 2020/0359016 A1 | 11/2020 | Li et al. | |
| 2020/0359017 A1 | 11/2020 | Li et al. | |
| 2020/0359018 A1 | 11/2020 | Li et al. | |
| 2020/0413038 A1 | 12/2020 | Zhang et al. | |
| 2021/0099732 A1 | 4/2021 | Ray et al. | |
| 2021/0168406 A1 | 6/2021 | Li et al. | |
| 2021/0211700 A1 | 7/2021 | Li et al. | |
| 2021/0243475 A1 | 8/2021 | Tsukuba | |
| 2021/0266550 A1 | 8/2021 | Li et al. | |
| 2021/0385498 A1 | 12/2021 | Zhang et al. | |
| 2021/0385500 A1 | 12/2021 | Zhang et al. | |
| 2022/0007028 A1 | 1/2022 | Li et al. | |
| 2022/0060684 A1 | 2/2022 | Luo et al. | |

FOREIGN PATENT DOCUMENTS

| | | |
|---|---|---|
| CN | 103535035 A | 1/2014 |
| CN | 103891293 A | 6/2014 |
| CN | 104247424 A | 12/2014 |
| CN | 104604225 A | 5/2015 |
| CN | 104683819 A | 6/2015 |
| CN | 104782125 A | 7/2015 |
| CN | 105392010 A | 3/2016 |
| CN | 105723707 A | 6/2016 |
| CN | 106105227 A | 11/2016 |
| CN | 106416255 A | 2/2017 |
| CN | 106464885 A | 2/2017 |
| CN | 106664425 A | 5/2017 |
| CN | 107079150 A | 8/2017 |
| CN | 107211147 A | 9/2017 |
| CN | 107211154 A | 9/2017 |
| CN | 107852511 A | 3/2018 |
| CN | 109196862 A | 1/2019 |
| CN | 109479133 A | 3/2019 |
| IN | 201818027074 A | 11/2018 |
| JP | 2014096638 A | 5/2014 |
| KR | 20160040709 A | 4/2016 |
| WO | 2014047693 A1 | 4/2014 |
| WO | 2015011339 A1 | 1/2015 |
| WO | 2015052935 A1 | 4/2015 |
| WO | 2015054634 A3 | 4/2015 |
| WO | 2015131404 A1 | 9/2015 |
| WO | 2015142556 A2 | 9/2015 |
| WO | 2015142854 A1 | 9/2015 |
| WO | 2015196126 A1 | 12/2015 |
| WO | 2016040865 A1 | 3/2016 |
| WO | 2016127889 A1 | 8/2016 |
| WO | 2016131417 A1 | 8/2016 |
| WO | 2017058615 A1 | 4/2017 |
| WO | 2017151343 A1 | 9/2017 |
| WO | 2018045207 A1 | 3/2018 |
| WO | 2018123644 A1 | 7/2018 |
| WO | 2020180216 A2 | 9/2020 |
| WO | 2020189960 A1 | 9/2020 |
| WO | 2021101345 A1 | 5/2021 |

OTHER PUBLICATIONS

Bossen, F., Retrieved From the Internet: https://vcgit.hhi.fraunhofer.de/jvet/VVCSoftware_VTM/tags/VTM-4.0., Oct. 12, 2022, 2 pages.

Document: JVET-L0147, Lim, S-C. et al., "CE2: Subsampled Laplacian calculation (Test 6.1, 6.2, 6.3, and 6.4)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.

Document: JVET-N0242, Taquet, J., et al., "CE5: Results of tests CE5-3.1 to CE5-3.4 on Non-Linear Adaptive Loop Filter.," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.

Document: JVET-N0415-v2, Hu, N., et al., "CE5: Coding tree block based adaptive loop filter (CE5-4)," Joint Video Experts Team (JVET) of ITU-T SG 16 WP 3 and ISO/IEC JTC 1/SC 29/WG 11 14th Meeting: Geneva, CH, Mar. 19-27, 2019, 16 pages.

Document: JVET-K1001-v6, Bross, B., et al., "Versatile Video Coding (Draft 2)," Joint Video Experts Team (JVET) of ITU-T SG 16 WP 3 and ISO/IEC JTC 1/SC 29/WG 11 11th Meeting: Ljubljana, SI, Jul. 10-18, 2018, 141 pages.

Document: JVET-M0427-v2, Lu, T., et al., "CE12: Mapping functions (test CE12-1 and CE12-2)," Joint Video Experts Team (JVET) of ITU-T SG 16 WP 3 and ISO/IEC JTC 1/SC 29/WG 11 13th Meeting: Marrakech, MA, Jan. 9-18, 2019, 17 pages.

Document: JVET-N0054, Lainema, J., "CE7: Joint coding of chrominance residuals (CE7-1)," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

(56) References Cited

OTHER PUBLICATIONS

Document: JVET-M0305, Lainema, J., "CE7-related: Joint coding of chrominance residuals," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.
Document: JVET-L0133, Koo, M., et al., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.
Document: JVET-N0243, Taquet, J., et al., "Non-CE5: Complementary results of tests CE5-3 on Non-Linear ALF," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.
Document: JVET-M0385, Taquet, J., et al., "Non-Linear Adaptive Loop Filter," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
"Series H: Audiovisual and Multimedia Systems; Infrastructure of audiovisual services—Coding of moving video; High efficiency video coding" Recommendation ITU-T H.265, Nov. 2019, 712 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Karczewicz, M., et al., "Geometry Transformation-based Adaptive In-Loop Filter," Picture Coding Symposium (PCS), 2016, 5 pages.
Document: JVET-N1001, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 407 pages.
Document: JVET-N0225-v2, Li, L., et al., "Various chroma format support in VVC," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-N0282-v3, Helmrich, C., et al., "CE7-related: Joint chroma residual coding with multiple modes," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.
Document: JVET-L0246-v2, Pu, F., et al., "CE12-4: SDR In-loop Reshaping," Joint Video Experts Team (JVET) of ITU-T SG 16 WP 3 and ISO/IEC JTC 1/SC 29/WG 11 12th Meeting: Macao, CN, Oct. 3-12, 2018, 9 pages.
Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 19 pages.
Document: JCTVC-P1005-v4, Flynn, D., et al., "High Efficiency Video Coding (HEVC) Range Extensions text specification: Draft 6," Joint Collaborative Team on Video Coding (JCT-VC) of ITU-T SG 16 WP 3 and ISO/IEC JTC 1/SC 29/WG 11 16th Meeting: San Jose, US, Jan. 9-17, 2014, 370pages.
Document: JVET-N0492-v4, Chernyak, R., et al., "CBF flags signalling in VVC," Joint Video Experts Team (JVET) of ITU-T SG 16 WP 3 and ISO/IEC JTC 1/SC 29/WG 11 14th Meeting: Geneva, CH, Mar. 19-27, 2019, 7 pages.
Document: JVET-K0032, Francois, E., et al. "CE12: Summary Report on mapping for HDR content," Joint Video Experts Team (JVET) of ITU-T SG 16 WP 3 and ISO/IEC JTC 1/SC 29/WG 11 11th Meeting, Ljubljana, SI, Jul. 10-18, 2018, 7 pages.

Office Action dated May 2, 2022, 12 pages, U.S. Appl. No. 17/400,320, filed Aug. 12, 2021.
Notice of Allowance dated Sep. 23, 2022, 14 pages, U.S. Appl. No. 17/400,320, filed Aug. 12, 2021.
Office Action dated Dec. 9, 2021, 25 pages, U.S. Appl. No. 17/405,304, filed Aug. 18, 2021.
Notice of Allowance dated Apr. 29, 2022, 23 pages, U.S. Appl. No. 17/494,956, filed Oct. 6, 2021.
Office Action dated Dec. 29, 2021, 16 pages, U.S. Appl. No. 17/494,956, filed Oct. 6, 2021.
Office Action dated Jan. 14, 2022, 28 pages, U.S. Appl. No. 17/400,320, filed Aug. 12, 2021.
Foreign Communication From a Related Counterpart Application, European Application No. 20795280.5, Extended European dated Jun. 2, 2022, 10 pages.
Foreign Communication From a Related Counterpart Application, Indian Application No. 202147051823, English Translation of Indian Office Action dated Jun. 17, 2022, 6 pages.
Foreign Communication From a Related Counterpart Application, International Application No. PCT/CN2020/085614, English Translation of International Search Report dated Jun. 30, 2020, 10 pages.
Foreign Communication From a Related Counterpart Application, International Application No. PCT/CN2020/085616, English Translation of International Search Report dated Jul. 9, 2020, 10 pages.
Foreign Communication From a Related Counterpart Application, International Application No. PCT/CN2020/085620, English Translation of International Search Report dated Jul. 21, 2020, 10 pages.
Foreign Communication From a Related Counterpart Application, International Application No. PCT/CN2020/090483, English Translation of International Search Report dated Aug. 18, 2020, 11 pages.
Foreign Communication From a Related Counterpart Application, International Application No. PCT/CN2020/093675, English Translation of International Search Report dated Sep. 7, 2020, 11 pages.
Document: JCTVC-I0265r1-v2, Xu, J., et al., "Chroma QP extension and signalling enhancement," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, 19 pages.
"Series H: Audiovisual and Multimeda Systems; Infrastructure of audiovisual services—Coding of moving video; Advanced video coding for generic audiovisual services," Recommendation ITU-T H.264 Jan. 2012, 11 pages.
Document: JVET-N1001-v2, Bross, B., et al., Versatile Video Coding (Draft 5), Joint Video Experts Team (JVET) of ITU-T SG 16 WP 3 and ISO/IEC JTC 1/SC 29/WG 11, 14th Meeting: Geneva, CH Mar. 19-27, 2019, 15 pages.
Foreign Communication From a Counterpart Communication, Japanese Application No. 2021-562015, English Translation of Japanese Office Action dated Nov. 15, 2023, 18 pages.
Chen, Translation of AU_2020232135_A1, Mar. 5, 2020 (Year: 2020).
Heo, Translation of WO_2020189960_A1, Mar. 12, 2020 (Year: 2020).
Lim, Translation of WO_2021 101345 A1, Nov. 23, 2020 (Year: 2020).
Non-Final Office Action from U.S. Appl. No. 18/164,977 dated Sep. 13, 2023, 39 pages.
Document: JVET-N0290, Paluri, S., et al., "AHG17: Conditional Signaling of ALF and In-Loop Reshaper Model.", Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Chinese Office Action from Chinese Patent Application No. 202211142583.2 dated Sep. 26, 2024, 8 pages.

* cited by examiner

FIG. 4A Subsampled positions for vertical gradient

FIG. 4B Subsampled positions for horizontal gradient

FIG. 4C Subsampled positions for diagonal gradient

FIG. 4D Subsampled positions for diagonal gradient

Flowchart of decoding flow with reshaping

Nominal vertical and horizontal locations of 4:2:0 luma and chroma samples in a picture

Location of the top-left chroma sample when chroma_format_idc is equal to 1 (4:2:0 chroma format) as a function of ChromaLocType

2900

2910 — determining, based on a chroma format of a video comprising a region, whether one or more syntax flags applicable to the region of the video are absent in a syntax structure of a coded representation of the video, the one or more syntax flags indicative of usage of a luma-dependent chroma residue scaling coding step for representing the region in the coded representation 2920 — generating one or more decoded video blocks of the video region by parsing the coded representation according to the determining

*FIG. 29A*

```
3000 ─┐
      ▼
┌─────────────────────────────────────┐
│ determining, based on a chroma      │
│ format of a video comprising a      │── 3010
│ region, that one or more syntax     │
│ flags applicable to the region of   │
│ the video are absent in a syntax    │
│ structure of a coded representation │
│ of the video, the one or more       │
│ syntax flags indicative of a number │
│ of bits used to represent each of   │
│ Pulse Code Modulation sample values │
│ of chroma components                │
└─────────────────────────────────────┘
              │
              ▼
┌─────────────────────────────┐
│ generating one or more      │
│ decoded video blocks of the │── 3020
│ video region by parsing the │
│ coded representation        │
│ according to the            │
│ determining                 │
└─────────────────────────────┘
```

*FIG. 30A*

3100 ⤴ determining, based on a chroma format of a video comprising a region, whether one or more syntax flags applicable to the region of the video are included in a syntax structure of a coded representation of the video, the one or more syntax flags related to an adaptive loop filter (ALF) temporal prediction step for chroma components ～ 3110 generating one or more decoded video blocks of the video region by parsing the coded representation according to the determining ～ 3120

3310 — determining, for a conversion between a block of a video and a bitstream representation of the video, that one or more matrix indices for a secondary transform are absent from the bitstream representation in case a joint chroma residual coding step is applied to the block 3320 — performing the conversion based on the determining

3410 — determining, for a conversion between a block of a video and a bitstream representation of the video, that a syntax flag indicating usage of a joint chroma residual coding step is absent from the bitstream representation in case a secondary transform is applied to the block between a forward primary transform and a quantization step or between a de-quantization step and an inverse primary transform 3420 — performing the conversion based on the determining

3510 — determining, for a conversion between a block of a video and a bitstream representation of the video, that a syntax flag indicating usage of a cross-component linear model coding step is absent from the bitstream representation in case a joint chroma residual coding step is applied to the block 3520 — performing the conversion based on the determining

*FIG. 35*

```
┌─────────────────────────────────┐
│ 3600                            │
│                                 │
│  ┌──────────────┐  ~ 3610       │
│  │              │               │
│  │ determining, for a conversion between a block of a video
│  │ and a bitstream representation of the video, that a syntax
│  │ flag indicating usage of a joint chroma residual coding step
│  │ is absent from the bitstream representation in case a cross-
│  │ component linear model is applied to the block
│  └──────────────┘
│         │
│  ┌──────────────┐  ~ 3620
│  │ performing the conversion based on the determining │
│  └──────────────┘
```

3710 — determining, for a conversion between a block of a video and a bitstream representation of the video, a correlation between two chroma residuals used in a joint chroma residual coding step based on coefficients of a cross-component linear model coding step for the block 3720 — performing the conversion based on the determining

├─ 3810 determining, for a conversion between a block of a video and a bitstream representation of the video, that a luma-dependent chroma residue scaling coding step is disabled in case a joint chroma residual coding step is applied to the block └─ 3820 performing the conversion based on the determining

3910 — determining, for a conversion between a block of a video and a coded representation of the video, whether a syntax flag associated with the block indicative of a presence of a non-zero coefficient is included in a syntax structure in the coded representation based on a rule related to a coding characteristic of the video 3920 — performing the conversion based on the determining

*FIG. 39*

```
                    ┌──────────────────────────────┐
                    │ determining, for a conversion between a video and a coded
4100 ↘              │ representation of the video, whether a syntax element
                    │ associated with an adaptive loop filtering (ALF) operation for  ╱ 4110
                    │ a chroma component of the video is included in the coded
                    │ representation based on a condition
                    └──────────────────────────────┘
                                    │
                    ┌──────────────────────────────┐
                    │ performing the conversion based on the determining  ╱ 4120
                    └──────────────────────────────┘
```

*FIG. 41*

```
4200 ──┐
        ▼
┌──────────────────────────────────────┐
│ determining, for a conversion between a video and a coded │  ← 4210
│ representation of the video, whether a syntax element     │
│ associated with a coding technique for a chroma component │
│ of the video is included in the coded representation based│
│ on a condition                                            │
└──────────────────────────────────────┘
                    │
┌──────────────────────────────────────┐
│ performing the conversion based on the determining │  ← 4220
└──────────────────────────────────────┘
```

*FIG. 42*

```
                    4300
                       ↘
    ┌─────────────────────────────────────────────┐  4310
    │ determining, for a conversion between a     │╱
    │ video and a coded representation of the     │
    │ video, whether a syntax element indicating  │
    │ a characteristic for a chroma component of  │
    │ the video is included in the coded          │
    │ representation based on a condition         │
    │ associated with a color format of the video │
    └─────────────────────────────────────────────┘
                         │
    ┌─────────────────────────────────┐  4320
    │ performing the conversion based │╱
    │ on the determining              │
    └─────────────────────────────────┘
```

*FIG. 43*

ADAPTIVE LOOP FILTERING FOR CHROMA COMPONENTS

CROSS REFERENCE TO RELATED APPLICATIONS

This application is a continuation of U.S. application Ser. No. 17/494,956 filed on Oct. 6, 2021, which is a continuation of International Patent Application No. PCT/CN2020/093675, filed on Jun. 1, 2020, which claims the priority to and benefits of International Patent Application No. PCT/CN2019/089218, filed on May 30, 2019. All the aforementioned patent applications are hereby incorporated by reference in their entireties.

TECHNICAL FIELD

This patent document relates to video coding techniques, devices and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to management of syntax flags with respect chroma formats are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. The method includes determining, for a conversion between a video and a coded representation of the video, whether a syntax element associated with an adaptive loop filtering (ALF) operation for a chroma component of the video is included in the coded representation based on a condition. The method also includes performing the conversion according to the determining.

In another representative aspect, the disclosed technology may be used to provide a method for video processing. The method includes determining, for a conversion between a video and a coded representation of the video, whether a syntax element associated with a coding technique for a chroma component of the video is included in the coded representation based on a condition. The method also includes performing the conversion according to the determining.

In another representative aspect, the disclosed technology may be used to provide a method for video processing. The method includes determining, for a conversion between a video and a coded representation of the video, whether a syntax element indicating a characteristic for a chroma component of the video is included in the coded representation based on a condition associated with a color format of the video. The method also includes performing the conversion according to the determining.

In another representative aspect, the disclosed technology may be used to provide a method for video decoding. The method includes determining, based on a rule, whether one or more syntax flags applicable to the region of the video are included in a syntax structure of a coded representation of the video. The one or more syntax flags are indicative of a joint chroma residual coding step for representing the region in the coded representation. The method also includes generating one or more decoded video blocks of the region by parsing the coded representation according to a presence or an absence of the one or more syntax flags in the coded representation.

In one representative aspect, the disclosed technology may be used to provide a method for video encoding. The method includes conditionally encoding, based on a rule, one or more syntax flags applicable to the region of the video in a syntax structure of a coded representation of the video. The one or more syntax flags indicative of a joint chroma residual coding step for representing the region in the coded representation.

In another representative aspect, the disclosed technology may be used to provide a method for video decoding. The method includes determining a chroma format of a region of a video and determining, based on the chroma format, whether one or more syntax flags applicable to the region of the video are included in a syntax structure of a coded representation of the video. The one or more syntax flags are indicative of use of a quantization parameter offset for representing the region in the coded representation. The method also includes generating one or more decoded video blocks of the video region by parsing the coded representation according to a presence or an absence of the one or more syntax flags.

In another representative aspect, the disclosed technology may be used to provide a method for video decoding. The method includes determining a chroma format of a region of a video and determining, based on the chroma format, that one or more syntax flags indicating usage of a secondary transform applicable to the region of the video are absent in a syntax structure of a coded representation of the video. The secondary transform is applied between a de-quantization step and an inverse primary transform. The method also includes generating one or more decoded video blocks of the video region by parsing the coded representation according to an absence of the one or more syntax flags.

In another representative aspect, the disclosed technology may be used to provide a method for video encoding. The method includes determining a chroma format associated with a region of a video and conditionally encoding, based on the chroma format, one or more syntax flags in a syntax structure of a coded representation of the video. The one or more syntax flags are indicative that use of a quantization parameter offset for representing the region in the coded representation is enabled.

In another representative aspect, the disclosed technology may be used to provide a method for video encoding. The method includes determining a chroma format of a region of a video and generating, based on the chroma format, a coded representation of the video by encoding the region without including one or more syntax flags indicating usage of a secondary transform in a syntax structure of the coded representation of the video. The secondary transform is applied between a forward primary transform and a quantization step.

In another representative aspect, the disclosed technology may be used to provide a method for video decoding. The method includes determining, based on a chroma format of a video comprising a region, whether one or more syntax flags applicable to the region of the video are absent in a syntax structure of a coded representation of the video. The one or more syntax flags are indicative of usage of a luma-dependent chroma residue scaling coding step for representing the region in the coded representation. The luma-dependent chroma residue scaling coding step comprises a scaling process in which a scaling coefficient is derived based on reconstructed luma samples, the scaling process being applied to a chroma residue. The method also includes generating one or more decoded video blocks of the video region by parsing the coded representation according to the determining.

In another representative aspect, the disclosed technology may be used to provide a method for video decoding. The method includes determining, based on a chroma format of a video comprising a region, that one or more syntax flags applicable to the region of the video are absent in a syntax structure of a coded representation of the video. The one or more syntax flags are indicative of a number of bits used to represent each of Pulse Code Modulation sample values of chroma components. The method also includes generating one or more decoded video blocks of the video region by parsing the coded representation according to the determining.

In another representative aspect, the disclosed technology may be used to provide a method for video decoding. The method includes determining, based on a chroma format of a video comprising a region, whether one or more syntax flags applicable to the region of the video are included in a syntax structure of a coded representation of the video. The one or more syntax flags are related to an adaptive loop filter (ALF) temporal prediction step for chroma components. The method also includes generating one or more decoded video blocks of the video region by parsing the coded representation according to the determining.

In another representative aspect, the disclosed technology may be used to provide a method for video encoding. The method includes determining a chroma format a video comprising a region; and generating, based on the chroma format, a coded representation of the video by encoding the region without including one or more syntax flags in a syntax structure of a coded representation of the video. The one or more syntax flags are indicative of usage of a luma-dependent chroma residue scaling coding step for representing the region in the coded representation. The luma-dependent chroma residue scaling coding step comprises a scaling process in which a scaling coefficient is derived based on reconstructed luma samples and the scaling process is applied to a chroma residue.

In another representative aspect, the disclosed technology may be used to provide a method for video encoding. The method includes determining a chroma format a video comprising a region and generating, based on the chroma format, a coded representation of the video by encoding the region without including one or more syntax flags in a syntax structure of the coded representation of the video. The one or more syntax flags are indicative of a number of bits used to represent each of Pulse Code Modulation sample values of chroma components.

In another representative aspect, the disclosed technology may be used to provide a method for video encoding. The method includes determining a chroma format a video comprising a region and conditionally encoding, based on the chroma format, one or more syntax flags in a syntax structure of a coded representation of the video. The one or more syntax flags are related to an adaptive loop filter (ALF) temporal prediction step for chroma components.

In another representative aspect, the disclosed technology may be used to provide a method for video processing. The method includes determining, for a conversion between a block of a video and a bitstream representation of the video, multiple reduced secondary transform (RST) matrices corresponding to multiple chroma color components of the block. A secondary transform is applicable between a forward primary transform and a quantization step or between a de-quantization step and an inverse primary transform. The method also includes performing the conversion based on the determining.

In another representative aspect, the disclosed technology may be used to provide a method for video processing. The method includes determining, for a conversion between a block of a video and a bitstream representation of the video, that one or more matrix indices for a secondary transform are absent from the bitstream representation in case a joint chroma residual coding step is applied to the block. The secondary transform is applicable to the block between a forward primary transform and a quantization step or between a de-quantization step and an inverse primary transform. The joint chroma residual coding step comprises determining a joint residual that is an average of residuals associated with chroma components. The method also includes performing the conversion based on the determining.

In another representative aspect, the disclosed technology may be used to provide a method for video processing. The method includes determining, for a conversion between a block of a video and a bitstream representation of the video, that a syntax flag indicating usage of a joint chroma residual coding step is absent from the bitstream representation in case a secondary transform is applied to the block between a forward primary transform and a quantization step or between a de-quantization step and an inverse primary transform. The joint chroma residual coding step comprises determining a joint residual that is an average of residuals associated with chroma components. The method also includes performing the conversion based on the determining.

In another representative aspect, the disclosed technology may be used to provide a method for video processing. The method includes determining, for a conversion between a block of a video and a bitstream representation of the video, that a syntax flag indicating usage of a cross-component linear model coding step is absent from the bitstream representation in case a joint chroma residual coding step is applied to the block. The joint chroma residual coding step comprises determining a joint residual that is an average of residuals associated with chroma components. The method also includes performing the conversion based on the determining.

In another representative aspect, the disclosed technology may be used to provide a method for video processing. The method includes determining, for a conversion between a block of a video and a bitstream representation of the video, that a syntax flag indicating usage of a joint chroma residual coding step is absent from the bitstream representation in case a cross-component linear model is applied to the block. The joint chroma residual coding step comprises determining a joint residual that is an average of residuals associated with chroma components. The method also includes performing the conversion based on the determining.

In another representative aspect, the disclosed technology may be used to provide a method for video processing. The method includes determining, for a conversion between a block of a video and a bitstream representation of the video, a correlation between two chroma residuals used in a joint chroma residual coding step based on coefficients of a cross-component linear model coding step for the block. The joint chroma residual coding step comprises determining a joint residual that is an average of residuals associated with 5 chroma components. The method also includes performing the conversion based on the determining.

In another representative aspect, the disclosed technology may be used to provide a method for video processing. The method includes determining, for a conversion between a block of a video and a bitstream representation of the video, that a luma-dependent chroma residue scaling coding step is disabled in case a joint chroma residual coding step is applied to the block. The luma-dependent chroma residue scaling coding step comprises a scaling process in which a scaling coefficient is derived based on reconstructed luma samples, the scaling process being applied to a chroma residue. The method also includes performing the conversion based on the determining.

In another representative aspect, the disclosed technology may be used to provide a method for video processing. The method includes determining, for a conversion between a block of a video and a coded representation of the video, whether a syntax flag associated with the block indicative of a presence of a non-zero coefficient is included in a syntax structure in the coded representation based on a rule related to a coding characteristic of the video. The method also includes performing the conversion according to the determining.

In another representative aspect, the disclosed technology may be used to provide a method for video processing. The method includes determining, for a conversion between a block of a video and a coded representation of the video, information about a secondary transform with a reduced dimension based on a rule associated with a coding characteristic of the video. The secondary transform is applicable between a forward primary transform and a quantization step or between a de-quantization step and an inverse primary transform, and the reduced dimension is reduced based on a dimension of the block. The method also includes performing the conversion according to the determining.

In one representative aspect, the disclosed technology may be used to provide a method for video processing. This method includes performing a conversion between a current video block and a bitstream representation of the current video block, wherein the conversion includes, in response to detecting at least one condition, selectively enabling or disabling a signaling of one or more syntax flags associated with a use of one or more of: a joint chroma residual coding step, a luma-dependent chroma residue scaling (LDCRS) step, a secondary transform step, a quantization step, or an adaptive loop filter step.

In another representative aspect, the disclosed technology may be used to provide a method for video processing. This method includes performing a conversion between a current video block and a bitstream representation of the current video block, wherein the conversion includes, in response to detecting at least one condition, selectively enabling or disabling a signaling of one or more syntax flags associated with a use of one or more of: a joint chroma residual coding step, a luma-dependent chroma residue scaling (LDCRS) step, a secondary transform step, a quantization step, or an adaptive loop filter step, wherein a first chroma component of the current video block is associated with a first reduced secondary transform (RST) matrix, and a second chroma component of the current video block is associated with a second RST matrix.

In yet another representative aspect, the disclosed technology may be used to provide a method for video processing. This method includes performing a conversion between a current video block and a bitstream representation of the current video block, wherein the conversion includes, in response to detecting at least one condition, selectively enabling or disabling a signaling of one or more syntax flags associated with a use of one or more of: a joint chroma residual coding step, a luma-dependent chroma residue scaling (LDCRS) step, a secondary transform step, a quantization step, or an adaptive loop filter step, wherein a first chroma component of the current video block is associated with a first reduced secondary transform (RST) matrix, and a second chroma component of the current video block is associated with a second RST matrix; and in response to determining that the joint chroma residual coding step is enabled for the current video block, disabling a signaling of a flag related to the usage of the CCLM on one or more chroma components of the current video block, wherein a flag in the one or more syntax flags are related to a usage of a cross-component linear model (CCLM).

In yet another representative aspect, the disclosed technology may be used to provide a method for video processing. This method includes making a decision, for a current video block, regarding a selective inclusion of one or more coded block flags in a bitstream representation of the current video block; and performing, based on the decision, a conversion between the current video block and the bitstream representation of the current video block, wherein the selective inclusion is based on a color format, a component coding method of the current video block or a coding mode of the current video block.

In yet another representative aspect, the disclosed technology may be used to provide a method for video processing. This method includes making a decision, for a current video block, regarding a selective application of a reduced secondary transform (RST) to the current video block based on a number of non-zero coefficients in one or more color components of the current video block, and performing, based on the decision, a conversion between the current video block and a bitstream representation of the current video block.

In yet another representative aspect, a method of video processing is disclosed. The method includes performing a conversion between a current video block and a bitstream representation of the current video block, wherein, the bitstream representation is based on selective inclusion of syntax elements indicative of an information about chroma coding based on a characteristic of chroma.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

BRIEF DESCRIPTION OF THE DRAWINGS

FIGS. 4A-4D show examples of subsampled Laplacian calculations.

FIG. 11 shows examples of luma and chroma subsampling methods.

FIG. 12 shows an example relative position of the top-left chroma sample.

FIG. 29A is a flowchart representation of another method for video decoding in accordance with the present technology.

FIG. 30A is a flowchart representation of another method for video decoding in accordance with the present technology.

FIG. 31A is a flowchart representation of another method for video decoding in accordance with the present technology.

FIG. 33 is a flowchart representation of another method for video processing in accordance with the present technology.

FIG. 34 is a flowchart representation of another method for video processing in accordance with the present technology.

FIG. 35 is a flowchart representation of another method for video processing in accordance with the present technology.

FIG. 36 is a flowchart representation of another method for video processing in accordance with the present technology.

FIG. 37 is a flowchart representation of another method for video processing in accordance with the present technology.

FIG. 38 is a flowchart representation of yet another method for video processing in accordance with the present technology.

FIG. 39 is a flowchart representation of yet another method for video processing in accordance with the present technology.

FIG. 41 is a flowchart representation of another method for video processing in accordance with the present technology.

FIG. 42 is a flowchart representation of another method for video processing in accordance with the present technology.

FIG. 43 is a flowchart representation of yet another method for video processing in accordance with the present technology.

DETAILED DESCRIPTION

1. Video Coding in HEVC/H.265

Figure 1:
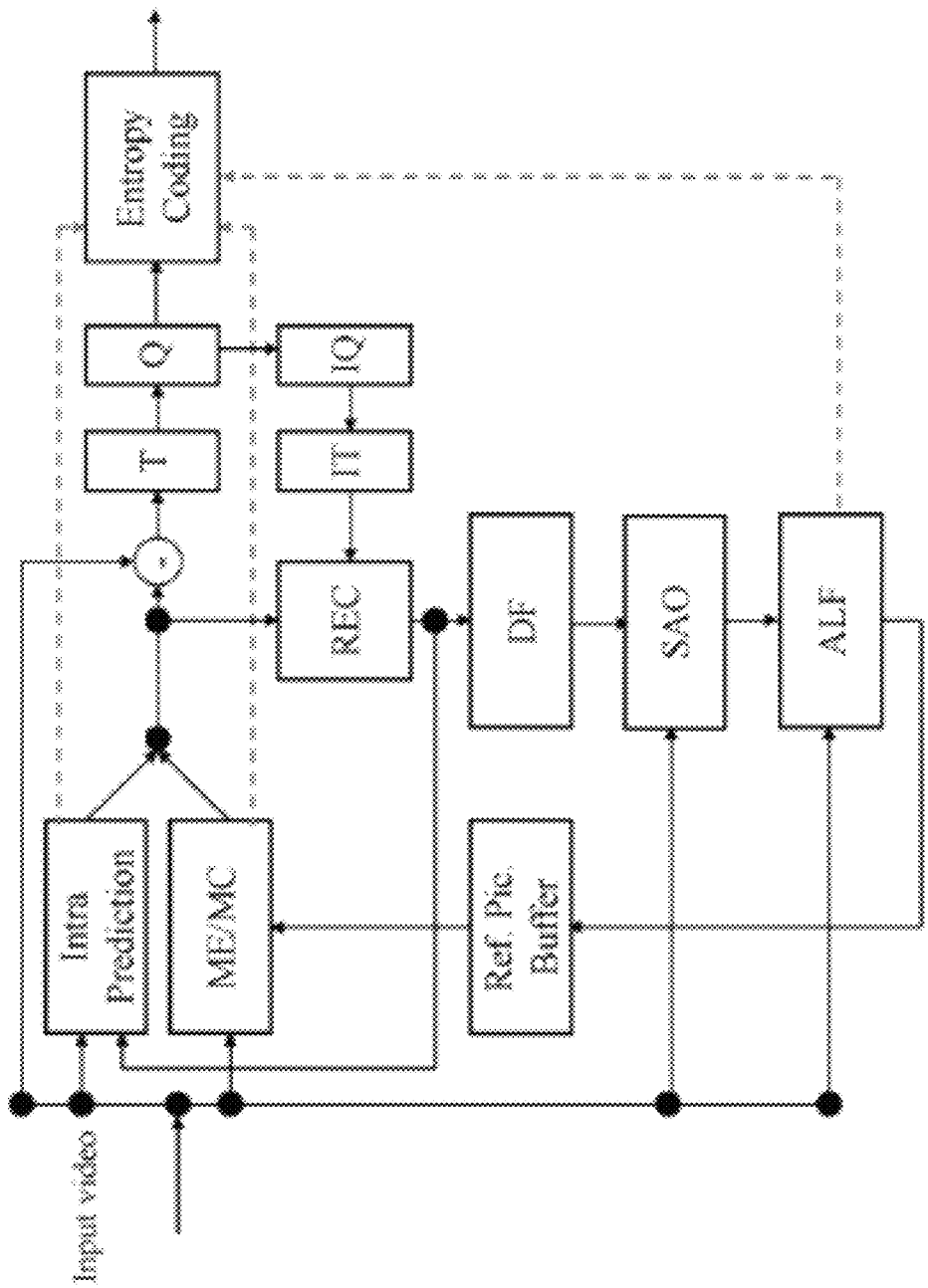
FIG. 1 shows an example encoder block diagram of versatile video coding (VVC).

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Color Space and Chroma Subsampling

Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

The two chroma components are sampled at half the sample rate of luma: the horizontal chroma resolution is halved. This reduces the bandwidth of an uncompressed video signal by one-third with little to no visual difference.

2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2.2. Coding Flow of a Typical Video Codec

FIG. 1 shows an example of encoder block diagram of VVC, which contains three in-loop filtering blocks: deblocking filter (DF), sample adaptive offset (SAO) and adaptive loop filetr (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3. Geometry Transformation-Based Adaptive Loop Filter in JEM

In the JEM, a geometry transformation-based adaptive loop filter (GALF) with block-based filter adaption is applied. For the luma component, one among 25 filters is selected for each 2×2 block, based on the direction and activity of local gradients.

2.3.1. Filter Shape

Figure 2:
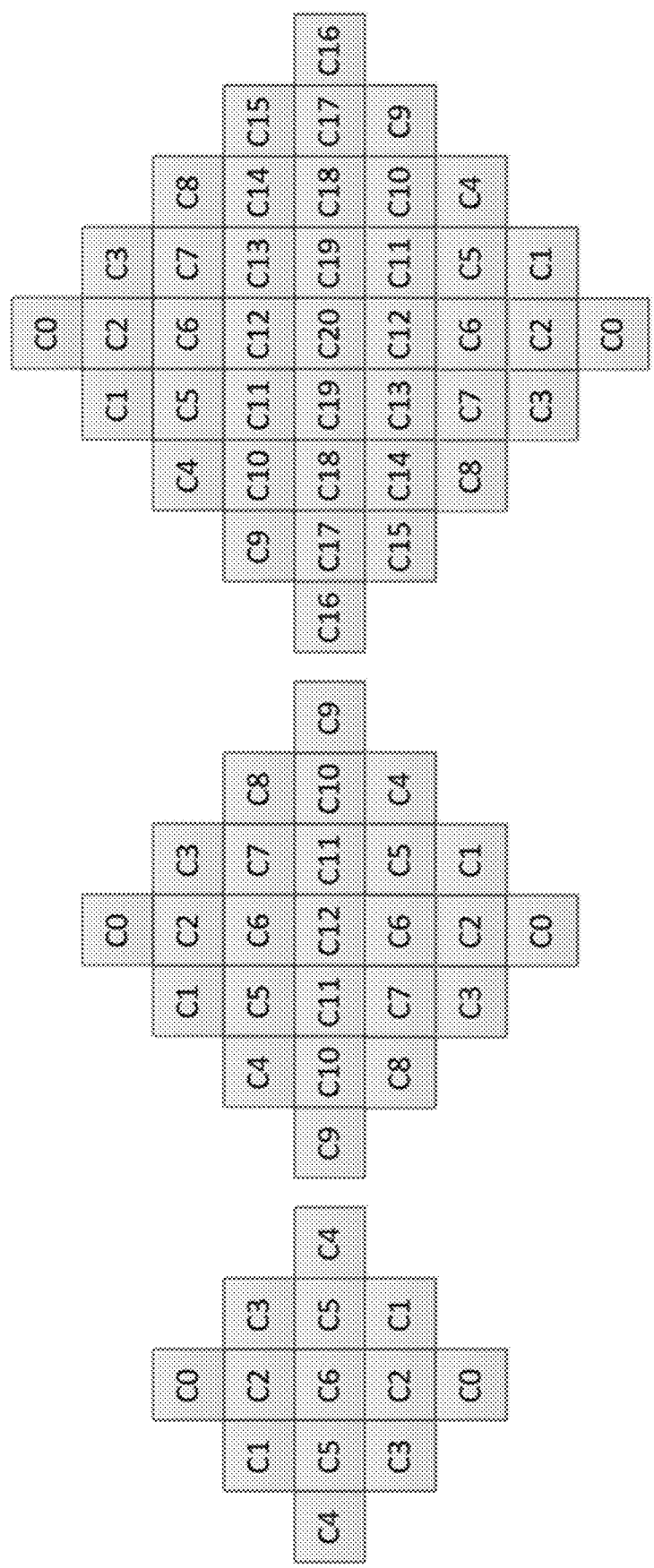
FIG. 2 shows examples of a filter for the luma component.

In the JEM, up to three diamond filter shapes (as shown in FIG. 2) can be selected for the luma component. An index is signaled at the picture level to indicate the filter shape used for the luma component.

For chroma components in a picture, the 5×5 diamond shape is always used.

2.3.1.1. Block Classification

Each 2×2 block is categorized into one out of 25 classes. The classification index C is derived based on its directionality D and a quantized value of activity $\hat{A}$, as follows:

$$C = 5D + \hat{A} \quad (1)$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, V_{k,l} = |2R(k,l) - R(k,l-1) - R(k,l+1)|, \quad (2)$$

$$g_h = \sum_{k=i-2}^{i+3} \sum_{l=j-2}^{j+3} H_{k,l}, H_{k,l} = |2R(k,l) - R(k-1,l) - R(k+1,l)|, \quad (3)$$

$$g_{d1} = \sum_{k=i-2}^{i+3} \sum_{l=j-2}^{j+3} D1_{k,l}, D1_{k,l} = |2R(k,l) - R(k-1,l-1) - R(k+1,l+1)| \quad (4)$$

$$g_{d2} = \sum_{k=i-2}^{i+3} \sum_{j=j-2}^{j+3} D2_{k,l}, D2_{k,l} = |2R(k,l) - R(k-1,l-1) - R(k+1,l+1)| \quad (5)$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v), g_{h,v}^{min} = \min(g_h, g_v) \quad (6)$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}) \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as $\hat{A}$.

For both chroma components in a picture, no classification method is applied, e.g. a single set of ALF coefficients is applied for each chroma component.

2.3.1.2. Geometric Transformations of Filter Coefficients

Before filtering each 2×2 block, geometric transformations such as rotation or diagonal and vertical flipping are applied to the filter coefficients f (k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l)=f(l,k)$,

Vertical flip: $f_V(k,l)=f(k,K-l-1)$

Rotation: $f_R(k,l)=f(K-l-1,k)$ (9)

where K is the size of the filter and $0 \leq k$, $l \leq K-1$ are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 1.

TABLE 1

Mapping of the gradient calculated for one block and the transformations

| Gradient values | Transformation |
|---|---|
| $g_{d2} < g_{d1}$ and $g_o < g_{ave}$ | No transformation |
| $g_{d2} < g_{d1}$ and $g_{ive} < g_h$ | Diagonal |
| $g_{d1} < g_{d2}$ and $g_h < g_v$ | Vertical flip |
| $g_{d1} < g_{d2}$ and $g_v < g_h$ | Rotation |

2.3.1.3. Filter Parameters Signaling

In the JEM, GALF filter parameters are signaled for the first coding tree unit (CTU), e.g., after the slice header and before the SAO parameters of the first CTU. Up to 25 sets of luma filter coefficients can be signaled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures, and bypass the GALF coefficients signalling. In this case, only an index to one of the reference pictures is signaled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (e.g., 6 in current JEM), a new set of filters overwrites the oldest set in decoding order, and that is, first-in-first-out (FIFO) rule is applied to update the candidate list. To avoid duplications, a set can only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter f (k, l) can still be sent for this class in which case the coefficients of the filter which will be applied to the reconstructed image are sum of both sets of coefficients.

The filtering process of luma component can be controlled at coding unit (CU) level. A flag is signaled to indicate whether GALF is applied to the luma component of a CU. For chroma component, whether GALF is applied or not is indicated at picture level only.

2.3.1.4. Filtering Process

At decoder side, when GALF is enabled for a block, each sample R(i, j) within the block is filtered, resulting in sample value R'(i,j) as shown below, where L denotes filter length, $f_{m,n}$ represents filter coefficient, and f (k, l) denotes the decoded filter coefficients.

$$R'(i,j)=\Sigma_{k=-L/2}^{L/2}\Sigma_{l=-L/2}^{L/2}f(k,l) \times R(i+k,j+l) \quad (10)$$

2.3.1.5. Encoding Side Filter Parameters Determination Process

Figure 3:
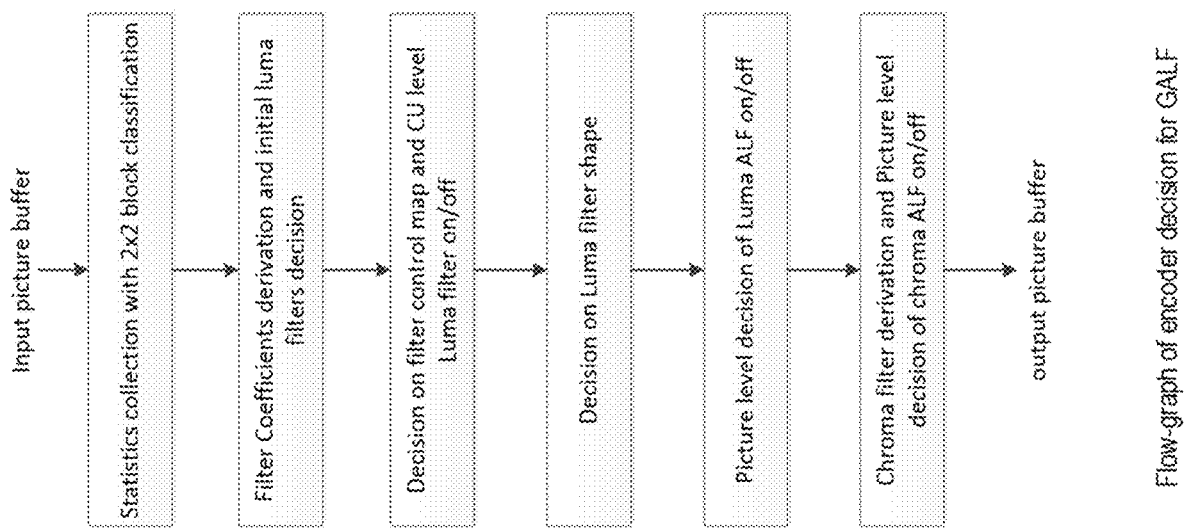
FIG. 3 shows an example flow-graph of encoder decision for a geometry transformation-based adaptive loop filter (GALF).

Overall encoder decision process for GALF is illustrated in FIG. 3. For luma samples of each CU, the encoder makes a decision on whether or not the GALF is applied and the appropriate signalling flag is included in the slice header. For chroma samples, the decision to apply the filter is done based on the picture-level rather than CU-level. Furthermore, chroma GALF for a picture is checked only when luma GALF is enabled for the picture.

2.4. Geometry Transformation-Based Adaptive Loop Filter in VTM4.0

The current design of GALF in VVC has the following major changes compared to that in JEM:

(1) The adaptive filter shape is removed. Only 7×7 filter shape is allowed for luma component and 5×5 filter shape is allowed for chroma component.

(2) Temporal prediction of ALF parameters and prediction from fixed filters are both removed.

(3) For each CTU, one bit flag is signaled whether ALF is enabled or disabled.

(4) Calculation of class index is performed in 4×4 level instead of 2×2. In addition, sub-sampled Laplacian calculation method for ALF classification can be utilized. More specifically, there is no need to calculate the horizontal/vertical/45 diagonal/135 degree gradients for each sample within one block. Instead, 1:2 subsampling is utilized.

FIGS. 4A-4D show some example subsampled Laplacian calculations.

2.4.1. Filtering Process

In VTM4.0, the filtering process of the Adaptive Loop Filter, is performed as follows:

$$O(x,y)=\Sigma_{(i,j)}w(i,j) \times I(x+i,y+j) \quad (11)$$

where samples I(x+i, y+j) are input samples, O(x, y) is the filtered output sample (e.g. filter result), and w(i,j) denotes the filter coefficients. In practice, in VTM4.0 it is implemented using integer arithmetic for fixed point precision computations:

$$O(x, y) = \left( \sum_{i=-\frac{L}{2}}^{\frac{L}{2}} \sum_{j=-\frac{L}{2}}^{\frac{L}{2}} w(i, j) \times I(x + i, y + j) + 64 \right) >> 7 \quad (12)$$

where L denotes the filter length, and where w(i,j) are the filter coefficients in fixed point precision.

2.5. Example Non-Linear ALF
2.5.1. Filtering Reformulation

Equation (11) can be reformulated, without coding efficiency impact, in the following expression:

$$O(x,y)=I(x,y)+\Sigma_{(i,j)\neq(0,0)}w(i,j)\times(I(x+i,y+j)-I(x,y)) \quad (13)$$

where $w(i,j)$ are the same filter coefficients as in equation (11) [excepted $w(0, 0)$ which is equal to 1 in equation (13) while it is equal to $1-\Sigma_{(i,j)\neq(0,0)}w(i,j)$ in equation (11)].

2.5.2. Modified Filtering Process

Using this above filter equation of (13), non-linearity can be introduced to make ALF more efficient by using a simple clipping function to reduce the impact of neighbor sample values ($I(x+i, y+j)$) when they are too different with the current sample value ($I(x, y)$) being filtered.

In this proposal, the ALF filter is modified as follows:

$$O'(x,y)=I(x,y)+\Sigma_{(i,j)\neq(0,0)}w(i,j)\times K(I(x+i,y+j)-I(x,y), k(i,j)) \quad (14)$$

where $K(d, b)=\min(b, \max(-b, d))$ is the clipping function, and $k(i,j)$ are clipping parameters which depend on the filter coefficient associate with $I(x+i, y+j)$. The encoder performs the optimization to find the best $k(i,j)$.

In some embodiments, the clipping parameters k j) are specified for each ALF filter, one clipping value is signaled per filter coefficient. It means that up to 12 clipping values can be signaled in the bitstream per Luma filter and up to 6 clipping values for the Chroma filter.

In order to limit the signaling cost and the encoder complexity, the evaluation of the clipping values can be limited to a small set of possible values. In some embodiments, 4 fixed values which are the same for INTER and INTRA tile groups can be used.

Because the variance of the local differences is often higher for Luma than for Chroma, two different sets for the Luma and Chroma filters can be used. The maximum sample value (here 1024 for 10 bits bit-depth) can be included in each set, so that clipping can be disabled if it is not necessary.

The sets of clipping values used in some embodiments are provided in the Table 2. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{\text{round}\left(\left((M)^{\frac{1}{N}}\right)^{N-n+1}\right) \text{for } n \in 1..N\right\}, \text{with } M = 2^{10} \text{ and } N = 4.$$

Similarly, the Chroma tables of clipping values is obtained according to the following formula:

TABLE 2

Authorized clipping values

| | INTRA/INTER tile group |
|---|---|
| LUMA | {1024, 181, 32, 6} |
| CHROMA | {1024, 161, 25, 4} |

The selected clipping values are coded in the "alf_data" syntax element by using a Golomb encoding scheme corresponding to the index of the clipping value in the above Table 2. This encoding scheme is the same as the encoding scheme for the filter index.

2.6. Example Coding Tree Block (CTB)-Based ALF

Three major changes are introduced in this proposal:

(1) Inherit filter coefficients from other ALF APSs (a.k.a., temporal prediction) in CTB-level.

(2) Predictive coding of filter coefficients from fixed filters.

(3) CTB-level control of usage of predictive coding from fixed filter sets or temporal prediction or inheriting from the one signaled filter set (in slice header)/

2.6.1. Slice-Level Temporal Filter

Adaptation parameter set (APS) was adopted in VTM4. Each APS contains one set of signaled ALF filters, up to 32 APSs are supported. In the proposal, slice-level temporal filter is tested. A tile group can re-use the ALF information from an APS to reduce the overhead. The APSs are updated as a first-in-first-out (FIFO) buffer.

2.6.2. Additional Example CTB-Based ALF

For luma component, when ALF is applied to a luma CTB, the choice among prediction from 16 fixed filter sets or 5 temporal filter sets or inheriting from the one signaled filter set (in slice header) is indicated. Only the filter set index is signaled. For one slice, only one new set of 25 filters can be signaled. If a new set is signaled for a slice, all the luma CTBs in the same slice share that set. Fixed filter sets can be used to predict the new slice-level filter set and can be used as candidate filter sets for a luma CTB as well. The number of filters is 64 in total.

For chroma component, when ALF is applied to a chroma CTB, if a new filter is signaled for a slice, the CTB will use the new filter, otherwise, the most recent temporal chroma filter satisfying the temporal scalability constrain is applied.

As the slice-level temporal filter, the APSs are updated as a first-in-first-out (FIFO) buffer.

$$AlfClip_C = \left\{\text{round}\left(A.\left(\left(\frac{M}{A}\right)^{\frac{1}{N-1}}\right)^{N-n}\right) \text{for } n \in 1..N\right\}, \text{with } M = 2^{10}, N = 4 \text{ and } A = 4.$$

2.6.3 Modified Specification
The following text is modified with fixed filter, temporal filters and CTB-based filter index
2.6.3.1. Syntax Tables
7.3.3.2 Adaptive Loop Filter Data Syntax

|  | Descriptor |
|---|---|
| alf_data( ) { |  |
|   alf_chroma_idc | tu(v) |
|   alf_signal_new_filter_luma | u(1) |
|   if( alf_signal_new_filter_luma > 0 ) { |  |
|     alf_luma_use_fixed_filter_flag | u(1) |
|     if(alf_luma_use_fixed_filter_flag) |  |
|       alf_luma_fixed_filter_set_index | tb(v) |
|       alf_luma_fixed_filter_usage_pattern | u(1) |
|       if (alf_luma_fixed_filter_usage_pattern > 0) |  |
|         for (i = 0; i < NumAlfFilters; i++) |  |
|           alf_luma_fixed_filter_usage[i] | u(1) |
|   alf_num_available_temporal_filter_sets_luma | tb(1) |
|   alf_luma_num_filters_signaled_minus1 | tb(v) |
|   alf_luma_type_flag | u(1) |
|   if( alf_luma_num_filters_signaled_minus1 > 0 ) { |  |
|     for( filtIdx = 0; filtIdx < NumAlfFilters; filtIdx++ ) |  |
|       alf_luma_coeff_delta_idx[ filtIdx ] | tu(v) |
|   } |  |
|   alf_luma_coeff_delta_flag | u(1) |
|   if ( !alf_luma_coeff_delta_flag && alf_luma_num_filters_signaled_minus1 > 0 ) |  |
|     alf_luma_coeff_delta_prediction_flag | u(1) |
|   alf_luma_min_eg_order_minus1 | tu(v) |
|   for( i = 0; i < ( alf_luma_type_flag = = 1) ? 2 : 3; i++) |  |
|     alf_luma_eg_order_increase_flag[ i ] | u(1) |
|   if ( alf_luma_coeff_delta_flag) { |  |
|     for( sigFiltIdx = 0; sigFiltIdx <= alf_luma_num_filters_signaled_minus1; sigFiltIdx++ ) |  |
|       alf_luma_coeff_flag[ sigFiltIdx ] | u(1) |
|   } |  |
|   for( sigFiltIdx = 0; sigFiltIdx <= alf_luma_num_filters_signaled_minus1; sigFiltIdx++ ){ |  |
|     if ( alf_luma_coeff_flag[ sigFiltIdx ] ) { |  |
|       for ( j = 0; j < (alf_luma_type_flag = = 1 ) ? 6 : 12; j++ ) { |  |
|         alf_luma_coeff_delta_abs[ sigFiltIdx ][ j ] | uek(v) |
|         if( alf_luma_coeff_delta_abs[ sigFiltIdx ][ j ] ) |  |
|           alf_luma_coeff_delta_sign[ sigFiltIdx ][ j ] | u(1) |
|       } |  |
|     } |  |
|   } |  |
|   } |  |
|   if ( alf_chroma_idc > 0 ) { |  |
|     alf_signal_new_filter_chroma | u(1) |
|     if (alf_signal_new_filter_chroma){ |  |
|       alf_chroma_min_eg_order_minus1 | tu(v) |
|       for( i = 0; i < 2; i++ ) |  |
|         alf_chroma_eg_order_increase_flag[ i ] | u(1) |
|       for(j = 0; j < 6; j++ ) { |  |
|         alf_chroma_coeff_abs[ j ] | uek(v) |
|         if( alf_chroma_coeff_abs[ j ] > 0 ) |  |
|           alf_chroma_coeff_sign[ j ] | u(1) |
|       } |  |
|     } |  |
|   } |  |
| } |  |

7.3.4.2. Coding Tree Unit Syntax

|  | Descriptor |
|---|---|
| coding_tree_unit ( ) { |  |
|   xCtb = ( CtbAddrInRs % PicWidthInCtbsY ) << CtbLog2SizeY |  |
|   yCtb = ( CtbAddrInRs / PicWidthInCtbsY ) << CtbLog2SizeY |  |
|   if( slice_alf_enable_flag ){ |  |
|     alf_ctb_flag[ 0 ] [ xCtb >> Log2CtbSize ][ yCtb >> Log2CtbSize ] | ae(v) |
|     if (alf_ctb_flag[ 0 ][ xQb >> Log2CtbSize ][ yCtb >> Log2QbSize ] { |  |
|       coding_alf_ctu_filter_set_index(CtbAddrInRs) |  |
|     } |  |
|     if( alf_chroma_idc = = 1 | | alf_chroma_idc = = 3 ) |  |
|       alf_ctb_flag[ 1 ][ xQb >> Log2QbSize ][ yCtb >> Log2QbSize ] | ae(v) |

|  | Descriptor |
|---|---|
| ```
        if( alf_chroma_idc = = 2 | | alf_chroma_idc = = 3 )
            alf_ctb_flag[ 2 ][ xCtb >> Log2QbSize ][ yCtb >> Log2QbSize ]
    }
    if( slice_type = = 1 && qtbtt_dual_tree_intra_flag ) {
        dual_tree_implicit_qt_split ( xCtb, yCtb, CtbLog2SizeY, 0 )
    else
        coding_quadtree( xCtb, yCtb, CtbLog2SizeY, 0, SINGLE_TREE )
}
coding_alf_ctu_filter_set_index(CtbAddrInRs, slice_type){
        xCtb = ( CtbAddrInRs % PicWidthInCtbsY ) << CtbLog2SizeY
        yCtb = ( CtbAddrInRs / PicWidthInCtbsY ) << QbLog2SizeY
        alf_use_new_filter
        if (alf_use_new_filter == 0){
            alf_use_fixed_filter
        }
    if (alf_use_new_filter){
        alf_luma_ctb_filter_set_index[xCtb >> Log2CtbSize ][ yCtb >> Log2CtbSize ] = 16
    }
        else if (alf_use_fixed_filter){
            alf_fixed_filter_index
            alf_luma_ctb_filter_set_index[xCtb >> Log2CtbSize ][ yCtb >> Log2CtbSize ] =
alf_fixed_filter_index
        }
        else{
            alf_temporal_index
            alf_luma_ctb_filter_set_index[xCtb >> Log2CtbSize ][ yCtb >> Log2CtbSize ] = 16 +
alf_temporal_index
        }
``` | ae(v)<br><br><br><br><br><br><br><br><br>ae(1)<br><br>ae(1)<br><br><br><br><br><br>tb(v)<br><br><br><br><br>tb(v) |

2.6.3.2. Semantics 7.4.4.2. Adaptive Loop Filter Data Semantics alf_signal_new_filter_luma equal to 1 specifies a new luma filter set is signaled. alf_signal_new_filter_luma equal to 0 specifies a new luma filter set is not signaled. It is 0 when not present.

alf_luma_use_fixed_filter_flag equal to 1 specifies that fixed filter set is used to signal adaptive loop filter. alf_luma_use_fixed_filter_flag equal to 0 specifies that fixed filter set is not used to signal adaptive loop filter.

alf_luma_fixed_filter_set_index specifies the fixed filter set index. It can be 0 . . . 15.

alf_luma_fixed_filter_usage_pattern equal to 0 specifies all new filters use fixed filter. alf_luma_fixed_filter_usage_pattern equal to 1 specifies some of new filters use fixed filter and others don't.

alf_luma_fixed_filter_usage[i] equal to 1 specifies ith filter uses fixed filter. alf_luma_fixed_filter_usage[i] equal to 0 specifies ith filter does not use fixed filter. When it is not present, it is inferred to 1.

alf_signal_new_filter_chroma equal to 1 specifies a new chroma filter is signaled. alf_signal_new_filter_chroma equal to 0 specifies a new chroma filter is not signaled.

alf_num_available_temporal_filter_sets_luma specifies the number of available temporal filter sets that can be used for current slice, it can be from 0 . . . 5. It is 0 when not present. The variable alf_num_available_filter_sets is derived as 16+alf_signal_new_filter_luma alf_num_available_temporal_filter_sets_luma.

If alf_signal_new_filter_luma is 1, the following process

The variable filterCoefficients[sigFiltIdx][j] with sigFiltIdx=0 . . . alf_luma_num_filters_signaled_minus1, j=0 . . . 11 is initialized as follows:

filterCoefficients[sigFiltIdx][j]=alf_luma_coeff_delta_abs[sigFiltIdx][j]*(1−2*alf_luma_coeff_delta_sign[sigFiltIdx][j]) (7-50)

When alf_luma_coeff_delta_prediction_flag is equal 1, filterCoefficients[sigFiltIdx][j] with sigFiltIdx=1 . . . alf_luma_num_filters_signaled_minus1 and j=0 . . . 11 are modified as follows:

filterCoefficients[sigFiltIdx][j]+=filterCoefficients[sigFiltIdx−1][j] (7-51)

The luma filter coefficients AlfCoeff$_L$ with elements AlfCoeff$_L$[filtIdx][j], with filtIdx=0 . . . NumAlfFilters−1 and j=0 . . . 11 are derived as follows AlfCoeff$_L$[filtIdx][j]=filterCoefficients[alf_luma_coeff_delta_idx[filtIdx]][j] (7-52)

if alf_luma_use_fixed_filter_flag is 1 and alf_luma_fixed_filter_usage[filtidx] is 1, the following applies:

AlfCoeff$_L$[filtIdx][j]=AlfCoeff$_L$[filtIdx][j]+AlfFixedFilterCoeff[AlfClassToFilterMapping[alf_luma_fixed_filter_index][filtidx]][j]

The last filter coefficients AlfCoeff$_L$[filtIdx][12] for filtIdx=0 . . . NumAlfFilters−1 are derived as follows:

AlfCoeffL[filtIdx][12]=128−Σk(AlfCoeffL[filtIdx][k]<<1), with k=0 . . . 11 (7-53)

It is a requirement of bitstream conformance that the values of AlfCoeff$_L$[filtIdx][j] with filtIdx=0 . . . NumAlfFilters−1, j=0 . . . 11 shall be in the range of −$2^7$ to $2^7$−1, inclusive and that the values of AlfCoeff$_L$[filtIdx][12] shall be in the range of 0 to $2^8$−1, inclusive.

The luma filter coefficients AlfCoeff$_{LumaAll}$ with elements AlfCoeff$_{LumaAll}$[filtSetIdx][filtIdx][j], with filtSetIdx=0 . . . 15, filtSetIdx=0 . . . NumAlfFilters−1 and j=0 . . . 12 are derived as follows AlfCoeff$_{LumaAll}$[filtSetIdx][filtIdx][j]=AlfFixedFilterCoeff[AlfClassToFilterMapping[filtSetIdx][filtidx]][j]

The luma filter coefficients AlfCoeff$_{LumaAll}$ with elements AlfCoeff$_{LumaAll}$[filtSetIdx][filtIdx][j], with filtSetIdx=16, filtSetIdx=0 . . . NumAlfFilters−1 and j=0 . . . 12 are derived as follows Variable closest_temporal_index is initialized as −1. Tid is the temporal layer index of current slice.

if alf_signal_new_filter_luma is 1

AlfCoeff$_{LumaAll}$[16][filtIdx][j]=AlfCoeff$_L$[filtIdx][j]

otherwise, the following process is invoked

```
for (i = Tid; i >= 0; i--)
{
    for (k = 0; k < temp_size_L; k++)
    {
        if (temp_Tid_L[ k ] == i)
        {
            closest_temporal_index is set as k;
            break;
        }
    }
}
```

AlfCoeff$_{LumaAll}$[16][filtIdx][$j$]=Temp$_L$[closest_temporal_index][filtIdx][$j$]

The luma filter coefficients AlfCoeff$_{LumaAll}$ with elements AlfCoeff$_{LumaAll}$[filtSetIdx][filtIdx][j], with filtSetIdx=17 . . . alf_num_available_filter_sets−1, filtSetIdx=0 . . . NumAlf-Filters−1 and j=0 . . . 12 are derived as follows $i$=17;

```
for (k = 0; k < temp_size_L and i < alf_num_available_filter_sets; j++)
{
    if (temp_Tid_L[ k ] <= Tid and k is not equal to closest_temporal_index)
    {
        AlfCoeff_LumaAll[ i ][ filtIdx ][ j ] = Temp_L[ k ][ filtIdx ][ j ];
        i++;
    }
}
```

AlfFixedFilterCoeff [64][13]=

```
{
    { 0, 0, 2, −3, 1, −4, 1, 7, −1, 1, −1, 5, 112 },
    ...
};
```

AlfClassToFilterMapping [16][25]=

```
{
    { 8, 2, 2, 2, 3, 4, 53, 9, 9, 52, 4, 4, 5, 9, 2, 8, 10, 9, 1, 3,
      39, 39, 10, 9, 52 }
    ...};
```

If alf_signal_new_filter_chroma is 1, the following process
The chroma filter coefficients AlfCoeff$_C$[j], with j=0 . . . 5 are derived as follows:

AlfCoeff$_C$[$j$]=alf_chroma_coeff_abs[$j$]*
(1−2*alf_chroma_coeff_sign[$j$])   (7-57)

The last filter coefficient for j=6 is derived as follows:

AlfCoeff$_C$[6]=128−Σ$_k$(AlfCoeff$_C$[$k$]<<1), with
$k$=0 . . . 5   (7-58)

It is a requirement of bitstream conformance that the values of AlfCoeff$_C$[j] with j=0 . . . 5 shall be in the range of −2$^7$−1 to 2$^7$−1, inclusive and that the values of AlfCoeff$_C$[6] shall be in the range of 0 to 2$^8$−1, inclusive.
otherwise (alf_signal_new_filter_chroma is 0), the following is invoked

```
for (i = Tid; i >= 0; i--)
{
    for (k = 0; k < temp_size_C; k++)
    {
        if (temp_Tid_C[ k ] == i)
        {
            closest_temporal_index is set as k;
            break;
        }
    }
}
```

The chroma filter coefficients AlfCoeff$_C$[j], with j=0 . . . 6 are derived as follows:

AlfCoeff$_C$[$j$]=Temp$_C$[closest_temporal_index][$j$]

7.4.5.2 Coding Tree Unit Semantics
alf_luma_ctb_filter_set_index[xCtb>>Log 2CtbSize] [yCtb>>Log 2CtbSize] specifies the filter set index of luma CTB at location (xCtb, yCtb).
alf_use_new_filter is equal to 1 specifies that alf_luma_ctb_filter_set_index[xCtb>>Log 2CtbSize][yCtb>>Log 2Ctb-Size] is 16. alf_use_new_filter is equal to 0 specifies that alf_luma_ctb_filter_set_index[xCtb>>Log 2CtbSize] [yCtb>>Log 2CtbSize] is not 16.
alf_use_fixed_filter is equal to 1 specifies that one of the fixed filter sets is used. alf_use_fixed_filter is equal to 0 specifies that current luma CTB doesn't use any fixed filter set.
alf_fixed_filter_index specifies the fixed filter set index, which can be from 0 to 15.
alf_temporal_index specifies the temporal filter set index, which can be from 0 to alf_num_available_temporal_filter_sets_luma−1.
2.6.3.3 Decoding Process
8.5.1 General
 1. When sps_alf_enabled_flag is equal to 1, the following applies:
  The temporal filter refresh process as specified in clause 8.5.4.5 is invoked.
  The adaptive loop filter process as specified in claus 8.5.4.1 is invoked with the reconstructed picture sample arrays S$_L$, S$_{Cb}$ and S$_{Cr}$ as inputs, and the modified reconstructed picture sample arrays S'$_L$, S'$_{Cb}$ and S'$_{Cr}$ after sample adaptive offset as outputs.
  The arrays S'$_L$, S'$_{Cb}$ and S'$_{Cr}$ are assigned to the arrays S$_L$, S$_{Cb}$ and S$_{Cr}$ (which represent the decoded picture), respectively.
  The temporal filter update process as specified in clause 8.5.4.6 is invoked.
8.5.4.2 Coding Tree Block Filtering Process for Luma Samples
 The array of luma filter coefficients f[j] corresponding to the filter specified by filtIdx[x][y] is derived as follows with j=0 . . . 12:

$f$[$j$]=AlfCoeff$_{LumaAll}$[alf_luma_ctb_filter_set_index
  [xCtb>>Log 2CtbSize][yCtb>>Log 2CtbSize]]
  [filtIdx[$x$][$y$]][$j$]   (8-732)

8.5.4.5 Temporal Filter Refresh
If any of the below condition is true,
 Current picture is IDR picture
 Current picture is BLA picture
 In decoding order, current picture is the first picture with POC larger than the POC of the last decoded IRAP picture, e.g. after leading pictures and before trailing pictures.
then temp_size_L and temp_size_C are set as 0.

8.5.4.6 Temporal Filter Update
If slice_alf_enabled_flag is 1 and alf_signal_new_filter_luma is 1, the following applies.
If luma temporal filter buffer size temp_size_L<5, temp_size_L=temp_size_L+1.
$Temp_L[i][j][k]$ with i=temp_size_L−1 . . . 1, j=0 . . . NumAlfFilters−1 and k=0 . . . 12 is updated as, $Temp_L[i][j][k]=Temp_L[i-1][j][k]$ $Tem_L[0][j][k]$ with j=0 . . . NumAlfFilters−1 and k=0 . . . 12 is updated as $Temp_L[0][j][k]=AlfCoeff_L[j][k]$ $Temp_{Tid\_L}[i]$ with i=temp_size_L−1 . . . 1 is updated as $Temp_{Tid\_L}[i]=Temp_{Tid\_L}[i-1]$ $Temp_{Tid\_L}[0]$ is set as current slice's temporal layer index Tid
if alf_chroma_idx is not 0 and alf_signal_new_filter_chroma is 1, the following applies $Temp_c[i][j]$ with i=temp_size_c−1 . . . 1 and j=0 . . . 6 is updated as, $Temp_c[i][j]=Temp_c[i-1][j]$ $Temp_c[0][j]$ with j=0 . . . 6 is updated as $Temp_c[0][j]=AlfCoeff_C[j]$ $Temp_{Tid\_C}[i]$ with i=temp_size_C−1 . . . 1 is updated as $Temp_{Tid\_C}[i]=Temp_{Tid\_C}[i-1]$ $Temp_{Tid\_C}[0]$ is set as current slice's Tid 2.7.1. Example PWL Model
Conceptually, piece-wise linear (PWL) is implemented in the following way:
Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2^{FP\_PREC-1})>>FP\_PREC)+c$$

where m is scalar, c is an offset, and FP_PREC is a constant value to specify the precision.
Note that the PWL model can be used to precompute the 1024-entry FwdLUT and InvLUT mapping tables; but the PWL model also allows implementations to calculate identical mapping values on-the-fly without pre-computing the LUTs.

2.7.2. Example Testing Model
2.7.2.1 Luma Reshaping
In some embodiments, testing model of the in-loop luma reshaping provides a lower complexity pipeline that also eliminates decoding latency for block-wise intra prediction in inter slice reconstruction. Intra prediction is performed in reshaped domain for both inter and intra slices.
Intra prediction is always performed in reshaped domain regardless of slice type. With such arrangement, intra prediction can start immediately after previous transform unit

TABLE 3

Syntax elements and associated binarizations

| Syntax structure | Syntax element | Binarization Process | Input parameters |
|---|---|---|---|
| coding_tree_unit ( ) | alf_ctb_flag[ ] [ ] [ ] | FL | cMax = 1 |
| | alf_use_new_filter_set | FL | cMax = 1 |
| | alf_used_fixed_filter | FL | cMax = 1 |
| | alf_fixed_filter_index | TB | cMax = 15 |
| | alf_temporal_index | TB | cMax = alf num available temporal filter sets luma − 1 |

TABLE 4

Assignment of ctxInc to syntax elements with context coded bins

| | binIdx | | | | | |
|---|---|---|---|---|---|---|
| Syntax element | 0 | 1 | 2 | 3 | 4 | >=5 |
| alf_use_new_filter_set | 0 | na | na | na | na | na |
| alf_used_fixed_filter | 0 | na | na | na | na | na |

2.7. Example In-Loop Reshaping (ILR)
The basic idea of in-loop reshaping (ILR) is to convert the original (in the first domain) signal (prediction/reconstruction signal) to a second domain (reshaped domain).
The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT [Y]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$).

Figure 5:
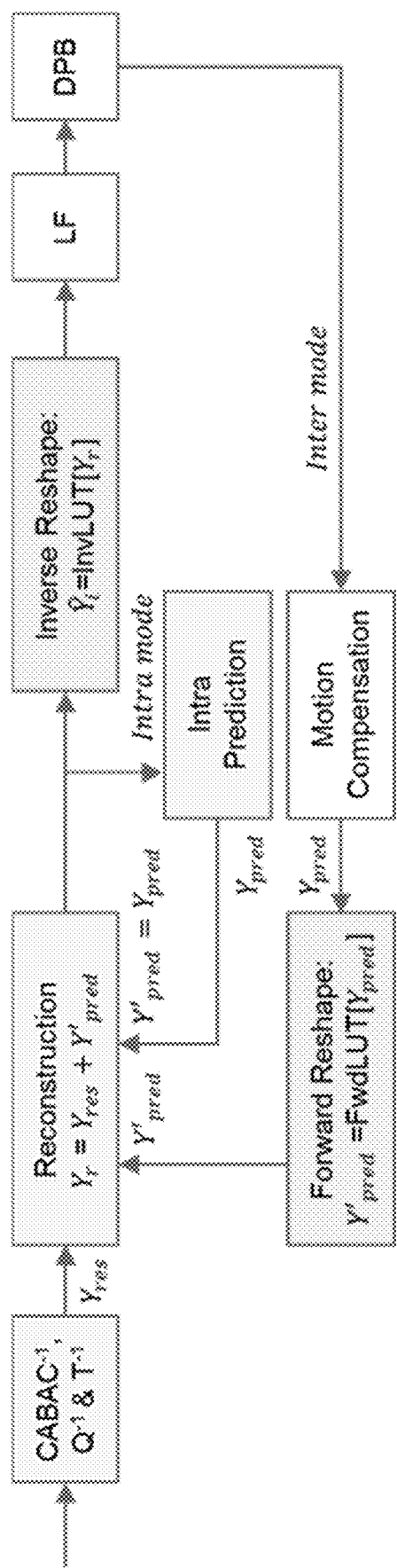
FIG. 5 shows an example decoder block diagram.

(TU) reconstruction is done. Such arrangement can also provide a unified process for intra mode instead of being slice dependent. FIG. 5 shows the block diagram of an example decoding process based on mode.
In some embodiments, 16-piece piece-wise linear (PWL) models can be tested for luma and chroma residue scaling instead of the 32-piece PWL models.
In some embodiments, inter slice reconstruction with in-loop luma reshaper can be implemented in the testing mode (light-green shaded blocks indicate signal in reshaped domain: luma residue; intra luma predicted; and intra luma reconstructed).

2.7.2.2. Luma-Dependent Chroma Residue Scaling
Luma-dependent chroma residue scaling is a multiplicative process implemented with fixed-point integer operation. It is a scaling process in which a scaling coefficient is derived based on reconsuctred luma samples. The scaling coefficient is then applied to a chroma residue (that is, chroma residue scaling). Chroma residue scaling compensates for luma signal interaction with the chroma signal. Chroma residue scaling is applied at the TU level. More specifically, the average value of the corresponding luma prediction block is utilized.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values.

2.7.3. Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:

(1) Current block is intra-coded.

(2) Current block is coded as current picture referencing (CPR, a.k.a., intra block copy(IBC)).

(3) Current block is coded as combined inter-intra mode (CIIP) and the forward reshaping is disabled for the intra prediction block.

2.7.4. Example signaling of ILR side information 2.7.4.1. Syntax Tables

LMCS APS: An APS that has aps_params_type equal to LMCS_APS.

7.3.2.3 Sequence Parameter Set RBSP Syntax

|  | Descriptor |
|---|---|
| seq_parameter_set_rbsp( ) { |  |
|   sps_decoding_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
|   gra_enabled_flag | u(1) |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_in_luma_samples | ue(v) |
|   pic_height_in_luma_samples | ue(v) |
| ... |  |
|   sps_lmcs_enabled_flag | u(1) |
|   sps_ladf_enabled_flag | u(1) |
|   if (sps_ladf_enabled_flag) { |  |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { |  |
|       sps_ladf_qp_offset[ i ] | se(v) |
|       sps_ladf_delta_threshold_minus1[ i ] | ue(v) |
|     } |  |
|   } |  |
| ... |  |
|   sps_extension_flag | u(1) |
|   if( sps_extension_flag ) |  |
|     while( more_rbsp_data( ) ) |  |
|       sps_extension_data_flag | u(1) |
|   rbsp_trailing_bits( ) |  |
| } |  |

7.3.2.5 Adaptation Parameter Set Syntax

|  | Descriptor |
|---|---|
| adaptation_parameter_set_rbsp( ) { |  |
|   adaptation_parameter_set_id | u(5) |
|   aps_params_type | u(3) |
|   if( aps_params_type = = ALF_APS ) |  |
|     alf_data( ) |  |
|   else if( aps_params_type = = LMCS_APS ) |  |
|     lmcs_data( ) |  |
|   aps_extension_flag | u(1) |
|   if( aps_extension_flag) |  |
|     while( more_rbsp_data( ) ) |  |
|       aps_extension_data_flag | u(1) |
|   rbsp_trailing_bits( ) |  |
| } |  |

7.3.5 Slice Header Syntax 7.3.5.1 General Slice Header Syntax

|  | Descriptor |
|---|---|
| slice_header( ) { |  |
|   slice_pic_parameter_set_id | ue(v) |
|   if( rect_slice_flag | | NumBricksInPic > 1 ) |  |
|     slice_address | u(v) |
|   if( !rect_slice_flag && !single_brick_per_slice_flag ) |  |
|     num_bricks_in_slice_minus1 | ue(v) |
|   slice_type | ue(v) |
|   if( NalUnitType == GRA_NUT ) |  |
|     recovery_poc_cnt | se(v) |
| ... |  |
|   if( pps_slice_chroma_qp_offsets_present_flag ) { |  |
|     slice_cb_qp_offset | se(v) |
|     slice_cr_qp_offset | se(v) |
|   } |  |
|   if( sps_sao_enabled_flag ) { |  |
|     slice_sao_luma_flag | u(1) |
|     if( ChromaArrayType != 0 ) |  |
|       slice_sao_chroma_flag | u(1) |
|   } |  |
|   if( sps_alf_enabled_flag ) { |  |
|     slice_alf_enabled_flag | u(1) |
|     if( slice_alf_enabled_flag ) { |  |
|       num_alf_aps_ids_minus1 | ue(v) |
|       for( i = 0; i <= num_alf_aps_ids_minus1; i++ ) |  |
|         slice_alf_aps_id[ i ] | u(5) |
|     } |  |
|   } |  |
|   dep_quant_enabled_flag | u(1) |
|   if( !dep_quant_enabled_flag ) |  |
|     sign_data_hiding_enabled_flag | u(1) |
|   if( deblocking_filter_override_enabled_flag ) |  |
|     deblocking_filter_override_flag | u(1) |
|   if( deblocking_filter_override_flag ) { |  |
|     slice_deblocking_filter_disabled_flag | u(1) |
|     if( !slice_deblocking_filter_disabled_flag ) { |  |
|       slice_beta_offset_div2 | se(v) |
|       slice_tc_offset_div2 | se(v) |
|     } |  |
|   } |  |
|   if( sps_lmcs_enabled_flag ) { |  |
|     slice_lmcs_enabled_flag | u(1) |
|     if( slice_lmcs_enabled_flag) { |  |
|       slice_lmcs_aps_id |  |
|       if( !( qtbtt_dual_tree_intra_flag && slice_type = = I ) ) |  |
|         slice_chroma_residual_scale_flag | u(1) |
|     } |  |
|   } |  |
|   if (entropy_coding_sync_enabled_flag) |  |
|     num_entry_point_offsets | ue(v) |
|   if( NumEntryPoints > 0 ){ |  |
|     offset_len_minus1 | ue(v) |
|     for( i = 0; i < NumEntryPoints; i++ ) |  |
|       entry_point_offset_minus1[ i ] | u(v) |
|   } |  |
|   byte_alignment( ) |  |
| } |  |

7.3.5.4 Luma Mapping with Chroma Scaling Data Syntax

| | Descriptor |
|---|---|
| lmcs_data ( ) { | |
|   lmcs min bin idx | ue(v) |
|   lmcs_delta_max_bin_idx | ue(v) |
|   lmcs delta cw prec minus1 | ue(v) |
|   for ( i = lmcs_min_bin_idx; i <= LmcsMaxBinIdx; i++ ) { | |
|     lmcs delta abs cw[ i ] | u(v) |
|     if ( lmcs_delta_abs_cw[ i ] ) > 0 ) | — |
|       lmcs_delta_sign_cw_flag[ i ] | u(1) |
|   } | |
| } | |

2.7.4.2. Semantics sps_lmcs_enabled_flag equal to 1 specifies that luma mapping with chroma scaling is used in the CVS. sps_lmcs_enabled_flag equal to 0 specifies that luma mapping with chroma scaling is not used in the CVS.
Adaptation Parameter Set Semantics adaptation_parameter_set_id provides an identifier for the APS for reference by other syntax elements. APSs can be shared across pictures and can be different in different slices within a picture.

aps_params_type specifies the type of APS parameters carried in the APS as specified in Table 5.

TABLE 5

APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2 . . . 7 | Reserved | Reserved | slice_lmcs_enabled_flag equal to 1 specifies that luma mappin with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.

slice_lmcs_aps_id specifies the adaptation_parameter_set_id of the LMCS APS that the slice refers to. The TemporalId of the LMCS APS NAL unit having adaptation_parameter_set_id equal to slice_lmcs_aps_id shall be less than or equal to the TemporalId of the coded slice NAL unit.

When multiple LMCS APSs with the same value of adaptation_parameter_set_id are referred to by two or more slices of the same picture, the multiple LMCS APSs with the same value of adaptation_parameter_set_id shall have the same content.

7.4.6.4 Luma Mapping with Chroma Scaling Data Semantics lmcs_min_bin_idx specifies the minimum bin index used in the luma mapping with chroma scaling construction process. The value of lmcs_min_bin_idx shall be in the range of 0 to 15, inclusive.

lmcs_delta_max_bin_idx specifies the delta value between 15 and the maximum bin index LmcsMaxBinIdx used in the luma mapping with chroma scaling construction process. The value of lmcs_delta_max_bin_idx shall be in the range of 0 to 15, inclusive. The value of LmcsMaxBinIdx is set equal to 15−lmcs_delta_max_bin_idx. The value of LmcsMaxBinIdx shall be larger than or equal to lmcs_min_bin_idx.

lmcs_delta_cw_prec_minus1 plus 1 specifies the number of bits used for the representation of the syntax lmcs_delta_abs_cw[i]. The value of lmcs_delta_cw_prec_minus1 shall be in the range of 0 to BitDepthY−2, inclusive.

lmcs_delta_abs_cw[i] specifies the absolute delta codeword value for the ith bin.

lmcs_delta_sign_cw_flag[i] specifies the sign of the variable lmcsDeltaCW[i] as follows:

If lmcs_delta_sign_cw_flag[i] is equal to 0, lmcsDeltaCW [i] is a positive value.

Otherwise (lmcs_delta_sign_cw_flag[i] is not equal to 0), lmcsDeltaCW[i] is a negative value.

When lmcs_delta_sign_cw_flag[i] is not present, it is inferred to be equal to 0.

The variable OrgCW is derived as follows:

OrgCW = (1 << BitDepth$_Y$) / 16    (7-77)

The variable lmcsDeltaCW[ i ], with i = lmcs_min_bin_idx.. LmcsMaxBinIdx, is derived as follows:

lmcsDeltaCW[ i ] = (1 − 2 * lmcs_delta_sign_cw_flag    (7-78)
[ i ]) * lmcs_delta_abs_cw[ i ]

The variable lmcsCW[ i ] is derived as follows:
- For i = 0.. lmcs_min_bin_idx − 1, lmcsCW[ i ] is set equal 0.
- For i = lmcs_min_bin_idx..LmcsMaxBinIdx, the following applies:
  lmcsCW[ i ] = OrgCW + lmcsDeltaCW[ i ]    (7-79)
  The value of lmcsCW[ i ] shall be in the range of
  (OrgCW>>3) to (OrgCW<<3 − 1), inclusive.
- For i = LmcsMaxBinIdx + 1..15, lmcsCW[ i ] is set equal 0.
It is a requirement of bitstream conformance
that the following condition is true:
  $\Sigma_{i=0}^{15}$ lmcsCW [ i ] <= (1 << BitDepth$_Y$) − 1    (7-80)
The variable InputPivot[ i ], with i = 0..16, is
derived as follows:
  InputPivot[ i ] = i * OrgCW    (7-81)

The variable LmcsPivot[ i ] with i = 0..16, the variables
ScaleCoeff[ i ] and InvScaleCoeff[ i ] with i = 0..15,
are derived as follows:
  LmcsPivot[ 0 ] = 0;
  for( i = 0; i <= 15; i++) {
    LmcsPivot[ i + 1 ] = LmcsPivot[ i ] + lmcsCW[ i ]
    ScaleCoeff[ i ] = ( lmcsCW[ i ] * (1 << 14) + (1 <<
    (Log2(OrgCW) − 1))) >> (Log2(OrgCW))    (7-82)
    if ( lmcsCW[ i ] == 0 )
      InvScaleCoeff[ i ] = 0
    else
      InvScaleCoeff[ i ] = OrgCW * (1 << 14) / lmcsCW[ i ]
  }

The variable ChromaScaleCoeff[i], with i=0 . . . 15, is derived as follows:

chromaResidualScaleLut[ ] = {16384, 16384, 16384, 16384,
  16384, 16384, 16384, 8192, 8192, 8192, 8192, 5461,
    5461, 5461, 5461, 4096, 4096, 4096, 4096, 3277,
    3277, 3277, 3277, 2731, 2731, 2731, 2731, 2341, 2341,
    2341, 2048, 2048, 2048, 1820, 1820, 1820, 1638, 1638,
    1638, 1638, 1489, 1489, 1489, 1489, 1365, 1365,
    1365, 1365, 1260, 1260, 1260, 1260, 1170, 1170, 1170,
      1170, 1092, 1092, 1092, 1092, 1024, 1024, 1024, 1024 }
if ( lmcsCW[ i ] == 0 )
  ChromaScaleCoeff[ i ] = (1 << 11)
else {
  binCW = BitDepth$_Y$ > 10 ? ( lmcsCW[ i ] >>    (7-83)
  (BitDepth$_Y$ − 10 ) ) :
  BitDepth$_Y$ < 10 ? ( lmcsCW[ i ] << (10 −
  BitDepth$_Y$) ) : lmcsCW[ i ]
  ChromaScaleCoeff[ i ] = chromaResidualScaleLut
  [ Clip3( 1, 64, binCW >> 1 ) − 1 ]
}

The variables ClipRange, LmcsMinVal, and
LmcsMaxVal are derived as follows:

ClipRange = (( lmcs_min_bin_idx > 0 ) &&    (7-84)
    ( LmcsMaxBinIdx < 15 )
    LmcsMinVal = 16 << ($BitDepth_Y$ − 8)    (7-85)
    LmcsMaxVal = 235 << ($BitDepth_Y$ − 8)    (7-86)
    NOTE - Arrays InputPivot[ i ] and LmcsPivot[ i ],
ScaleCoeff[ i ], and InvScaleCoeff[ i ],
ChromaScaleCoeff[ i ], ClipRange, LmcsMinVal
and LmcsMaxVal, are updated only when
slice_lmcs_model_present_flag is equal to 1. Thus, the
lmcs model may be sent with an IRAP picture, for
example, but lmcs is disabled for that IRAP picture.

2.8. Example Joint Coding of Chrominance Residuals

This test measures performance of example joint Cb-Cr coding mode in which only the joint residual is coded.

If chrominance reshaper is active, reshaping is applied to the received residual identically to what is done in separate coding modes (that is, the joint residual signal is reshaped). On the encoder side the average of positive Cb residual and negative Cr residual are used as the joint residual when testing this mode:

resJoint=(resCb−resCr)/2

One bin indicator is signaled in the bitstream to enable the mode. In the case the mode is enabled a joint residual signal is coded in the bitstream. On the decoder side the joint residual is used for Cb component and a negative version of the residual is applied for Cr.

Signaling of the mode is expected to follow the syntax and semantics given below:

| | Descriptor |
|---|---|
| residual_coding( x0, y0, log2TbWidth, log2TbHeight, cIdx ) { | |
|   if( cIdx = 2 && tu_cbf_cb[ x0 ][ y0 ] ) { | |
|     tu_cb_cr_joint_residual[ x0 ][ y0 ] | ae(v) |
|     if( tu_cb _cr_joint_residual[ x0 ][ y0 ] ) { | |
|       return | |
|   } | |
| ... | | tu_cb_cr_joint_residual[x0][y0] specifies whether indicated Cb residual is used to derive both Cb and Cr residuals. The array indices x0, y0 specify the location (x0, y0) of the top-left luma sample of the considered transform block relative to the top-left luma sample of the picture.

7.3.2.2 Picture Parameter Set RBSP Syntax

| | Descriptor |
|---|---|
| pic_parameter_set_rbsp( ) { | |
| ... | |
|   pps_cb_qp_offset | se(v) |
|   pps_cr_qp_offset | se(v) |
|   pps_joint_cbcr_qp_offset | se(v) |
| ... | |
| } | |

7.3.4.1 General Tile Group Header Syntax

| | Descriptor |
|---|---|
| tile_group_header( ) { | |
| ... | |
|   if( pps_tile_group_chroma_qp_offsets_present_flag ) { | |
|     tile_group_cb_qp_offset | se(v) |
|     tile_group_cr_qp_offset | se(v) |
|     tile_group_joint_cbcr_up_offset | se(v) |
|   } | |
| ... | |
| } | |

7.3.6.12 Residual Coding Syntax

| | Descriptor |
|---|---|
| residual_coding( x0, y0, log2TbWidth, log2TbHeight, cIdx ) { | |
|   if( cIdx = 2 && tu_cbf_cb[ x0 ][ y0 ] ) { | |
|     tu_joint_cbcr_residual[ x0 ][ y0 ] | ae(v) |
|     if( tu_joint_cbcr_residual [ x0 ][ y0 ] ) { | |
|       return | |
|   } | |
| ... | |
| } | |

2.9. Reduced Secondary Transform

Figure 6:
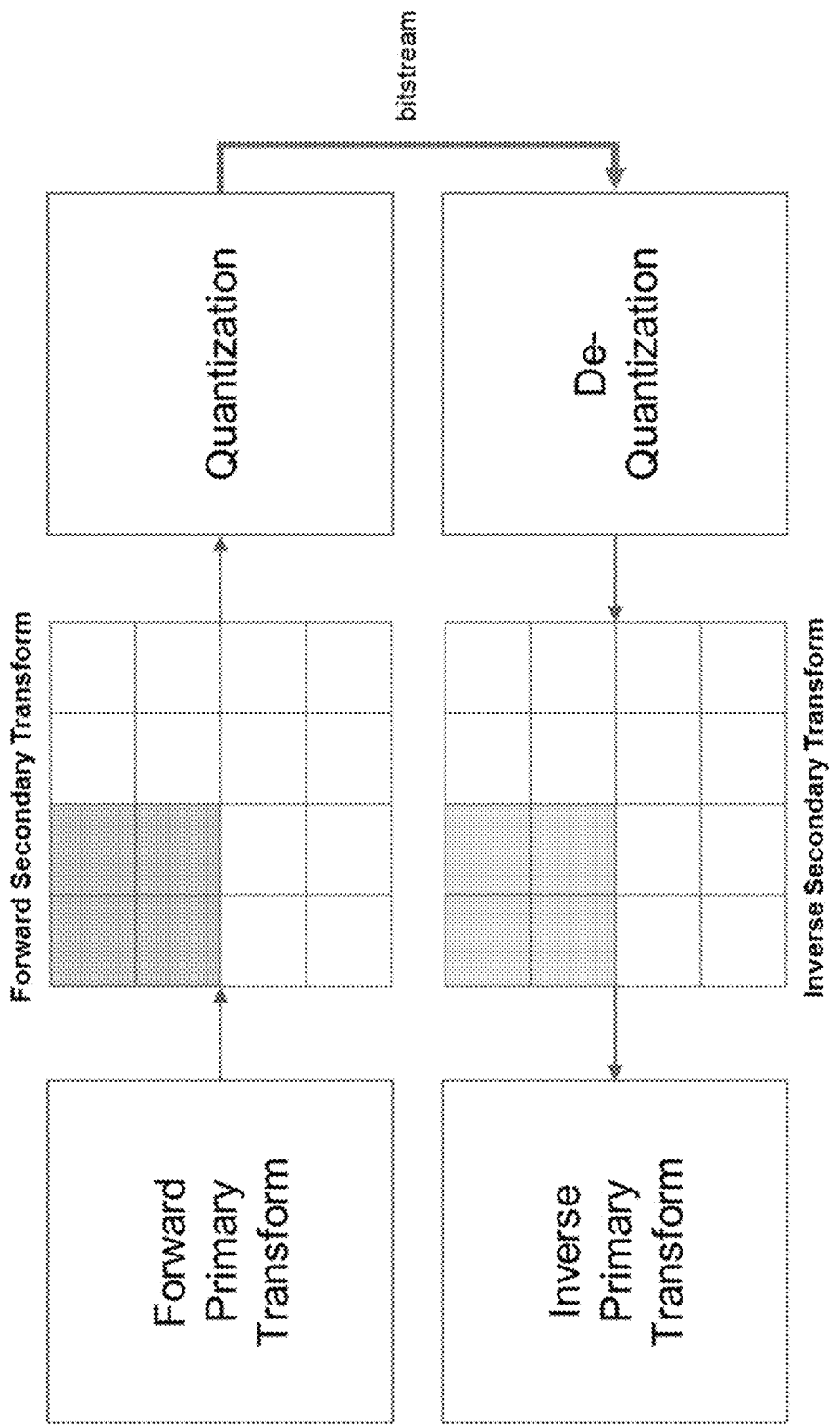
FIG. 6 shows examples of secondary transforms.

In JEM, secondary transform is applied between forward primary transform and quantization (at encoder) and between de-quantization and inverse primary transform (at decoder side). As shown in FIG. 6, 4×4 (or 8×8) secondary transform is performed depends on block size. For example, 4×4 secondary transform is applied for small blocks (e.g., min (width, height)<8) and 8×8 secondary transform is applied for larger blocks (e.g., min (width, height)>4) per 8×8 block.

For the secondary transforms, non-separable transforms are applied, therefore, it is also named as Non-Separable Secondary Transform (NSST). There are totally 35 transform sets and 3 non-separable transform matrices (kernels, each one with 16×16 matrix) per transform set are used.

The Reduced Secondary Transform (RST) and 4 transform sets (instead of 35 transform sets) mapping according to intra prediction direction can be used in some embodiments. In some cases, 16×48 and 16×16 matrices are employed for 8×8 and 4×4 blocks, respectively. For notational convenience, 16×48 transform is denoted as RST8×8 and the 16×16 one as RST4×4. Such a method was recently adopted by VVC.

Figure 7:
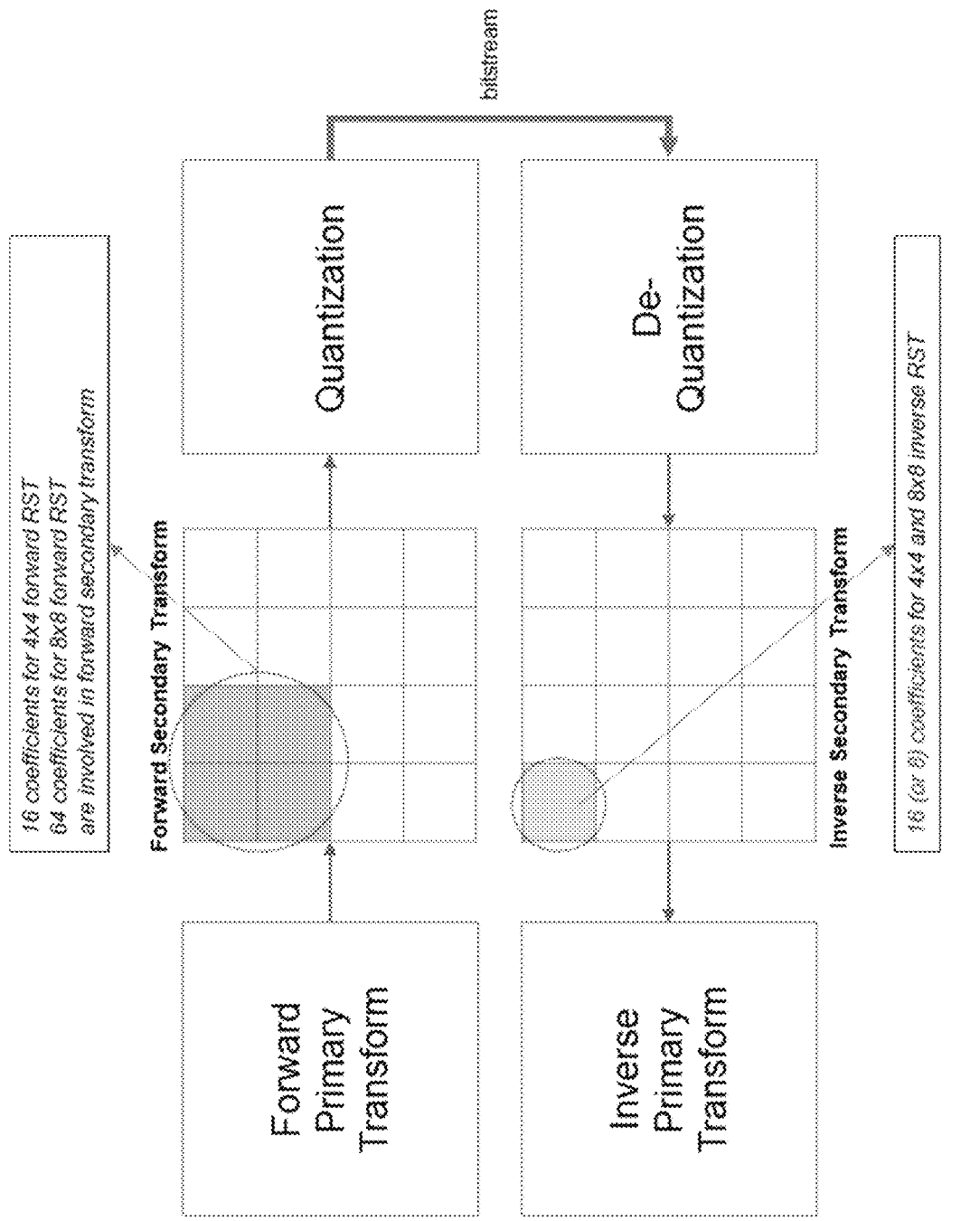
FIG. 7 shows an example of a reduced secondary transform (RST).

FIG. 7 shows an example of reduced secondary transform (RST). Secondary forward and inverse transforms are a separate process step from that of primary transforms.

For encoder, the primary forward transform is performed first, then followed by secondary forward transform and quantization, and CABAC bit encoding. For decoder, CABAC bit decoding and inverse quantization, then Secondary inverse transform is performed first, then followed by primary inverse transform.

RST applies only to intra coded TUs.

2.9.1. Syntax and Semantics
7.3.2.1 Sequence Parameter Set RBSP Syntax

|  | Descriptor |
|---|---|
| seq_parameter_set_rbsp( ) { | |
| ...... | |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
| ...... | |
|   sps_st_enabled_flag | u(1) |
| ...... | |
| } | |

7.3.6.11 Residual Coding Syntax

|  | Descriptor |
|---|---|
| residual_coding( x0, y0, log2TbWidth, log2TbHeight, cIdx ) { | |
|   if  (      ( tu_mts_idx[ x0 ] [ y0 ] > 0               \|\| | |
|     ( cu_sbt_flag && log2Tb Width < 6 && log2TbHeight < 6 )    ) | |
|     && cIdx = = 0 && log2TbWidth > 4 ) | |
|     log2TbWidth = 4 | |
|   else | |
|     log2TbWidth = Min( log2TbWidth, 5 ) | |
|   if(                tu_mts_idx[ x0 ] [ y0 ] > 0               \|\| | |
|     ( cu_sbt_flag && log2TbWidth < 6 && log2TbHeight < 6 )    ) | |
|     && cIdx = = 0 && log2TbHeight > 4 ) | |
|     log2TbHeight = 4 | |
|   else | |
|     log2TbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbW = ( Min( log2TbWidth, log2TbHeight) < 2 ? 1 : 2 ) | |
|   log2SbH = log2SbW | |
|   if ( log2TbWidth < 2 && cIdx = = 0 ) { | |
|     log2SbW = log2TbWidth | |
|     log2SbH = 4 − log2SbW | |
|   } else if (log2TbHeight < 2 && cIdx = = 0 ) { | |
|     log2SbH = log2TbHeight | |
|     log2SbW = 4 − log2SbH | |
|   } | |
|   numSbCoeff = 1 << ( log2SbW + log2SbH ) | |
|   lastScanPos = numSbCoeff | |
|   lastSubBlock = ( 1 << ( log2TbWidth + log2TbHeight − (log2SbW + log2SbH))) − 1 | |
|   do { | |
|     if( lastScanPos = = 0 ) { | |
|       lastScanPos = numSbCoeff | |
|       lastSubBlock− − | |
|     } | |
|     lastScanPos− − | |
|     xS    =        DiagScanOrder[ log2TbWidth − log2SbW ][ log2TbHeight − log2SbH ] | |
|         [ lastSubBlock ] [ 0 ] | |
|     yS    =        DiagScanOrder[ log2Tb Width − log2SbW ][ log2TbHeight − log2SbH ] | |
|         [ lastSubBlock ] [ 1 ] | |
|     xC = ( xS << log2SbW ) + DiagScanOrder[ log2SbW ][ log2SbH ][ lastScanPos ] [ 0 ] | |
|     yC = (yS << log2SbH) + DiagScanOrder[ log2SbW ][ log2SbH ][ lastScanPos ] [ 1 ] | |
|   } while( ( xC != LastSignificantCoeffX) \|\| (yC != LastSignificantCoeffY ) ) | |
|   QState = 0 | |
|   for( i = lastSubBlock; i >= 0; i− − ) { | |
|     startQStateSb = QState | |
|     xS    =        DiagScanOrder[ log2Tb Width − log2SbW ][ log2TbHeight − log2SbH ] | |
|         [ lastSubBlock ] [ 0 ] | |
|     yS    =        DiagScanOrder[ log2Tb Width − log2SbW ][ log2TbHeight − log2SbH ] | |
|         [ lastSubBlock ] [ 1 ] | |

| | Descriptor |
|---|---|
| ```
        inferSbDcSigCoeffFlag = 0
        if( ( i < lastSubBlock ) && ( i > 0 ) ) {
            coded_sub_block_flag[ xS ] [ yS ]
            inferSbDcSigCoeffFlag = 1
        }
        firstSigScanPosSb = numSbCoeff
        lastSigScanPosSb = −1
        remBinsPass1 = ( ( log2SbW + log2SbH ) < 4 ? 8 : 32 )
        firstPosMode0 = ( i = = lastSubBlock ? lastScanPos : numSbCoeff − 1 )
        firstPosMode1 = −1
        for( n = firstPosMode0; n >= 0 && remBinsPass1 >= 4; n− − ) {
            xC = ( xS << log2SbW ) + DiagScanOrder[ log2SbW ][ log2SbH ] [ n ] [ 0 ]
            yC = (yS << log2SbH ) + DiagScanOrder[ log2SbW ][ log2SbH ] [ n ] [ 1 ]
            if( coded_sub_block_flag[ xS ][yS ] && ( n > 0 | | !inferSbDcSigCoeffFlag ) &&
                ( xC != LastSignificantCoeffX | | yC != Last SignificantCoeffY ) ) {
                sig_coeff_flag[ xC ] [ yC ]
                remBinsPass1− −
                if( sig_coeff_flag[ xC ] [ yC ] )
                    inferSbDcSigCoeffFlag = 0
            }
            if( sig_coeff_flag[ xC ] [ yC ] ) {
                    if{ transform_skip_flag[ x0 ][ y0 ] ) {
                numSigCoeff++
                        if( ( ( ( log2TbWidth = = 2 && log2Tb Height == 2) | | ( log2Tb Width == 3 &&
                            log2TbHeight == 3 ) ) && n >= 8 && i == 0) | | (( log2Tb Width >= 3 &&
                            log2TbHeight >= 3 && ( i = =1 | | i == 2 ) ) ) ) {
                            numZeroOutSigCoeff++
                        }
                    }
                abs_level_gt1_flag[ n ]
                remBinsPass1 − −
                if( abs_level_gt1_flag[ n ] ) {
                    par_level_flag[ n ]
                    remBinsPass1− −
                    abs_level_gt3_flag[ n ]
                    remBinsPass1 − −
                }
                if( lastSigScanPosSb = = −1 )
                    lastSigScanPosSb = n
                firstSigScanPosSb = n
            }
            AbsLevelPass[ xC ][yC ] = sig_coeff_flag[ xC ] [ yC ] + par_level_flag[ n ] +
                            abs_level_gt1_flag[ n ] + 2 * abs_level_gt3_flag[ n ]
            if( dep_quant_enabled_flag )
                QState = QStateTransTable[ QState ][ AbsLevelPassl[ xC ][ yC ] & 1 ]
            if( remBinsPass1 < 4 )
                firstPosMode1 = n − 1
        }
        for( n = numSbCoeff − 1; n >= firstPosMode1; n− − ) {
            xC = ( xS << log2SbW ) + DiagScanOrder[ log2SbW ][ log2SbH ][ n ][ 0 ]
            yC = ( yS << log2SbH ) + DiagScanOrder[ log2SbW ][ log2SbH ][ n ][ 1 ]
            if( abs_level_gt3_flag[ n ] )
                abs_remainder[ n ]
            AbsLevel [ xC ][ yC ] = AbsLevelPass 1 [ xC ][ yC ] +2 * abs_remainder[ n ]
        }
...
            }
          }
        }
      }
    }
  }
}
``` | ae(v)<br><br><br><br><br><br><br><br><br><br>ae(v)<br><br><br><br><br><br><br><br><br>ae(v)<br><br><br>ae(v)<br><br>ae(v)<br><br>ae(v)<br><br><br><br><br><br><br><br><br><br><br><br><br><br><br><br>ae(v) |

7.3.6.5 Coding Unit Syntax

| | Descriptor |
|---|---|
| ```
coding_unit( x0, y0, cbWidth, cbHeight, treeType ) {
    if( tile_group_type != I | | sps_ibc_enabled_flag ) {
        if( treeType != DUAL_TREE_CHROMA )
            cu_skip_flag[ x0 ] [ y0 ]
        if( cu_skip_flag[ x0 ][ y0 ] = = 0 && tile_group_type != I )
            pred_mode_flag
``` | <br><br><br>ae(v)<br><br>ae(v) |

|  | Descriptor |
|---|---|
| ```
    if( ( ( tile_group_type = = 1 && cu_skip_flag[ x0 ] [ y0 ] = =0 )     | |
       ( tile group type != I && CuPredMode[ x0 ][ y0 ] != MODE INTRA ) ) &&
       sps_ibc_enabled_flag )
       pred_mode_ibc_flag
  }
...
  if( !pcm_flag[ x0 ] [ y0 ] ) {
    if( CuPredMode[ x0 ][ y0 ] != MODE_INTRA && merge_flag[ x0 ] [ y0 ] = = 0 )
      cu_cbf
    if( cu_cbf) {
      if( CuPredMode x0 ][ y0 ] = = MODE_INTER && sps_sbt_enabled_flag &&
         !ciip_flag[ x0 ][y0 ] ) {
        if( cbWidth <= MaxSbtSize && cbHeight <= MaxSbtSize ) {
          allowSbtVerH = cbWidth >= 8
          allowSbtVerQ = cbWidth >= 16
          allowSbtHorH = cbHeight >= 8
          allowSbtHorQ = cbHeight >= 16
          if( allowSbtVerH | | allowSbtHorH | |allowSbtVerQ | | allowSbtHorQ )
            cu_sbt_flag
        }
        if( cu_sbt_flag ) {
          if( ( allowSbtVerH | | allowSbtHorH ) && ( allowSbtVerQ | | allowSbtHorQ) )
            cu_sbt_quad_flag
          if( ( cu_sbt_quad_flag && allowSbtVerQ && allowSbtHorQ )     | |
             ( !cu_sbt_quad_flag && allowSbtVerH && allowSbtHorH ) )
            cu_sbt_horizontal_flag
          cu_sbt_pos_flag
        }
      }
      numZeroQutSigCoeff = 0
      transform_tree( x0, y0, cbWidth, cbHeight, treeType )
      if( Min( cbWidth, cbHeight ) >= 4 && sps st enabled flag == 1 &&
         CuPredMode[ x0 ][ y0 ] = = MODE_INTRA
         && IntraSubPartitionsSplitType == ISP_NO_SPLIT ) {
        if( ( numSigCoeff > ( (treeType = SINGLE_TREE ) ? 2 : 1 ) ) &&
           numZeroQutSigCoeff == 0 ) {
          st_idx[ x0 ][ y0 ]
        }
      }
    }
  }
}
``` | ae(v)<br><br><br><br>ae(v)<br><br><br><br><br><br><br><br><br><br>ae(v)<br><br><br><br>ae(v)<br><br><br>ae(v)<br>ae(v)<br><br><br><br><br><br><br><br><br>ae(v) |

7.4.3.1 Sequence Parameter Set RBSP Semantics sps_st_enabled_flag equal to 1 specifies that st_idx may be present in the residual coding syntax for intra coding units. sps_st_enabled_flag equal to 0 specifies that st_idx is not present in the residual coding syntax for intra coding units.

7.4.7.5 Coding Unit Semantics st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture.

When st_idx[x0][y0] is not present, st_idx[x0][y0] is inferred to be equal to 0.

2.10. Support of Various Color Formats in VVC 2.10.1. Syntax, Semantics and Decoding Process 7.3.2.3 Sequence Parameter Set RBSP Syntax

|  | Descriptor |
|---|---|
| ```
seq_parameter_set_rbsp( ) {
  sps_decoding_parameter_set_id
  sps_max_sub_layers_minus1
  sps_reserved_zero_5bits
  profile_tier_level( sps_max_sub_layers_minus1 )
  gra_enabled_flag
  sps_seq_parameter_set_id
  chroma_format_idc
  if( chroma_format_idc = = 3 )
    separate colour plane flag
  pic_width_in_luma_samples
  pic_height_in_luma_samples
  conformance_window_flag
  if( conformance_window_flag ) {
    conf_win_left_offset
    conf_win_right_offset
``` | <br>u(4)<br>u(3)<br>u(5)<br><br>u(1)<br>ue(v)<br>ue(v)<br><br>u(1)<br>ue(v)<br>ue(v)<br>u(1)<br><br>ue(v)<br>ue(v) |

-continued

| | Descriptor |
|---|---|
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++ ) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_niin_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
| ... | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | | chroma_format_idc specifies the chroma sampling relative to the luma sampling as specified in clause 6.2. The value of chroma_format_idc shall be in the range of 0 to 3, inclusive.

separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:

If separate_colour_plane_flag is equal to 0, ChromaArrayType is set equal to chroma_format_idc.

Otherwise (separate_colour_plane_flag is equal to 1), ChromaArrayType is set equal to 0.

6.2 Source, Decoded and Output Picture Formats

This section specifies the relationship between source and decoded pictures that is given via the bitstream.

The video source that is represented by the bitstream is a sequence of pictures in decoding order.

The source and decoded pictures are each comprised of one or more sample arrays:

Luma (Y) only (monochrome).

Luma and two chroma (YCbCr or YCgCo).

Green, blue, and red (GBR, also known as RGB).

Arrays representing other unspecified monochrome or tri-stimulus colour samplings (for example, YZX, also known as XYZ).

For convenience of notation and terminology in this Specification, the variables and terms associated with these arrays are referred to as luma (or L or Y) and chroma, where the two chroma arrays are referred to as Cb and Cr; regardless of the actual colour representation method in use. The actual colour representation method in use can be indicated in syntax that is specified in Annex TBD.

The variables SubWidthC and SubHeightC are specified in Table 6, depending on the chroma format sampling structure, which is specified through chroma_format_idc and separate_colour_plane_flag. Other values of chroma_format_idc, SubWidthC and SubHeightC can be specified in the future by ITU-T|ISO/IEC.

TABLE 6

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:
  If separate_colour_plane_flag is equal to 0, each of the two chroma arrays has the same height and width as the luma array.
  Otherwise (separate_colour_plane_flag is equal to 1), the three colour planes are separately processed as monochrome sampled pictures.

The number of bits necessary for the representation of each of the samples in the luma and chroma arrays in a video sequence is in the range of 8 to 16, inclusive, and the number of bits used in the luma array may differ from the number of bits used in the chroma arrays.

Figure 8:
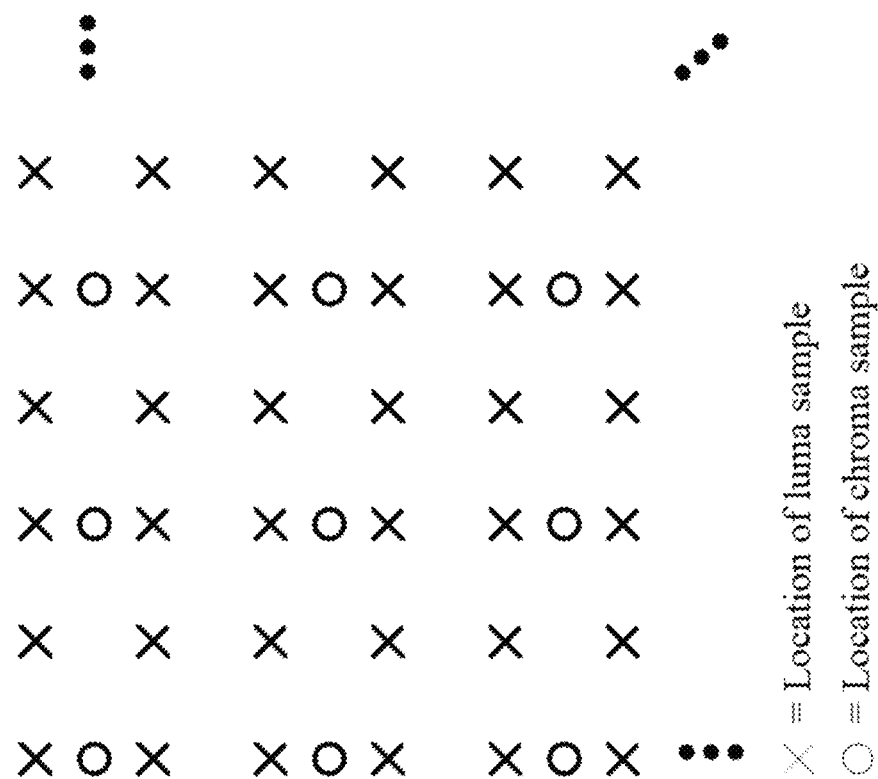
FIG. 8 shows examples of nominal locations of luma and chroma samples in a picture in a 4:2:0 format.

When the value of chroma_format_idc is equal to 1, the nominal vertical and horizontal relative locations of luma and chroma samples in pictures are shown in FIG. 8. Alternative chroma sample relative locations may be indicated in video usability information.

Figure 9:
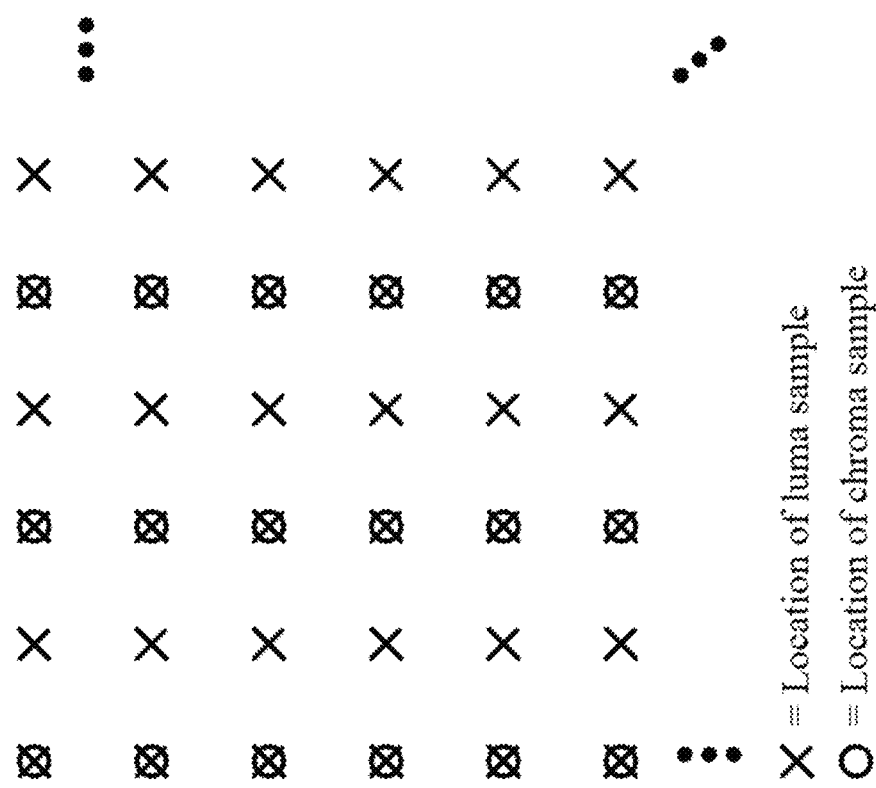
FIG. 9 shows examples of nominal locations of luma and chroma samples in a picture in a 4:2:2 format.

When the value of chroma_format_idc is equal to 2, the chroma samples are co-sited with the corresponding luma samples and the nominal locations in a picture are as shown in FIG. 9.

Figure 10:
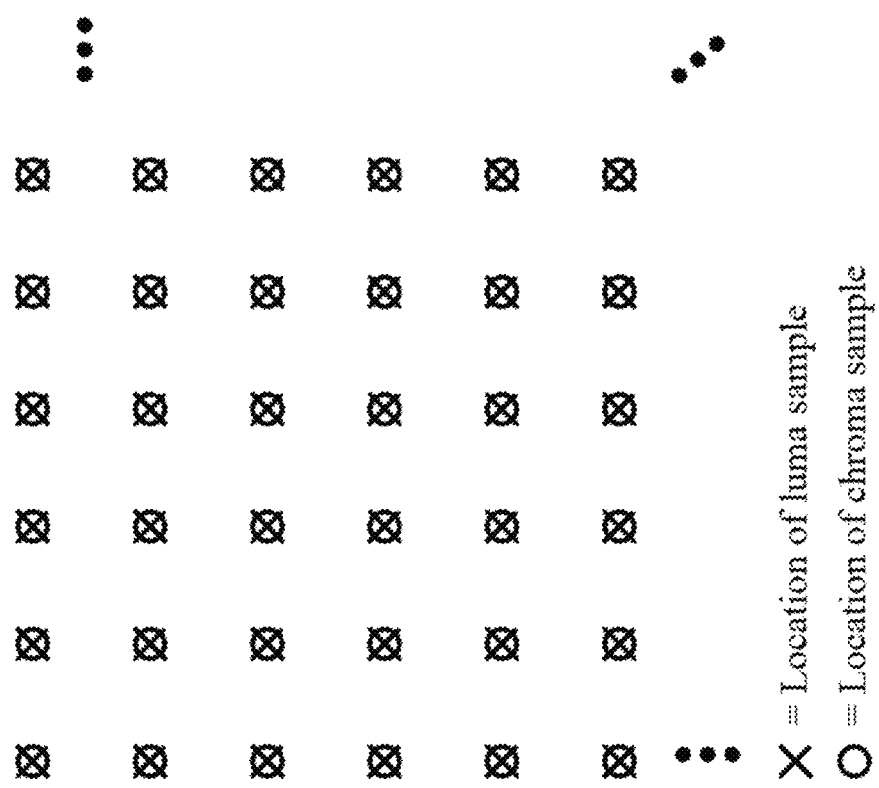
FIG. 10 shows examples of nominal locations of luma and chroma samples in a picture in a 4:4:4 format.
Figure 11:
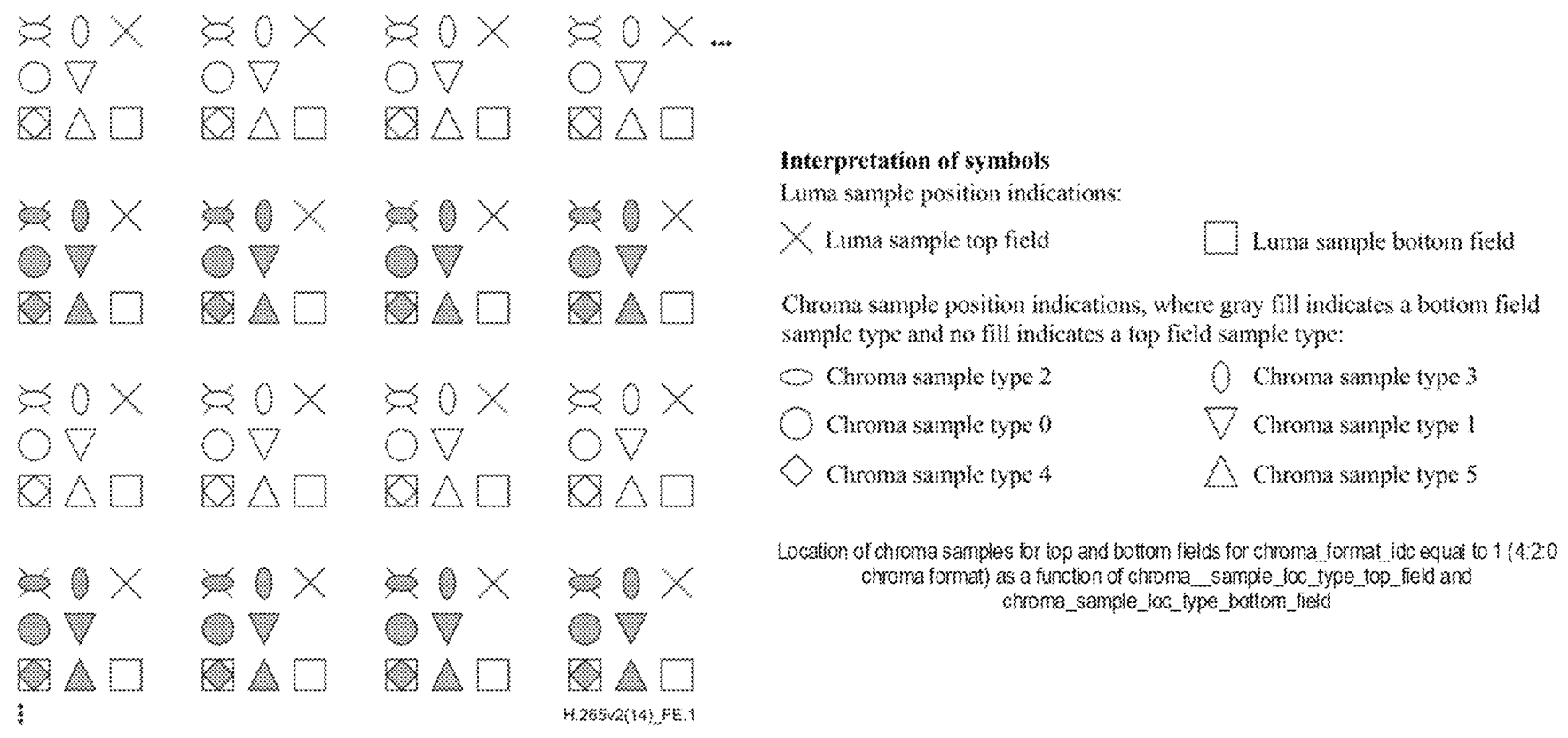

When the value of chroma_format_idc is equal to 3, all array samples are co-sited for all cases of pictures and the nominal locations in a picture are as shown in FIG. 10.
Annex E: Video Usability Information Even for the same chroma subsampling format, such as 4:2:0, there can be multiple different ways for the subsampling methods. Different types are marked in FIG. 11.

FIG. 12 illustrates the indicated relative position of the top-left chroma sample when chroma_format_idc is equal to 1 (4:2:0 chroma format), and chroma_sample_loc_type is equal to the value of a variable ChromaLocType. The region represented by the top-left 4:2:0 chroma sample (depicted as a large red square with a large red dot at its centre) is shown relative to the region represented by the top-left luma sample (depicted as a small black square with a small black dot at its centre). The regions represented by neighbouring luma samples are depicted as small grey squares with small grey dots at their centres.

Figure 13:
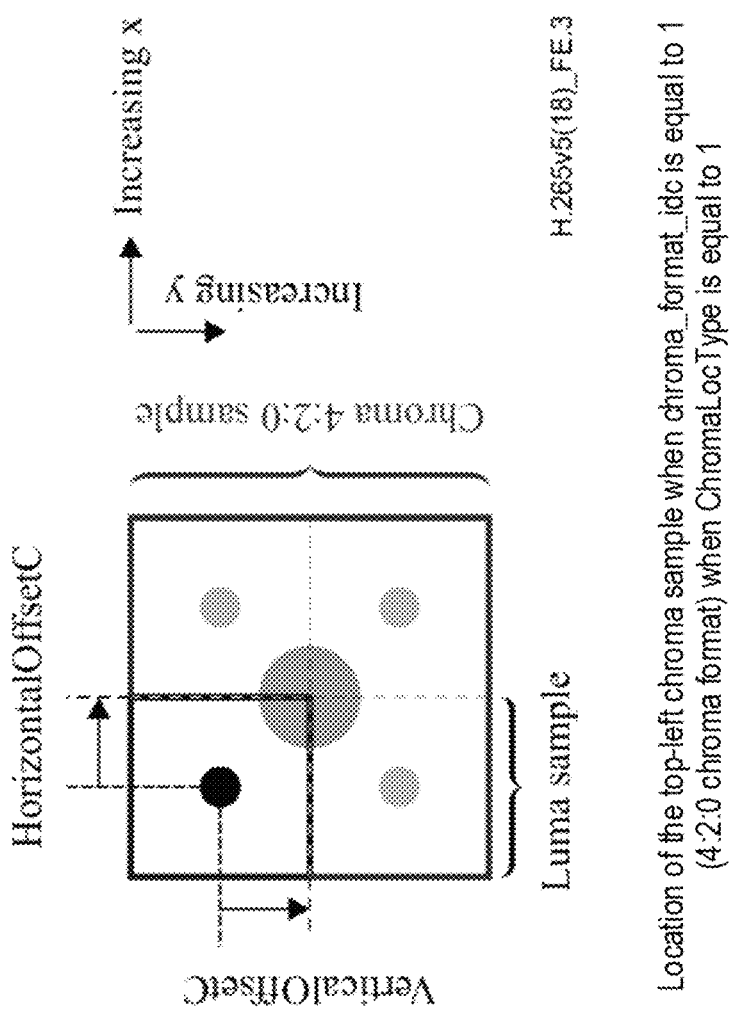
FIG. 13 shows another example relative position of the top-left chroma sample.

The relative spatial positioning of the chroma samples, as illustrated in FIG. 13, can be expressed by defining two variables HorizontalOffsetC and VerticalOffsetC as a function of chroma_format_idc and the variable ChromaLocType as given by Table 7, where HorizontalOffsetC is the horizontal (x) position of the centre of the top-left chroma sample relative to the centre of the top-left luma sample in units of luma samples and VerticalOffsetC is the vertical (y) position of the centre of the top-left chroma sample relative to the centre of the top-left luma sample in units of luma samples.

In a typical FIR filter design, when chroma_format_idc is equal to 1 (4:2:0 chroma format) or 2 (4:2:2 chroma format), HorizontalOffsetC and VerticalOffsetC would serve as the phase offsets for the horizontal and vertical filter operations, respectively, for separable downsampling from 4:4:4 chroma format to the chroma format indicated by chroma_format_idc.

TABLE 7

Definition of HorizontalOffsetC and VerticalOffsetC as a function of chroma_format_idc and ChromaLocType

| chroma_format_idc | ChromaLocType | HorizontalOffsetC | VerticalOffsetC |
|---|---|---|---|
| 1 (4:2:0) | 0 | 0 | 0.5 |
| 1 (4:2:0) | 1 | 0.5 | 0.5 |
| 1 (4:2:0) | 2 | 0 | 0 |
| 1 (4:2:0) | 3 | 0.5 | 0 |
| 1 (4:2:0) | 4 | 0 | 1 |
| 1 (4:2:0) | 5 | 0.5 | 1 |
| 2 (4:2:2) | — | 0 | 0 |
| 3 (4:4:4) | — | 0 | 0 |

When chroma_format_idc is equal to 1 (4:2:0 chroma format) and the decoded video content is intended for interpretation according to Rec. ITU-R BT.2020-2 or Rec. ITU-R BT.2100-1, chroma_loc_info_present_flag should be equal to 1, and chroma_sample_loc_type should be equal to 2.

2.11. Example Extended ALF

In some embodiments, the Non-Linear ALF concept can be extended. More precisely, some syntax elements can be added to enable the use of alternative ALF Luma filter sets and alternative Chroma filters, and to select them on a per filter, per CTU basis. For each CTU, if the ALF filtering is enabled on Luma component, an additional Luma filter set alternative index is signaled for each ALF Luma filter index. Similarly, for each CTU, for each Chroma component on which ALF filtering is enabled, an alternative Chroma filter index is signaled to select a given filter for the Chroma components.

2.12 Example Sub-Block Transform (SBT) in VVC

For an inter-predicted CU with cu_cbf (also known as cu_coded_flag) equal to 1, cu_sbt_flag may be signaled to indicate whether the whole residual block or a sub-part of the residual block is decoded. In the former case, inter multiple transform selection (MTS) information is further parsed to determine the transform type of the CU. In the latter case, a part of the residual block is coded with inferred adaptive transform and the other part of the residual block is zeroed out. The SBT is not applied to the combined inter-intra mode, since almost no coding gain is achieved.

2.12.1 Sub-Block TU Tiling

Figure 14:
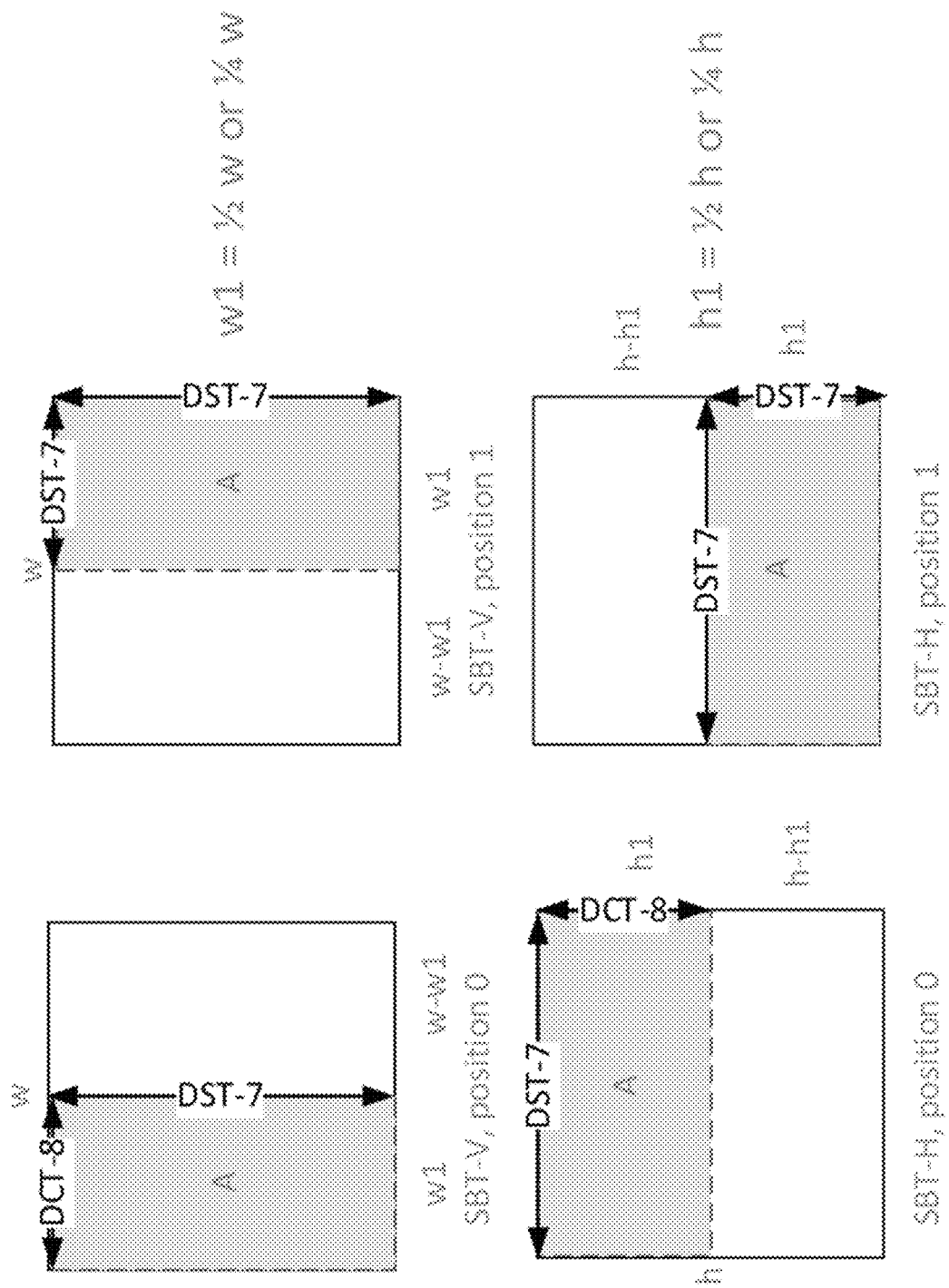
FIG. 14 shows examples of sub-block transform (SBT) modes, vertical SBT (SBT-V) and horizontal SBT (SBT-H).

When SBT is used for a inter CU, SBT type and SBT position information are further decoded from the bitstream. There are two SBT types and two SBT positions, as indicated in FIG. 14. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

Figure 15:
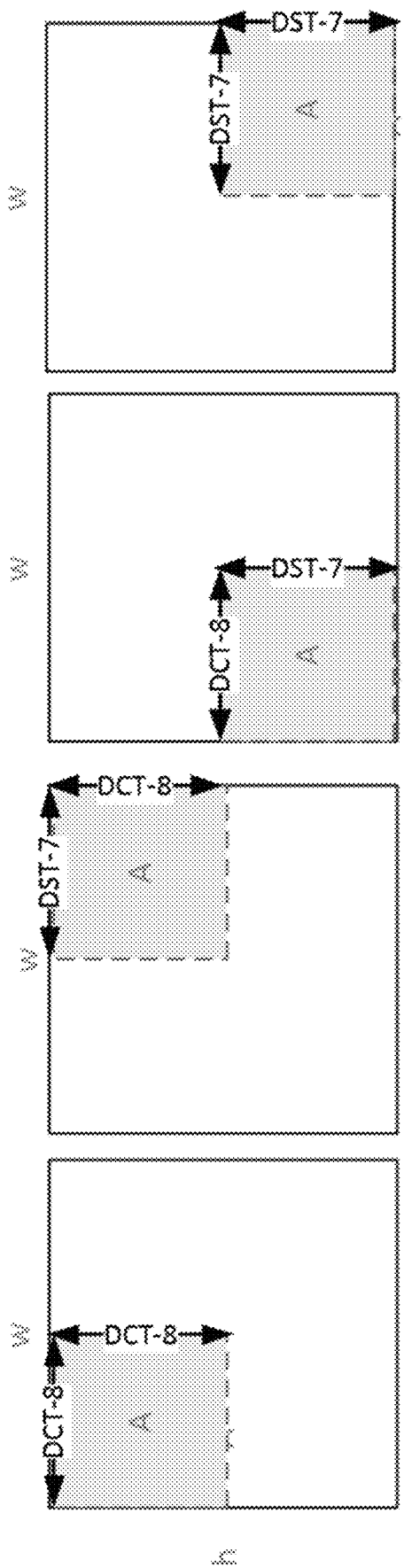
FIG. 15 shows examples of SBT mode, quad-tree SBT (SBT-Q).

Quad-tree (QT) split is further used to tile one CU into 4 sub-blocks, and still one sub-block has residual, as shown in FIG. 15. This SBT type is denoted as SBT-Q. This part was not adopted by VVC.

SBT-V, SBT-H and SBT-Q are allowed for CU with width and height both no larger than maxSbtSize. The maxSbtSize is signaled in the sequence parameter set (SPS). For High-Definition (HD) and Ultra HD (4K) sequences, maxSbtSize is set as 64 by encoder; for other smaller resolution sequences, maxSbtSize is set as 32.

2.12.2 Transform Type of the Sub-Block

Position-dependent transform is applied on luma transform blocks in SBT-V and SBT-H (chroma TB always using discrete cosine transform-2 (DCT-2). The two positions of SBT-H and SBT-V are associated with different core transforms. More specifically, the horizontal and vertical transforms for each SBT position is specified in FIG. 14. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf/coded flag, and horizontal and vertical transforms of a residual block, which may be considered a syntax shortcut for the cases that the major residual of a block is at one side of the block.

2.12.3 Sub-Block Transform in VVC

For an inter-predicted CU with cu_cbf (or cu_coded_flag) equal to 1, e.g., with at least one non-zero coefficient, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode, since almost no coding gain is achieved.

When SBT is used for a inter CU, SBT type and SBT position information are further decoded from the bitstream. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

Position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 14. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf/coded flag, and horizontal and vertical transforms of a residual block, which may be considered a syntax shortcut for the cases that the major residual of a block is at one side of the block.

7.3.4.6 Coding Unit Syntax

|  | Descriptor |
|---|---|
| coding_unit( x0, y0, cbWidth, cbHeight, treeType ) { | |
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|   ... | |
|   } else if( treeType != DUAL_TREE_CHROMA ) { /* MODE_INTER */ | |
|   ... | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf) { | |
|       if( CuPredMode[ x0 ][ y0 ] = = MODE_INTER && sps_sbt_enabled_flag && | |
|         !ciip_flag[ x0 ][y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |

-continued

| | Descriptor |
|---|---|
|       allowSbtHorQ = cbHeight >= 16<br>      if( allowSbtVerH \|\| allowSbtHorH \|\| allowSbtVerQ \|\| allowSbtHorQ )<br>        cu_sbt_flag<br>      }<br>      if( cu_sbt_flag ) {<br>        if( ( allowSbtVerH \|\| allowSbtHorH ) && (allowSbtVerQ \|\| allowSbtHorQ) )<br>          cu_sbt_quad_flag<br>        if( ( cu_sbt_quad_flag && allowSbtVerQ && allowSbtHorQ ) \|\|<br>          ( !cu_sbt_quad_flag && allowSbtVerH && allowSbtHorH ) )<br>          cu_sbt_horizontal_flag<br>        cu_sbt_pos_flag<br>      }<br>    }<br>    transform_tree( x0, y0, cbWidth, cbHeight, treeType )<br>  }<br>} | <br><br>ae(v)<br><br><br><br>ae(v)<br><br><br>ae(v)<br>ae(v) |

7.3.4.10 Transform Tree Syntax

| | Descriptor |
|---|---|
| transform_tree( x0, y0, tbWidth, tbHeight, treeType) {<br>  InferTuCbfLuma = 1<br>  if( IntraSubPartSplitType = = NO_ISP_SPLIT ) {<br>    if( tbWidth > MaxTbSizeY \|\| tbHeight > MaxTbSizeY ) {<br>      trafoWidth = ( tbWidth > MaxTbSizeY ) ? (tbWidth / 2) : tbWidth<br>      trafoHeight = ( tbHeight > MaxTbSizeY ) ? (tbHeight / 2) : tbHeight<br>      transform_tree( x0, y0, trafoWidth, trafoHeight )<br>      if( tbWidth > MaxTbSizeY )<br>        transform_tree( x0 + trafoWidth, y0, trafoWidth, trafoHeight, treeType )<br>      if( tbHeight > MaxTbSizeY )<br>        transform_tree( x0, y0 + trafoHeight, trafoWidth, trafoHeight, treeType )<br>      if( tbWidth > MaxTbSizeY && tbHeight > MaxTbSizeY )<br>        transform_tree( x0 + trafoWidth, y0 + trafoHeight, trafoWidth, trafoHeight, treeType )<br>    } else {<br>      transform_unit( x0, y0, tbWidth, tbHeight, treeType, 0 )<br>    }<br>  } else if( cu_sbt_flag ) {<br>    if( !cu_sbt_horizontal_flag ) {<br>      trafoWidth = tbWidth * SbtNumFourthsTb0 / 4<br>      transform_unit( x0, y0, trafoWidth, tbHeight, treeType , 0 )<br>      transform_unit( x0 + trafoWidth, y0, tbWidth − trafoWidth, tbHeight, treeType , 1 )<br>    } else {<br>      trafoHeight = tbHeight * SbtNumFourthsTb0 / 4<br>      transform_unit( x0, y0, tbWidth, trafoHeight, treeType , 0 )<br>      transform_unit( x0, y0 + trafoHeight, tbWidth, tbHeight − trafoHeight, treeType , 1 )<br>    }<br>  } else if( IntraSubPartitionsSplitType = = ISP_HOR_SPLIT ) {<br>    trafoHeight = tbHeight / NumIntraSubPartitions<br>    for( partIdx = 0; partIdx < NumIntraSubPartitions; partIdx++ )<br>      transform_unit( x0, y0 + trafoHeight * partIdx, tbWidth, trafoHeight, treeType, partIdx )<br>  } else if( IntraSubPartitionsSplitType = = ISP_VER_SPLIT ) {<br>    trafoWidth = tbWidth / NumIntraSubPartitions<br>    for( partIdx = 0; partIdx < NumIntraSubPartitions; partIdx++ )<br>      transform_unit( x0 + trafoWidth * partIdx, y0, trafoWidth, tbHeight, treeType, partIdx )<br>  }<br>} | |

7.3.4.11 Transform Unit Syntax

| | Descriptor |
|---|---|
| transform_unit( x0, y0, tbWidth, tbHeight, treeType, subTuIndex ) {<br>  if( treeType = = SINGLE_TREE \|\| treeType = = DUAL_TREE_LUMA ) {<br>    if( ( IntraSubPartitionsSplitType = = ISP_NO_SPLIT && !( cu_sbt_flag &&<br>      ( ( subTuIndex = = 0 && cu_sbt_pos_flag ) \|\|<br>      ( subTuIndex = = 1 && !cu_sbt_pos_flag ) ) ) ) \|\|<br>    ( IntraSubPartitionsSplitType != ISP_NO_SPLIT &&<br>    ( subTuIndex < NumIntraSubPartitions − 1 \|\| !InferTuCbfLuma ) ) )<br>    tu_cbf_luma[ x0 ][ y0 ] | <br><br><br><br><br><br><br>ae(v) |

```
        if (IntraSubPartitionsSplitType != ISP_NO_SPLIT )
            InferTuCbfLuma = InferTuCbfLuma && !tu_cbf_luma[ x0 ][ y0 ]
        }
        if( ( treeType = = SINGLE_TREE || treeType = = DUAL_TREE_CHROMA ) {
            if( ( IntraSubPartitionsSplitType = = ISP_NO_SPLIT && !(cu_sbt_flag &&
                ( ( subTuIndex = = 0 && cu_sbt_pos_flag ) ||
                    ( subTuIndex = = 1 && !cu_sbt_pos_flag ) ) ) ||
                ( IntraSubPartitionsSplitType != ISP_NO_SPLIT &&
                    ( subTuIndex = = NumIntraSubPartitions - 1 ) ) ) {
                tu_cbf_cb[ x0 ][ y0 ]                                                           ae(v)
                tu_cbf_cr[ x0 ][ y0 ]                                                           ae(v)
            }
        }
        if( IntraSubPartitionsSplitType != ISP_NO_SPLIT &&
            treeType = = SINGLE_TREE && subTuIndex = = NumIntraSubPartitions - 1 ) )
            xC = CbPosX[ x0 ][ y0 ]
            yC = CbPosY[ x0 ][ y0 ]
            wC = CbWidth[ x0 ][ y0 ] / 2
            hC = CbHeight[ x0 ][ y0 ] / 2
        } else
            xC = x0
            yC = y0
            wC = tbWidth / SubWidthC
            hC = tbHeight / SubHeightC
        }
        if( (tu_cbf_luma[ x0 ][ y0 ] || tu_cbf_cb[ x0 ][ y0 ] || tu_cbf_cr[ x0 ][ y0 ] ) &&
            treeType != DUAL_TREE_CHROMA ) {
            if( cu_qp_delta_enabled_flag && !IsCuQpDeltaCoded ) {
                cu_qp_delta_abs                                                                 ae(v)
                if( cu_qp_delta_abs )
                    cu_qp_delta_sign_flag                                                       ae(v)
            }
        }
        if( tu_cbf_luma[ x0 ][ y0 ] && treeType != DUAL_TREE_CHROMA
            && ( tbWidth <= 32 ) && ( tbHeight <= 32 )
            && (IntraSubPartitionsSplit[ x0 ][ y0 ] = = ISP_NO_SPLIT ) && ( !cu_sbt_flag ) ) {
            if( transform_skip_enabled_flag && tbWidth <= MaxTsSize && tbHeight <= MaxTsSize )
                transform_skip_flag[ x0 ][ y0 ]                                                 ae(v)
            if( (( CuPredMode[ x0 ][y0 ] = = MODE_INTER && sps_explicit_mts_inter-enabled_flag )
                || ( CuPredMode[ x0 ][ y0 ] = = MODE_INTRA && sps_explicit_mts_intra_enabled_flag ))
                && ( tbWidth <= 32 ) && ( tbHeight <= 32 ) && ( !transform_skip_flag[ x0 ][ y0 ] ) )
                tu_mts_idx[ x0 ][ y0 ]                                                          ae(v)
        }
        if( tu_cbf_luma[ x0 ][ y0 ] )
            residual_coding( x0, y0, Log2( tbWidth ), Log2( tbHeight ), 0 )
        if( tu_cbf_cb[ x0 ][ y0 ] )
            residual_coding( xC, yC, Log2( wC ), Log2( hC ), 1 )
        if( tu_cbf_cr[ x0 ][ y0 ] )
            residual_coding( xC, yC, Log2( wC ), Log2( hC ), 2 )
}
```

2.13 Intra Block Copy

Figure 18:
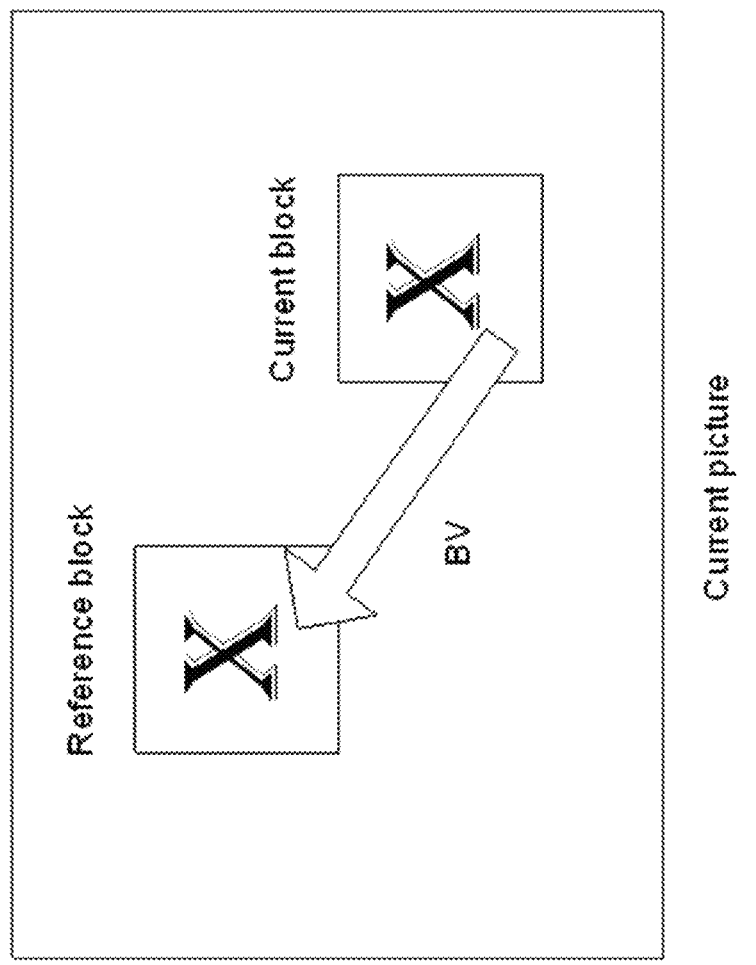
FIG. 18 is an illustration of intra block copy mode.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 18, which is an illustration of intra block copy, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The motion vector (MV) is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g., in bitstream conformance. The other is to apply padding for those undefined pixel values. The following sub-sessions describe the solutions in detail.

2.13.1 IBC in VVC Test Model

In the current VVC test model, e.g. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE IBC for each CU.

2.13.1.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates

Step 2: Insertion of history-based motion vector prediction (HMVP) candidates

Step 3: Insertion of pairwise average candidates

In the derivation of spatial merge candidates, a maximum of four merge candidates are selected among candidates located in the positions depicted in $A_1$, $B_1$, $B_0$, $A_0$ and $B_2$ as depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.13.1.2 IBC AMVP Mode

In IBC AMVP mode, an AMVP index point to an entry in the IBC AMVP list is parsed from the bitstream. The construction of the IBC advanced motion vector prediction (AMVP) list can be summarized according to the following sequence of steps:

Step 1: Derivation of spatial candidates

Check $A_0$, $A_1$ until an available candidate is found.

Check $B_0$, $B_1$, $B_2$ until an available candidate is found.

Step 2: Insertion of HMVP candidates

Step 3: Insertion of zero candidates

After insertion of the spatial candidates, if the IBC AMVP list size is still smaller than the maximum IBC AMVP list size, IBC candidates from HMVP table may be inserted. Finally, zero candidates are inserted into the IBC AMVP list.

2.13.1.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a YUV 420 video, the chroma block is N×M and then the collocated luma region is 2N×2M. The sub block size of a chroma block is 2×2. There are several steps to perform the chroma my derivation then the block copy process.

1) The chroma block will be first partitioned into (N>>1)* (M>>1) sub blocks.

2) Each sub block with a top left sample coordinated at (x, y) fetches the corresponding luma block covering the same top-left sample which is coordinated at (2x, 2y).

3) The encoder checks the block vector (bv) of the fetched luma block. If one of the following conditions is satisfied, the by is considered as invalid.

a. A by of the corresponding luma block is not existing.

b. The prediction block identified by a by is not reconstructed yet.

c. The prediction block identified by a by is partially or fully overlapped with the current block.

4) The chroma motion vector of a sub block is set to the motion vector of the corresponding luma sub block.

The IBC mode is allowed at the encoder when all sub blocks find a valid by.

2.14 Palette Mode in HEVC Screen Content Coding Extensions (HEVC-SCC)

Figure 19:
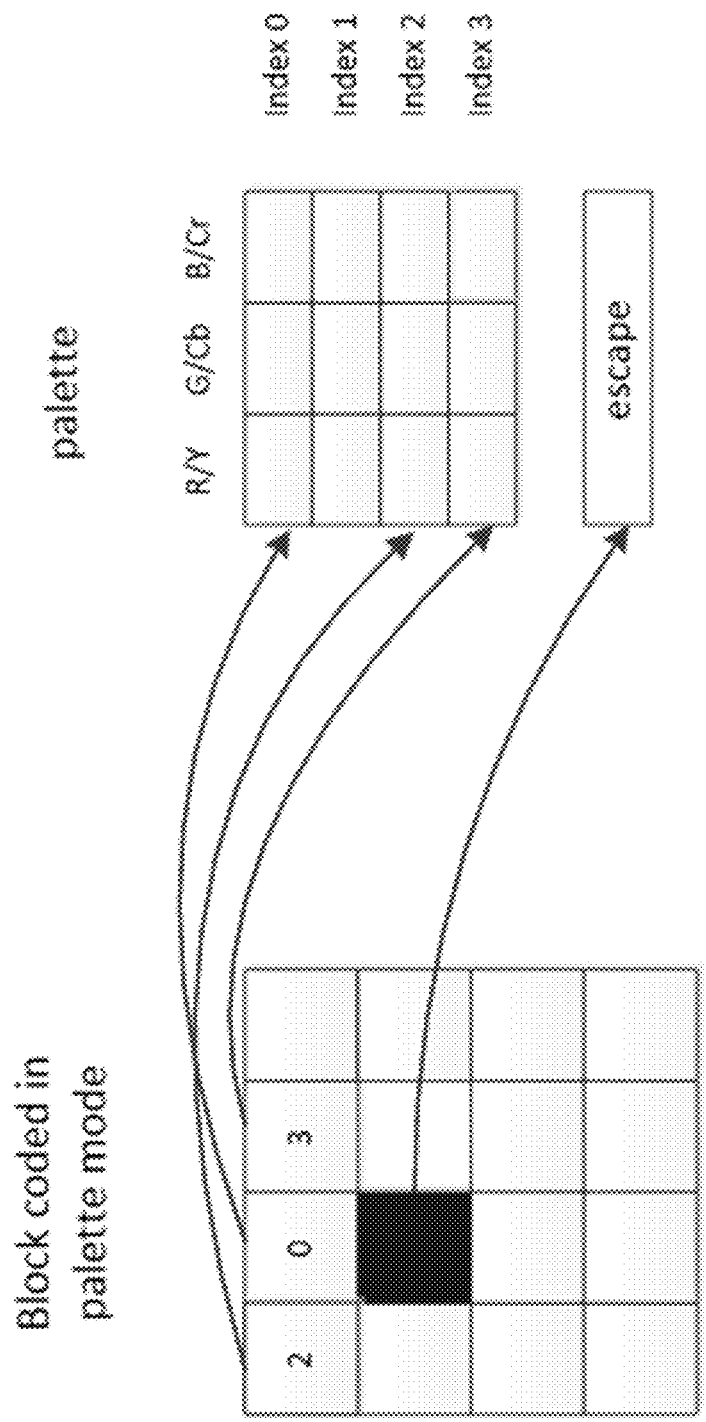
FIG. 19 shows an example of a block coded in palette mode.

The basic idea behind a palette mode is that the samples in the CU are represented by a small set of representative colour values. This set is referred to as the palette. It is also possible to indicate a sample that is outside the palette by signalling an escape symbol followed by (possibly quantized) component values. This is illustrated in FIG. 19.

In the palette mode in HEVC-SCC, a predictive way is used to code the palette and index map.

2.14.1 Coding of Palette Indices

Figure 20:
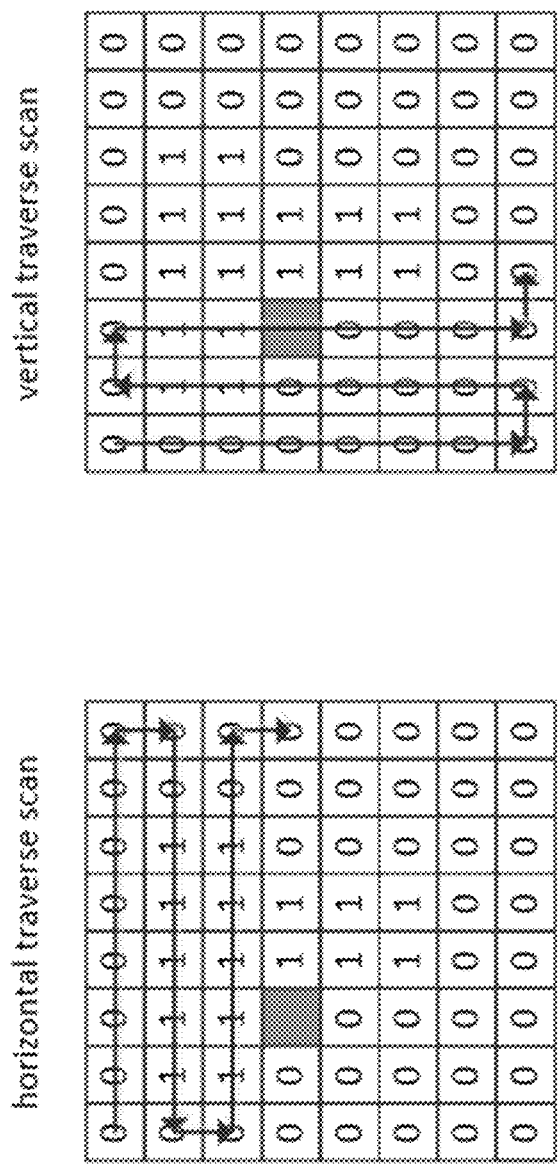
FIG. 20 shows examples of horizontal and vertical scans.

The palette indices are coded using horizontal and vertical traverse scans as shown in FIG. 20. The scan order is explicitly signaled in the bitstream using the palette_transpose_flag. For the rest of the subsection it is assumed that the scan is horizontal.

Figure 21:
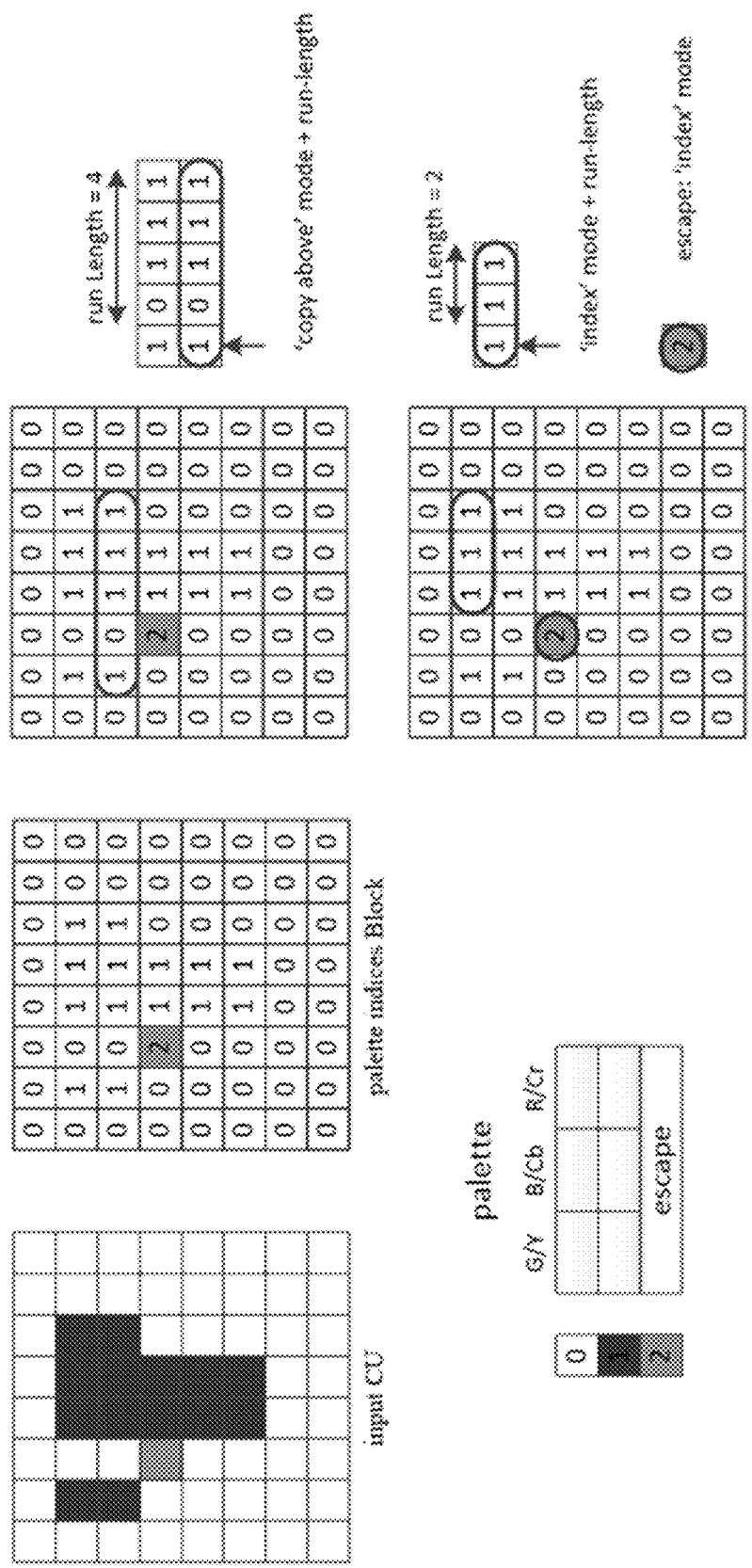
FIG. 21 shows an example of coding of palette indices.

The palette indices are coded using two main palette sample modes: 'INDEX' and 'COPY_ABOVE'. As explained previously, the escape symbol is also signaled as an 'INDEX' mode and assigned an index equal to the maximum palette size. The mode is signaled using a flag except for the top row or when the previous mode was 'COPY_ABOVE'. In the 'COPY_ABOVE' mode, the palette index of the sample in the row above is copied. In the 'INDEX' mode, the palette index is explicitly signaled. For both 'INDEX' and 'COPY_ABOVE' modes, a run value is signaled which specifies the number of subsequent samples that are also coded using the same mode. When escape symbol is part of the run in 'INDEX' or 'COPY_ABOVE' mode, the escape component values are signaled for each escape symbol. The coding of palette indices is illustrated in FIG. 21.

This syntax order is accomplished as follows. First the number of index values for the CU is signaled. This is followed by signaling of the actual index values for the entire CU using truncated binary coding. Both the number of indices as well as the the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_runtype_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

2.15 Palette Mode for Dual Tree

When dual tree is enabled, whether to use palette mode for chroma blocks are signaled separately from the signaling of luma blocks.

3. Drawbacks of Existing Implementations

The current VVC design has the following problems:
(1) The method of joint coding of chrominance residuals has the problem that even when chroma component is unavailable, the signaling of enabling/disabling such method and chroma delta Quantization Parameters (QPs) used in such method are still applied.
(2) When dual tree is enabled, the current design of IBC and palette modes needs to signal the IBC/palette modes for chroma coded blocks even the sequence is 4:0:0.
(3) The method of RST has the problem that even when chroma component is unavailable, the signaling of enabling/disabling such method and transform matrix indices are still applied.
(4) slice_chroma_residual_scale_flag and the number of bits used to represent each of PCM sample values of the chroma components (e.g., pcm_sample_bit_depth_chroma_minus1) is signaled regardless the value of ChromaArrayType.
(5) For each CTU, for each Chroma component on which ALF filtering is enabled, an alternative Chroma filter index is signaled to select a given filter for the Chroma components. Such signaling method does not check the availability of chroma components.
(6) The signaling of pps_cb_qp_offset, pps_cr_qp_offset in picture parameter set (PPS) is done regardless the value of ChromaArrayType.
(7) Two color components always share the same RST matrix. Meanwhile, RST and joint chroma residual coding may be applied together which is suboptimal.
(8) The non-zero coefficient counting threshold in RST follows the below rules:
a. If it is separate tree coding, for the luma component, the RST index for the luma component may be signaled when there is at least 1 non-zero coefficient;
b. If it is separate tree coding, for the two chroma components, the RST index for the two chroma components may be signaled once when there is at least 1 non-zero coefficient in the two chroma blocks (e.g., Cb and Cr);
c. If it is single tree coding, the RST index for the whole coding unit (including three color components) may be signaled once when there are at least 2 non-zero coefficients in three blocks (e.g., Y, Cb and Cr);

It may need to be aligned with the color format and whether separate plane coding is enabled.
(9) The conditionally signaling of SBT flag should be aligned with the color format and whether separate plane coding is enabled.
(10) For inter-coded blocks, it can happen that the cu_cbf (or cu_coded_flag) is equal to 1, but coded block flags of all three components (tu_cbf_luma/tu_y_coded_flag, tu_cbf cb/tu_cb_coded_flag, tu_cbf_cr/tu_cr_coded/flag) are all zero. There may be redundancy between the syntax elements cu_cbf/cu_coded_flag, tu_cbf_luma/tu_y_coded_flag, tu_cbf_cb/tu_cb_coded_flag, and tu_cbf_cr/tu_cr_coded_flag.

4. Example Techniques and Embodiments

The detailed embodiments described below should be considered as examples to explain general concepts. These embodiments should not be interpreted in a narrow way. Furthermore, these embodiments can be combined in any manner.

The methods described below may be also applicable to other coding tools that need to signal certain syntax elements for chroma color components (a.k.a., dependent color components, such as B and R color components for the RGB color format).

1. Syntax elements related to joint chroma residual coding may be conditionally signaled.
  a. Syntax elements related to signaling of chroma delta QPs/chroma QP offset used in joint chroma residual coding (e.g., pps_joint_cbcr_qp_offset) may be conditionally signaled.
  b. Syntax elements related to the indications of usage of joint chroma residual coding (e.g., tu_cb_cr_joint_residual) may be conditionally signaled.
  c. A syntax element may be signaled which can be in the sequence/view/picture/slice/tile group level to indicate whether joint chroma residual coding is enabled or not.
    i. In one example, one flag may be signaled in Sequence Parameter Set (SPS)/Video Parameter Set (VPS)/Picture Parameter Set (PPS)/Slice header/tile group header.
  d. For above examples, syntax elements related to joint chroma residual coding may be signaled under the condition that chroma format is unequal to 4:0:0 and/or separate plane coding is disabled.
    i. Alternatively, syntax elements related to joint chroma residual coding may be signaled under the condition of ChromaArrayType unequal to a specific value such as 0.
    ii. Alternatively, syntax elements related to joint chroma residual coding may be signaled under the conditions of ChromaArrayType and/or one or multiple syntax element(s)(e.g., a sequence level flag).
  e. Alternatively, for above examples, signalling of syntax elements related to joint chroma residual coding may be skipped under the condition that chroma format is equal to 4:0:0 and/or separate plane coding is enabled.
  f. Alternatively, for above examples, signalling of syntax elements related to joint chroma residual coding may be skipped under the condition that ChromaArrayType is equal to a specific value such as 0.

g. The above methods may be also applicable to other variances of the joint chroma residual coding method.
2. Signaling of indications of usage of secondary transform may be skipped according to color format.
   a. In one example, signaling of indications of usage of secondary transform (e.g., st_idx) may be skipped when chroma format is unequal to 4:0:0 and/or separate plane coding is enabled.
   b. In one example, signaling of indications of usage of secondary transform (e.g., st_idx) may be skipped when ChromaArrayType is equal to a specific value such as 0.
   c. Signaling of indications of usage of secondary transform (e.g., st_idx) may be under the condition that ChromaArrayType is unequal to a specific value such as 0.
   d. Signaling of indications of usage of secondary transform (e.g., st_idx) may be under the conditions that chroma format is unequal to 4:0:0 and/or separate plane coding is disabled.
3. Syntax elements related to signaling of chroma delta QPs/chroma QP offset in picture level (e.g., pps_cb_qp_offset and/or pps_cr_qp_offset) may be conditionally signaled.
   a. In one example, signaling of chroma delta QPs in picture level (e.g., pps_cb_qp_offset and/or pps_cr_qp_offset) may be skipped when chroma format is unequal to 4:0:0 and/or separate plane coding is enabled.
   b. In one example, signaling of chroma delta QPs in picture level (e.g., pps_cb_qp_offset and/or pps_cr_qp_offset) may be skipped when ChromaArrayType is equal to a specific value such as 0.
   c. signaling of chroma delta QPs in picture level (e.g., pps_cb_qp_offset and/or pps_cr_qp_offset) may be under the condition that ChromaArrayType is unequal to a specific value such as 0.
   d. signaling of chroma delta QPs in picture level (e.g., pps_cb_qp_offset and/or pps_cr_qp_offset) may be under the conditions that chroma format is unequal to 4:0:0 and/or separate plane coding is disabled.
4. Signaling of indications of usage of Luma-dependent chroma residue scaling (LDCRS) may be skipped according to color format.
   a. In one example, signaling of indications of usage of LDCRS (e.g., slice_chroma_residual_scale_flag) may be skipped when chroma format is unequal to 4:0:0 and/or separate plane coding is enabled.
   b. In one example, signaling of indications of usage of LDCRS (e.g., slice_chroma_residual_scale_flag) may be skipped when ChromaArrayType is equal to a specific value such as 0.
   c. Signaling of indications of usage of LDCRS (e.g., slice_chroma_residual_scale_flag) may be under the condition that ChromaArrayType is unequal to a specific value such as 0.
   d. Signaling of indications of usage of LDCRS (e.g., slice_chroma_residual_scale_flag) may be under the conditions that chroma format is unequal to 4:0:0 and/or separate plane coding is disabled.
5. Signaling of indications of bit depth of the samples of the chroma arrays and/or the value of the chroma quantization parameter range offset may be skipped according to color format.
   a. In one example, signaling of indications of bit depth of the samples of the chroma arrays and/or the value of the chroma quantization parameter range offset (e.g., bit_depth_chroma_minus8) may be skipped when chroma format is equal to 4:0:0 and/or separate plane coding is enabled.
   b. In one example, signaling of indications of bit depth of the samples of the chroma arrays and/or the value of the chroma quantization parameter range offset (e.g., bit_depth_chroma_minus8) may be skipped when ChromaArrayType is equal to a specific value such as 0.
   c. In one example, Signaling of indications of bit depth of the samples of the chroma arrays and/or the value of the chroma quantization parameter range offset (e.g., bit_depth_chroma_minus8) may be under the condition that ChromaArrayType is unequal to a specific value such as 0 or under the conditions (the conditions that chroma format is unequal to 4:0:0 and/or separate plane coding is disabled.
6. Signaling of indications of the number of bits used to represent each of PCM sample values of the chroma components may be skipped according to color format.
   a. In one example, signaling of indications of the number of bits used to represent each of PCM sample values of the chroma components (e.g., pcm_sample_bit_depth_chroma_minus1) may be skipped when chroma format is unequal to 4:0:0 and/or separate plane coding is enabled.
   b. In one example, signaling of indications the number of bits used to represent each of PCM sample values of the chroma components (e.g., pcm_sample_bit_depth_chroma_minus1) may be skipped when ChromaArrayType is equal to a specific value such as 0.
   c. Signaling of indications of the number of bits used to represent each of PCM sample values of the chroma components (e.g., pcm_sample_bit_depth_chroma_minus1) may be under the condition that ChromaArrayType is unequal to a specific value such as 0.
   d. Signaling of indications of the number of bits used to represent each of PCM sample values of the chroma components (e.g., pcm_sample_bit_depth_chroma_minus1) may be under the conditions that chroma format is unequal to 4:0:0 and/or separate plane coding is disabled.
7. Syntax elements related to ALF filters for chroma components (e.g., flag to indicate whether filter coefficients need to be transmitted, filter coefficients, APS index) may be conditionally signaled.
   a. In one example, the condition is whether ChromaArrayType is unequal to a specific value such as 0 (e.g., to indicate the color format and/or whether any of the chroma components is present).
   b. Signaling of indications of sending additional ALF chroma filter coefficients (e.g., alf_chroma_filter_signal_flag, slice_alf_chroma_idc, slice_alf_aps_id_chroma) may be skipped according to color format equal to 4:0:0 and/or separate plane coding is enabled.
   c. Signaling of ALF chroma filter coefficients (e.g., clipping flag/clipping parameters/filter coefficients) may be skipped according to color format equal to 4:0:0 and/or separate plane coding is enabled.
   d. Temporal prediction of ALF chroma filters may be disabled for chroma coded blocks according to certain conditions.

e. Alternatively, the related syntax elements may be still signaled, but are inferred to be default values when the condition is true, such as alf_chroma_filter_signal_flag is inferred to be 0.
8. Syntax elements related to palette modes/intra block copy (IBC) modes for chroma components (e.g., flags/mode index to indicate whether palette/IBC is enabled for a chroma block/slice/picture/tile group/tile/brick) may be conditionally signaled.
   a. In one example, the condition is whether ChromaArrayType is unequal to a specific value such as 0.
   b. In one example, pred_mode_ibc_flag may be conditionally signaled.
   c. Signaling of indications of palette modes for chroma components may be skipped according to color format equal to 4:0:0 and/or separate plane coding is enabled.
   d. Alternatively, the related syntax elements may be still signaled, but are inferred to be default values when the condition is true, such as palette modes for chroma components are inferred to be disabled.
9. Syntax elements related to ALF filter temporal prediction for chroma components (e.g., filter index/ALF APS index, on/off control flag) may be conditionally signaled.
   a. In one example, the condition is whether ChromaArrayType is unequal to a specific value such as 0.
   b. Signaling of indications of usage of secondary transform may be skipped according to color format equal to 4:0:0 and/or separate plane coding is enabled.
   c. Signaling of ALF filter temporal prediction for chroma components related syntax elements may be skipped according to color format equal to 4:0:0 and/or separate plane coding is enabled.
   d. Temporal prediction of ALF chroma filters may be disabled for chroma coded blocks according to certain conditions.
10. Those syntax elements in SPS which are conditionally signaled according to ChromaArrayType may be signaled together with only one single conditional check of ChromaArrayType.
    a. In one example, when ChromaArrayType is unequal to a specific value such as 0, partial or all of the following syntax elements may be further signaled in a certain order.
       i. qtbtt_dual_tree_intra_flag
       ii. sps_cclm_enabled_flag
       iii. pcm_sample_bit_depth_chroma_minus1
       iv. bit_depth_chroma_minus8
    b. In one example, the condition check of ChromaArrayType may be replaced by condition check of color format equal to 4:0:0 and/or separate plane coding is enabled.
11. For syntax elements mentioned above, whether to invoke the decoding process for the chroma blocks may be dependent on the color format and/or usage of separate plane coding.
    a. For syntax elements mentioned above, whether to invoke the decoding process for the chroma blocks may be dependent on ChromaArrayType.
    b. In one example, when ChromaArrayType is equal to a specific value such as 0, or color format is 4:0:0 or separate plane coding is enabled, the ALF/secondary transform/chroma residual scaling process/quantization scaling matrix is not applied to the chroma blocks.
    c. In one example, when ChromaArrayType is unequal to a specific value such as 0, the ALF/secondary transform/chroma residual scaling process/quantization scaling matrix may be applied to the chroma blocks.
12. For syntax elements mentioned above, they may still be signaled even when ChromaArrayType is equal to a specific value (e.g., 0) or color format is 4:0:0 or separate plane coding is enabled. However, the decoding process and decoders shall ignore the decoded values.
    a. In one example, when one of the above conditions are true, syntax elements mentioned above, such as those related to joint residual chroma coding (e.g., pps_joint_cbcr_qp_offset) are not used in the decoding process and decoders shall ignore their value.
    b. In one example, when one of the above conditions are true, syntax elements mentioned abvoe, such as those related to chroma palette mode/chroma IBC mode/chroma ALF are not used in the decoding process and decoders shall ignore their value.
13. For syntax elements mentioned above, encoder constraints may be applied.
    a. A conformance bitstream shall satisfy that when chroma format is 4:0:0 and/or separate plane coding is enabled, joint chroma residual coding shall be disabled.
    b. A conformance bitstream shall satisfy that when chroma format is 4:0:0 and/or separate plane coding is enabled, chroma ALF shall be disabled.
    c. A conformance bitstream shall satisfy that when chroma format is 4:0:0 and/or separate plane coding is enabled, chroma secondary transform (a.k.a, NSST/RST) (e.g., sps_st_enabled_flag) shall be disabled.
    d. A conformance bitstream shall satisfy that when chroma format is 4:0:0 and/or separate plane coding is enabled, the index of chroma secondary transform matrix (a.k.a, NSST/RST) (e.g., st_idx) shall be equal to a specific value such as 0.
    e. A conformance bitstream shall satisfy that when chroma format is 4:0:0 and/or separate plane coding is enabled, the chroma delta QPs used in joint chroma residual coding shall be equal to a specific value such as 0.
    f. A conformance bitstream shall satisfy that when chroma format is 4:0:0 and/or separate plane coding is enabled, the usage of luma dependent chroma residual scaling (e.g., slice_chroma_residual_scale_flag) shall be equal to a specific value such as 0.
    g. A conformance bitstream shall satisfy that when chroma format is 4:0:0 and/or separate plane coding is enabled, the chroma delta QPs signaled in picture level shall be equal to a specific value such as 0.
    h. When ChromaArrayType is equal to a specific value such as 0, the above syntax elements (e.g., slice_chroma_residual_scale_flag) may be still decoded, but are not used in the decoding process and decoders shall ignore their values.
14. Chroma color components may use different RST matrices.
    a. In one example, an individual indication of RST matrices may be signaled for a single chroma component separately.
       i. In one example, the signaling of the indication of RST matrices of a second chroma component may be dependent on the indication of RST matrices of a first chroma component.
b. In one example, RST matrix for a first chroma component may be signaled; while the matrix for a second chroma component may be derived at the decoder side.
  i. In one example, the matrix for a second chroma component may be derived from the RST matrix utilized for one representative luma block.
  ii. In one example, the matrix for the $2^{nd}$ chroma component may be derived from the RST matrix utilized for the first chroma component which can be unequal.
  iii. In one example, the matrix for the other chroma component may be derived from chroma intra mode.
c. How many indices need to be signaled for the more than one color components may depend on the color subsampling format.
d. How many indices need to be signaled for the more than one color components may depend on whether dual tree is enabled or not.
e. How many indices need to be signaled for the more than one color components may depend on whether joint chroma residual coding is used or not.
  i. In one example, one index may be signaled for the residual coding.

15. When joint chroma residual coding is applied to one block, signalling of secondary transform matrix indices may be skipped.
a. In one example, when joint chroma residual coding is applied to one block, secondary transform is disabled for both of the two chroma components.
b. In one example, when joint chroma residual coding is applied to one block, secondary transform is enabled with pre-defined matrix indices.
  i. In one example, when joint chroma residual coding is applied to one block, secondary transform is applied to two color components with the same pre-defined matrix index.
  ii. In one example, when joint chroma residual coding is applied to one block, secondary transform is applied to two color components with different pre-defined matrix indices.
  iii. In one example, when joint chroma residual coding is applied to one block, secondary transform is applied to one color component with pre-defined matrix indices, and disabled for the other color component.
c. Alternatively, when one block is coded with secondary transform, signalling of usage of joint chroma residual coding may be skipped.
  i. Alternatively, furthermore, joint chroma residual coding is disabled to this block.

16. When joint chroma residual coding is applied to one block, signalling of cross-component linear model (CCLM) methods may be skipped.
a. In one example, when joint chroma residual coding is applied to one block, CCLM is disabled for both of the two chroma components.
b. Alternatively, when one block is coded with CCLM, signalling of usage of joint chroma residual coding may be skipped.
  i. Alternatively, furthermore, joint chroma residual coding is disabled to this block.
c. In one example, joint chroma residual coding and CCLM may be both enabled. Correlation between the two chroma residuals may be derived from the CCLM coefficients.
  i. For example, suppose Cb=a1*luma+b1 and Cr=a2*luma+b2, correlation between residual of Cb and Cr (denoted as resiCb and resiCr respectively) may be assumed as: resiCb=a2*((resiCr−b1)/a1)+b2.
  ii. Alternatively, correlation between residual of Cb and Cr may be assumed as: resiCb=a2*((resiCr−b1)/a1).
  iii. Alternatively, correlation between residual of Cb and Cr may be assumed as: resiCb=a2*resiCr/a1.
  iv. Alternatively, different correlations between the two chroma residuals may be allowed, wherein K (K>=1) of them may be derived from CCLM coefficients.
d. In the above discussion, CCLM mode may refer to any kind of mode utilizing cross-component linear model such as LM mode, LM-T mode and LM-L mode in VVC.

17. When joint chroma residual coding is applied to one block, LDCRS may be disabled.

18. Whether to signal cu_cbf/cu_coded_flag may depend on the color formats and/or the component coding method (such as whether separate plane coding is enabled).
a. In one example, cu_cbf/cu_coded_flag is not signaled if the color format is 4:0:0 and/or separate plane coding is applied.
  i. cu_cbf/cu_coded_flag is not signaled if the ChromaArrayType is equal to a specific value such as 0.
  ii. alternatively, furthermore, cu_cbf/cu_coded_flag is inferred to be 1 if it is not signaled when the color format is 4:0:0 and/or separate plane coding is applied.

19. Whether to signal coded block flag for the luma block (e.g., tu_cbf_luma/tu_y_coded_flag) may depend on the color formats and/or the component coding method.
a. In one example, coded block flag for the luma block (e.g., tu_cbf_luma/tu_y_coded_flag is not signaled if the color format is 4:0:0 and/or separate plane coding is applied.
b. In one example, coded block flag for the luma block (e.g., tu_cbf_luma/tu_y_coded_flag) is not signaled if the current block is coded with non-skip inter mode and the color format is 4:0:0.
c. In one example, coded block flag for the luma block (e.g., tu_cbf_luma/tu_y_coded_flag) is not signaled if the current block is coded with non-skip inter mode and separate plane coding is applied.
d. In one example, coded block flag for the luma block (e.g., tu_cbf_luma/tu_y_coded_flag) is not signaled if the current block is coded with non-skip inter mode and the ChromaArrayType is equal to a specific value such as 0.

20. Whether to signal tu_cbf_cb/tu_cb_coded_flag, and tu_cbf_cr/tu_cr_coded_flag may depend on the color formats and/or the component coding method (such as whether separate plane coding is enabled).
a. In one example, tu_cbf_cb/tu_cb_coded_flag, and tu_cbf_cr/tu_cr coded_flag is not signaled if the color format is 4:0:0 and/or separate plane coding is applied.

b. In one example, tu_cbf_cb/tu_cb_coded_flag, and tu_cbf_cr/tu_cr coded_flag is not signaled if the ChromaArrayType is equal to a specific value such as 0.
21. Whether to signal a coded block flag of a color component may depend on the coded block flags for other color components.
   a. Whether to signal tu_cbf_cr/tu_cr_coded_flag may depend on tu_cbf_luma/tu_y_coded_flag and/or tu_cbf_cb/tu_cb_coded_flag.
      i. In one example, tu_cbf_cr/tu_cr_coded_flag is not signaled and inferred to be 1 if both tu_cbf_luma/tu_y_coded_flag and tu_cbf_cb/tu_cb_coded_flag are equal to 0.
   b. Whether to signal tu_cbf_cb/tu_cb_coded_flag may depend on tu_cbf_luma/tu_y_coded_flag and/or tu_cbf_cr/tu_cr_coded_flag.
      i. In one example, tu_cbf_cb/tu_cb_coded_flag is not signaled and inferred to be 1 if both tu_cbf_luma/tu_y_coded_flag and tu_cbf_cr/tu_cr_coded_flag are equal to 0.
   c. Whether to signal tu_cbf_luma/tu_y_coded_flag may depend on tu_cbf_cb/tu_cb_coded_flag and/or tu_cbf_cr/tu_cr_coded_flag.
      i. In one example, tu_cbf_luma/tu_y_coded_flag is not signaled and inferred to be 1 if both tu_cbf_cb/tu_cb_coded_flag and tu_cbf_cr/tu_cr_coded_flag are equal to 0.
   d. The coding order of coded block flags for three color components may be different from coding flags for luma, Cb, Cr.
   e. The above methods may be applied only when the current CU has only one TU and cu_cbf is equal to 1.
      i. Alternatively, furthermore, the above methods may be applied only when the current CU has multiple TUs but with only one TU has non-zero coefficients (e.g., SBT mode) and cu_cbf is equal to 1.
22. Whether to enable or/and how RST is applied for a block/a coding unit (e.g., st_idx) may be signaled according to whether the number of non-zero coefficients (such numSigCoeff in section 2.9.1) for associated color components is greater than a threshold and the threshold may depend on the color formats and/or the component coding method (such as whether separate plane coding is enabled).
   a. In one example, the threshold under the single-tree coding structure may depend on whether the color format is 4:0:0 and/or separate plane coding is applied.
      i. For example, the threshold is 1 if the color format is 4:0:0 and/or separate plane coding is applied; otherwise, the threshold is 2.
   b. In one example, the threshold under the single-tree coding structure may depend on whether ChromaArrayType is equal to a specific value such as 0.
      i. For example, the threshold is 1 if ChromaArrayType is equal to 0; otherwise, the threshold is 2.
23. For the signaling of RST side information (e.g., st_idx) in a coding unit, it may depend on the number of non-zero coefficient of the luma component only, instead of all three-color components.
   a. In one example, if the number of non-zero coefficient for the luma block is greater than a threshold (e.g., 1), RST side information may be signaled.
   b. In one example, when luma block has all zero coefficients (e.g., tu_cbf_luma/tu_y_coded_flag is equal to 0), there is no need to signal the RST side information and RST is inferred to be disabled.
   c. In one example, if one of the coded block flags for the three-color components (e.g., tu_cbf_luma/tu_y_coded_flag, tu_cbf_cb/tu_cb_coded_flag, and tu_cbf_cr/tu_cr_coded_flag) is equal to 0, there is no need to signal the RST side information and RST is inferred to be disabled.
   d. The above methods may be applied when single tree coding structure is applied.
      i. Alternatively, furthermore, the above methods may be applied when single tree coding structure is applied, and color format is not 4:0:0.
      ii. Alternatively, furthermore, the above methods may be applied when single tree coding structure is applied, color format is not 4:0:0 and separate plane coding is disabled.
24. For the signaling of RST side information (e.g., st_idx) for chroma components (such as in separate tree coding structure), it may depend on the coded block flags of the two chroma components.
   a. In one example, if one of the coded block flags (such as tu_cbf_cb/tu_cb_coded_flag, or tu_cbf_cr/tu_cr_coded_flag) is equal to 0, signaling of RST side information may be skipped.
25. Whether and/or how to signal the indication of SBT for a block may depend on the color formats and/or the component coding method (such as whether separate plane coding is enabled), and/or tu_cbf_luma/tu_y_coded_flag and/or tu_cbf_cb/tu_cb_coded_flag and/or tu_cbf_cr/tu_cr_coded_flag.
   a. In one example, the indication of SBT is not signaled if tu_cbf_luma/tu_y_coded_flag, tu_cbf_cb/tu_cb_coded_flag and tu_cbf_cr/tu_cr_coded_flag are all equal to 0.
   b. In one example, the indication of SBT is not signaled if tu_cbf_luma/tu_y_coded_flag is equal to 0.
   c. In one example, the indication of SBT is not signaled if tu_cbf_cb/tu_cb_coded_flag and tu_cbf_cr/tu_cr_coded_flag are both equal to 0.
   d. In one example, the conditionally signaling in above bullets may be applied only when the color format is 4:0:0 and/or separate plane coding is applied.
26. The signaling of coded block flags (e.g., tu_cbf_luma/tu_y_coded_flag and/or tu_cbf_cb/tu_cb_coded_flag and/or tu_cbf_cr/tu_cr_coded_flag) for a TU may depend on the usage of SBT for the CU containing the TU.
   a. In one example, tu_cbf_luma/tu_y_coded_flag for a TU is not signaled and inferred to be 1 if SBT is applied and that TU is not zeroed-out by SBT.
   b. In one example, tu_cbf_cb/tu_cb_coded_flag and/or tu_cbf_cr/tu_cr_coded_flag for a TU are not signaled and inferred to be 1 if SBT is applied and that TU is not zeroed-out by SBT.
   c. A conformance bitstream shall satisfy that when SBT is enabled for a coding unit, the luma block shall have at least one non-zero coefficient (e.g., tu_cbf_luma/tu_y_coded_flag is equal to 1).
      i. Alternatively, a conformance bitstream shall satisfy that when SBT is enabled for a coding unit, one of the three color components shall have at least one non-zero coefficient (e.g., at least one of tu_cbf_luma/tu_y_coded_flag, tu_cbf_cb/tu_cb_coded_flag, tu_cbf_cr/tu_cr_coded_flag is equal to 1).

27. A conformance bitstream shall satisfy that when cu_cbf (e.g., for non-skip inter coded blocks) is equal to 1 for a coding unit, the luma block shall have at least one non-zero coefficient (e.g., tu_cbf_luma/tu_y_coded_flag is equal to 1).
   a. Alternatively, a conformance bitstream shall satisfy that when cu_cbf (e.g., for non-skip inter coded blocks) is equal to 1 for a coding unit, the three color components shall have at least one non-zero coefficient (e.g., at least one of tu_cbf_luma/tu_y_coded_flag, tu_cbf_cb/tu_cb_coded_flag, tu_cbf_cr/tu_cr_coded_flag is equal to 1).
28. The above-mentioned syntax elements may be still signaled regardless the value of ChromaArrayType or color format or separate plane coding, however, in the decoding process, the decoded values of those syntax elements may be ignored. That is, the decoding process may firstly check the values of ChromaArrayType or color format or separate plane coding before checking the decoded values of those syntax elements.

5. Additional Embodiments 5.1 Embodiment 1 on ALF Decoding Process

This embodiment shows an example of invoking the adaptive loop filter process wherein the condition of chroma color format/separate plane coding flag (denoted by ChromaArrayType) is taken into consideration.

The suggested changes are underlined as follows:

8.8 in-Loop Filter Process 8.8.1 General

The three in-loop filters, namely deblocking filter, sample adaptive offset and adaptive loop filter, are applied as specified by the following ordered steps:

For the deblocking filter, the following applies:

The deblocking filter process as specified in clause 8.8.2.1 is invoked with the reconstructed picture sample array $S_L$ and, when ChromaArrayType is not equal to 0, the arrays $S_{Cb}$ and $S_{Cr}$ as inputs, and the modified reconstructed picture sample array $S'_L$ and, when ChromaArrayType is not equal to 0, the arrays $S'_{Cb}$ and $S'_{Cr}$ after deblocking as outputs.

The array $S'_L$ and, when ChromaArrayType is not equal to 0, the arrays $S'_{Cb}$ and $S'_{Cr}$ are assigned to the array $S_L$ and, when ChromaArrayType is not equal to 0, the arrays $S_{Cb}$ and $S_{Cr}$ (which represent the decoded picture), respectively.

When sps_sao_enabled_flag is equal to 1, the following applies:

The sample adaptive offset process as specified in clause 8.8.3.1 is invoked with the reconstructed picture sample array $S_L$ and, when ChromaArrayType is not equal to 0, the arrays $S_{Cb}$ and $S_{Cr}$ as inputs, and the modified reconstructed picture sample array $S'_L$ and, when ChromaArrayType is not equal to 0, the arrays $S'_{Cb}$ and $S'_{Cr}$ after sample adaptive offset as outputs.

The array $S'_L$ and, when ChromaArrayType is not equal to 0, the arrays $S'_{Cb}$ and $S'_{Cr}$ are assigned to the array $S_L$ and, when ChromaArrayType is not equal to 0, the arrays $S_{Cb}$ and $S_{Cr}$ (which represent the decoded picture), respectively.

When sps_alf_enabled_flag is equal to 1, the following applies:

The adaptive loop filter process as specified in clause 8.8.4.1 is invoked with the reconstructed picture sample arrays $S_L$, when ChromaArrayType is not equal to 0, the arrays $S_{Cb}$ and $S_{Cr}$ as inputs, and the modified reconstructed picture sample arrays $S'_L$, and, when ChromaArrayType is not equal to 0, the arrays $S'_{Cb}$ and $S'_{Cr}$ after adaptive loop filter as outputs.

The arrays $S'_L$, and, when ChromaArrayType is not equal to 0, the arrays $S'_{Cb}$ and $S'_{Cr}$ are assigned to the arrays $S_L$ and, when ChromaArrayType is not equal to 0, the arrays, $S_{Cb}$ and $S_{Cr}$ (which represent the decoded picture), respectively.

8.8.4 Adaptive Loop Filter Process 8.8.4.1 General

Inputs of this process are the reconstructed picture sample arrays prior to adaptive loop filter recPicture$_L$, and, when ChromaArrayType is not equal to 0, the arrays recPicture$_{Cb}$ and recPicture$_{Cr}$.

Outputs of this process are the modified reconstructed picture sample arrays after adaptive loop filter alfPicture$_L$, and, when ChromaArrayType is not equal to 0, the arrays alfPicture$_{Cb}$ and alfPicture$_{Cr}$.

The sample values in the modified reconstructed picture sample arrays after adaptive loop filter alfPicture$_L$, alfPicture$_{Cb}$ and alfPicture$_{Cr}$ are initially set equal to the sample values in the reconstructed picture sample arrays prior to adaptive loop filter recPicture$_L$, recPicture$_{Cb}$ and recPicture$_{Cr}$, respectively.

When slice_alf_enabled_flag is equal to 1, for every coding tree unit with luma coding tree block location (rx, ry), where rx=0 . . . PicWidthInCtbs−1 and ry=0 . . . PicHeightInCtbs−1, the following applies:

When alf_ctb_flag[0][rx][ry] is equal to 1, the coding tree block filtering process for luma samples as specified in clause 8.8.4.2 is invoked with recPicture$_L$, alfPicture$_L$, and the luma coding tree block location (xCtb, yCtb) set equal to (rx<<CtbLog2SizeY, ry<<CtbLog2SizeY) as inputs, and the output is the modified filtered picture alfPicture$_L$.

When ChromaArrayType is not equal to 0 and alf_ctb_flag[1][rx][ry] is equal to 1, the coding tree block filtering process for chroma samples as specified in clause 8.8.4.4 is invoked with recPicture set equal to recPicture$_{Cb}$, alfPicture set equal to alfPicture$_{Cb}$, and the chroma coding tree block location (xCtbC, yCtbC) set equal to (rx<<(CtbLog2SizeY−1), ry<<(CtbLog2SizeY−1)) as inputs, and the output is the modified filtered picture alfPicture$_{Cb}$.

When ChromaArrayType is not equal to 0 and alf_ctb_flag[2][rx][Ty] is equal to 1, the coding tree block filtering process for chroma samples as specified in clause 8.8.4.4 is invoked with recPicture set equal to recPicture$_{Cr}$, alfPicture set equal to alfPicture$_{Cr}$, and the chroma coding tree block location (xCtbC, yCtbC) set equal to (rx<<(CtbLog2SizeY−1), ry<<(CtbLog2SizeY−1)) as inputs, and the output is the modified filtered picture alfPicture$_{Cr}$.

7.3.5.1 General Slice Header Syntax

```
slice_header( ) {
  ...
  if( sps_sao_enabled_flag ) {
    slice_sao_luma_flag
    if( ChromaArrayType != 0 )
      slice_sao_chroma_flag
  }
  if( sps_alf_enabled_flag ) {
    slice_alf_enabled_flag
    if( slice_alf_enabled_flag ) {
      num_alf_aps_ids
      for( i = 0; i < num_alf_aps_ids; i++ )
        slice_alf_aps_id_luma[ i ]
      if( ChromaArrayType != 0 ){
        slice_alf_chroma_idc
        if( slice_alf_chroma_idc && ( slice_type != I || num_alf_aps_ids != 1) )
          slice_alf_aps_id_chroma
      }
    }
  }
  ...
}
``` slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to 0. When ChromaArrayType is equal to 0, slice_alf_chroma_idc is not present, as it is not used in the decoding process.

The maximum value maxVal of the truncated unary binarization tu(v) is set equal to 3.

slice_alf_aps_id_chroma specifies the adaptation_parameter_set_id that the chroma component of the slice refers to. When slice_alf_aps_id_chroma is not present, it is inferred to be equal to slice_alf_aps_id_luma[0]. The TemporalId of the ALF APS NAL unit having adaptation_parameter_set_id equal to slice_alf_aps_id_chroma shall be less than or equal to the TemporalId of the coded slice NAL unit.

For intra slices and slices in an TRAP picture, slice_alf_aps_id_chroma shall not refer to an ALF APS associated with other pictures rather than the picture containing the intra slices or the IRAP picture.

When ChromaArrayType is equal to 0, slice_alf_aps_id_chroma is not present as it is not used in the decoding process.

5.2. Embodiment 2 on Signaling of Chroma Delta QPs

The added changes are underlined, and the removed parts are marked with [[ ]].

7.3.2.2. Picture Parameter Set RBSP Syntax

| | Descriptor |
|---|---|
| pic_parameter_set_rbsp( ) { | |
| ... | |
| cabac_init_present_flag | u(1) |
| for( i = 0; i < 2; i++ ) | |
| num_ref_idx_default_active_minus1[ i ] | ue(v) |
| rpl1_idx_present_flag | u(1) |
| init_qp_minus26 | se(v) |
| transform_skip_enabled_flag | u(1) |
| if( transform_skip_enabled_flag ) | |
| log2_transform_skip_max_size_minus2 | ue(v) |
| cu_qp_delta_enabled_flag | u(1) |
| if( cu_qp_delta_enabled_flag ) | |
| cu_qp_delta_subdiv | ue(v) |
| if (ChromaArrayType != 0) { | |
| pps_cb_qp_offset | se(v) |
| pps_cr_qp_offset | se(v) |
| pps_slice_chroma_qp_offsets_present_flag | u(1) |
| } | |
| ... | |
| } | | pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When not present. [[ChromaArrayType is equal to 0]], pps_cb_qp_offset and pps_cr_qp_offset are inferred to be 0 [[are not used in the decoding process and decoders shall ignore their value]].

pps_slice_chroma_qp_offsets_present_flag equal to 1 indicates that the slice_cb_qp_offset and slice_cr_qp_offset syntax elements are present in the associated slice headers. pps_slice_chroma_qp_offsets_present_flag equal to 0 indicates that these syntax elements are not present in the associated slice headers. When not present, [[ChromaArrayType is equal to 0]], pps_slice_chroma_qp_offsets_present_flag shall be equal to 0.

7.3.5 Slice Header Syntax
7.3.5.1 General Slice Header Syntax

|  | Descriptor |
|---|---|
| slice_header( ) { |  |
|   slice_pic_parameter_set_id | ue(v) |
|   if( rect_slice_flag \|\| NumBricksInPic > 1 ) |  |
|     slice_address | u(v) |
|   if( !rect_slice_flag && !single_brick_per_slice_flag ) |  |
|     num_bricks_in_slice_minus1 | ue(v) |
|   slice_type | ue(v) |
|   if( NalUnitType = = GRA_NUT ) |  |
|     recovery_poc_cnt | se(v) |
|   ... |  |
|   slice_qp_delta | se(v) |
|   if(ChromaArrayType != 0 && pps_slice_chroma_qp_offsets_present_flag ) { |  |
|     slice_cb_qp_offset | se(v) |
|     slice_cr_qp_offset | se(v) |
|   } |  |
|   if( sps_sao_enabled_flag ) { |  |
|     slice_sao_luma_flag | u(1) |
|     if( ChromaArrayType != 0 ) |  |
|       slice_sao_chroma_flag | u(1) |
|   } |  |
|   ... |  |
|   byte_alignment( ) |  |
| } |  |

5.3. Embodiment #3 on Signaling of Joint Chroma Residual Coding

The added changes are underlined, and the removed parts are marked with [[ ]].

7.3.2.2 Picture Parameter Set RBSP Syntax

|  | Descriptor |
|---|---|
| pic_parameter_set_rbsp( ) { |  |
|   ... |  |
|   pps_cb_qp_offset | se(v) |
|   pps_cr_qp_offset | se(v) |
|   if ( ChromaArrayType != 0 ) { |  |
|     pps_joint_cbcr_qp_offset | se(v) |
|   } |  |
|   ... |  |
| } |  |

7.3.4.1 General Tile Group Header Syntax

|  | Descriptor |
|---|---|
| tile_group_header( ) { |  |
|   ... |  |
|   if( pps_tile_group_chroma_qp_offsets_present_flag ) { |  |
|     tile_group_cb_qp_offset | se(v) |
|     tile_group_cr_qp_offset | se(v) |
|     if ( ChromaArrayType != 0 ) { |  |
|       tile_group_joint_cbcr_qp_offset | se(v) |
|     } |  |
|   } |  |
|   ... |  |
| } |  |

7.3.6.12 Residual Coding Syntax

|  | Descriptor |
|---|---|
| residual_coding( x0, y0, log2TbWidth, log2TbHeight, cIdx ) { |  |
|   if( ChromaArrayType != 0 && cIdx = = 2 && tu_cbf_cb[ x0 ][ y0 ] ) { |  |
|     tu_joint_cbcr_residual[ x0 ][ y0 ] | ae(v) |

| | Descriptor |
|---|---|
| if( tu_joint_cbcr_residual[ x0 ][ y0 ] ) { <br> return <br> } <br> ... <br>} | |

7.4.3.2 Picture Parameter Set RBSP Semantics pps_joint_cbcr_qp_offset specifies the offset to the luma quantization parameter $Qp'_Y$ used for deriving $Qp'_{CbCr}$. The value of pps_joint_cbcr_qp_offset shall be in the range of −12 to +12, inclusive. When not present [[ChromaArrayType is equal to 0]], pps_joint_cbcr_qp_offset is inferred to be 0 [[is not used in the decoding process and decoders shall ignore its value]].

5.4. Embodiment #4 on LMCS

Whether to enable luma-dependent chroma residue scaling (e.g., slice_chroma_residual_scale_flag) is dependent on ChromaArrayType. The added changes are underlined, and the removed parts are marked with [[ ]].

7.3.5 Slice Header Syntax
7.3.5.1 General Slice Header Syntax

| | Descriptor |
|---|---|
| slice_header( ) { | |
| slice_pic_parameter_set_id | ue(v) |
| if( rect_slice_flag ‖ NumBricksInPic > 1 ) | |
| slice_address | u(v) |
| if( !rect_slice_flag && !single_brick_per_slice_flag ) | |
| num_bricks_in_slice_minus1 | ue(v) |
| slice_type | ue(v) |
| if( NalUnitType = = GRA_NUT ) | |
| recovery_poc_cnt | se(v) |
| ... | |
| if( pps_slice_chroma_qp_offsets_present_flag ) { | |
| slice_cb_qp_offset | se(v) |
| slice_cr_qp_offset | se(v) |
| } | |
| if( sps_sao_enabled_flag ) { | |
| slice_sao_luma_flag | u(1) |
| if( ChromaArrayType != 0 ) | |
| slice_sao_chroma_flag | u(1) |
| } | |
| if( sps_alf_enabled_flag ) { | |
| slice_alf_enabled_flag | u(1) |
| if( slice_alf_enabled_flag ) { | |
| num_alf_aps_ids_minus1 | ue(v) |
| for( i = 0; i <= num_alf_aps_ids_minus1; i++ ) | |
| slice_alf_aps_id[ i ] | u(5) |
| } | |
| } | |
| dep_quant_enabled_flag | u(1) |
| if( !dep_quant_enabled_flag ) | |
| sign_data_hiding_enabled_flag | u(1) |
| if( deblocking_filter_override_enabled_flag ) | |
| deblocking_filter_override_flag | u(1) |
| if( deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| } | |
| } | |
| if( sps_lmcs_enabled_flag ) { | |
| slice_lmcs_enabled_flag | u(1) |
| if( slice_lmcs_enabled_flag ) { | |
| slice_lmcs_aps_id | |
| if( <u>ChromaArrayType != 0 &&</u> !( qtbtt_dual_tree_intra_flag && slice_type = = I ) ) | |
| slice_chroma_residual_scale_flag | u(1) |
| } | |

-continued

| | Descriptor |
|---|---|
| if ( entropy_coding_sync_enabled_flag ) | |
|   num_entry_point_offsets | ue(v) |
| if( NumEntryPoints > 0 ) { | |
|   offset_len_minus1 | ue(v) |
|   for( i = 0; i < NumEntryPoints; i++ ) | |
|     entry_point_offset_minus1[ i ] | u(v) |
| } | |
| byte_alignment( ) | |
| } | | slice_chroma_residual_scale_flag equal to 1 specifies that chroma residual scaling is enabled for the current slice. slice_chroma_residual_scale_flag equal to 0 specifies that chroma residual scaling is not enabled for the current slice. When slice_chroma_residual_scale_flag is not present, it is inferred to be equal to 0. When ChromaArrayType is equal to 0, slice_chroma_residual_scale_flag is not present, as it is not used in the decoding process.

5.5. Embodiment #5 on Grouped Syntax

The added changes are underlined, and the removed parts are marked with [[ ]].

7.3.2.3 Sequence Parameter Set RBSP Syntax

| | Descriptor |
|---|---|
| seq_parameter_set_rbsp( ) { | |
|   sps_decoding_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   [[bit_depth_chroma_minus8 | ue(v)]] |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   [[qtbtt_dual_tree_intra_flag | u(1)]] |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |

|  | Descriptor |
|---|---|
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slices != 0 ) { | |
|   sps_log2_diff_max_bt_min_qt_inter_slice | ue(v) |
|   sps_log2_diff_max_tt_min_qt_inter_slice | ue(v) |
| } | |
| [[if( qtbtt_dual_tree_intra_flag ) { | |
|   sps_log2_diff_min_qt_min_cb_intra_slice_chroma | ue(v) |
|   sps_max_mtt_hierarchy_depth_intra_slice_chroma | ue(v) |
|   if ( sps_max_mtt_hierarchy_depth_intra_slice_chroma != 0 ) { | |
|     sps_log2_diff_max_bt_min_qt_intra_slice_chroma | ue(v) |
|     sps_log2_diff_max_tt_min_qt_intra_slice_chroma | ue(v) |
|   } | |
| }]] | |
| sps_sao_enabled_flag | u(1) |
| sps_alf_enabled_flag | u(1) |
| sps_pcm_enabled_flag | u(1) |
| if( sps_pcm_enabled_flag ) { | |
|   pcm_sample_bit_depth_luma_minus1 | u(4) |
|   [[pcm_sample_bit_depth_chroma_minus1 | u(4)]] |
|   log2_min_pcm_luma_coding_block_size_minus3 | ue(v) |
|   log2_diff_max_min_pcm_luma_coding_block_size | ue(v) |
|   pcm_loop_filter_disabled_flag | u(1) |
| } | |
| if( ( CtbSizeY / MinCbSizeY + 1 ) <= ( pic_width_in_luma_samples / MinCbSizeY − 1 ) ) { | |
|   sps_ref_wraparound_enabled_flag | u(1) |
|   if( sps_ref_wraparound_enabled_flag ) | |
|     sps_ref_wraparound_offset_minus1 | ue(v) |
| } | |
| sps_temporal_mvp_enabled_flag | u(1) |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_affine_amvr_enabled_flag | u(1) |
| sps_dmvr_enabled_flag | u(1) |
| <u>if( ChromaArrayType != 0){</u> | |
| <u>Bit_depth_chroma_minus8</u> | |
| <u>qtbtt_dual_tree_intra_flag</u> | <u>u(1)</u> |
| <u>  if( qtbtt_dual_tree_intra_flag ) {</u> | |
| <u>    sps_log2_diff_min_qt_min_cb_intra_slice_chroma</u> | <u>ue(v)</u> |
| <u>    sps_max_mtt_hierarchy_depth_intra_slice_chroma</u> | <u>ue(v)</u> |
| <u>    if ( sps_max_mtt_hierarchy_depth_intra_slice_chroma != 0 ) {</u> | |
| <u>      sps_log2_diff_max_bt_min_qt_intra_slice_chroma</u> | <u>ue(v)</u> |
| <u>      sps_log2_diff_max_ft_min_qt_intra_slice_chroma</u> | <u>ue(v)</u> |
| <u>    }</u> | |
| <u>  }</u> | |
| <u>if( sps_pcm_enabled_flag ) {</u> | |
| <u>  pcm_sample_bit_depth_chroma_minus1</u> | <u>u(4)</u> |
| <u>}</u> | |
| sps_cclm_enabled_flag | u(1) |
| if( sps_cclm_enabled_flag && chroma_format_idc = = 1 ) | |
|   sps_cclm_colocated_chroma_flag | u(1) |
| } | |
| sps_mts_enabled_flag | u(1) |
| if( sps_mts_enabled_flag ) { | |
|   sps_explicit_mts_intra_enabled_flag | u(1) |
|   sps_explicit_mts_inter_enabled_flag | u(1) |
| } | |
| sps_sbt_enabled_flag | u(1) |
| if( sps_sbt_enabled_flag ) | |
|   sps_sbt_max_size_64_flag | u(1) |
| sps_affine_enabled_flag | u(1) |
| if( sps_affine_enabled_flag ) | |
|   sps_affine_type_flag | u(1) |
| sps_gbi_enabled_flag | u(1) |
| sps_ibc_enabled_flag | u(1) |
| sps_ciip_enabled_flag | u(1) |
| sps_fpel_mmvd_enabled_flag | u(1) |
| sps_triangle_enabled_flag | u(1) |
| sps_lmcs_enabled_flag | u(1) |
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |

| | Descriptor |
|---|---|
| ``` for( i = 0; i < sps_num_ladf_intervals_minus2 + 1; i++ ) {     sps_ladf_qp_offset[ i ]     sps_ladf_delta_threshold_minus1[ i ]   } } sps_extension_flag if( sps_extension_flag )   while( more_rbsp_data( ) )     sps_extension_data_flag rbsp_trailing_bits( ) } ``` | se(v)<br>ue(v)<br><br><br>u(1)<br><br><br>u(1) |

5.6 Embodiment #6

The added changes are underlined, and the removed parts are marked with [[ ]].

7.3.5.3 Adaptive Loop Filter Data Syntax

| | Descriptor |
|---|---|
| ```
alf_data( adaptation_parameter_set_id ) {
  alf_luma_filter_signal_flag
  if( ChromaArrayType != 0 )
    alf_chroma_filter_signal_flag
  if( alf_luma_filter_signal_flag ) {
    alf_luma_clip_flag
    alf_luma_num_filters_signaled_minus1
    if( alf_luma_num_filters_signaled_minus1 > 0 ) {
      for( filtIdx = 0; filtIdx < NumAlfFilters; filtIdx++ )
        alf_luma_coeff_delta_idx[ filtIdx ]
    }
    alf_luma_use_fixed_filter_flag
    if( alf_luma_use_fixed_filter_flag ) {
      alf_luma_fixed_filter_set_idx
      alf_luma_fixed_filter_pred_present_flag
      if( alf_luma_fixed_filter_pred_present_flag ) {
        for( i = 0; i < NumAlfFilters; i++ )
          alf_luma_fixed_filter_pred_flag[ i ]
      }
    }
    alf_luma_coeff_delta_flag
    if( !alf_luma_coeff_delta_flag && alf_luma_num_filters_signaled_minus1 > 0 )
      alf_luma_coeff_delta_prediction_flag
    alf_luma_min_eg_order_minus1
    for( i = 0; i < 3; i++ )
      alf_luma_eg_order_increase_flag[ i ]
    if( alf_luma_coeff_delta_flag ) {
      for( sfIdx = 0; sfIdx <= alf_luma_num_filters_signaled_minus1; sfIdx++ )
        alf_luma_coeff_flag[ sfIdx ]
    }
    for( sfIdx = 0; sfIdx <= alf_luma_num_filters_signaled_minus1; sfIdx++ ) {
      if( alf_luma_coeff_flag[ sfIdx ] ) {
        for( j = 0; j < 12; j++ ) {
          alf_luma_coeff_delta_abs[ sfIdx ][ j ]
          if( alf_luma_coeff_delta_abs[ sfIdx ][ j ] )
            alf_luma_coeff_delta_sign[ sfIdx ][ j ]
        }
      }
    }
    if( alf_luma_clip_flag ) {
      alf_luma_clip_min_eg_order_minus1
      for( i = 0; i < 3; i++ )
        alf_luma_clip_eg_order_increase_flag[ i ]
      for( sfIdx = 0; sfIdx <= alf_luma_num_filters_signaled_minus1; sfIdx++ ) {
        if( alf_luma_coeff_flag[ sfIdx ] ) {
          for( j = 0; j < 12; j++ ) {
            if( filtCoeff[ sfIdx ][ j ] )
              alf_luma_clip_idx[ sfIdx ][ j ]
          }
        }
      }
    }
  }
```| u(1)<br><br>u(1)<br><br>u(1)<br>tb(v)<br><br><br>tb(v)<br><br>u(1)<br><br>tb(v)<br>u(1)<br><br><br>u(1)<br><br><br>u(1)<br><br>u(1)<br>ue(v)<br><br>u(1)<br><br><br>u(1)<br><br><br><br><br>uek(v)<br><br>u(1)<br><br><br><br><br>ue(v)<br><br>u(1)<br><br><br><br><br>uek(v) |

|  | Descriptor |
|---|---|
| if( alf_chroma_filter_signal_flag ) { | |
|   alf_chroma_clip_flag | u(1) |
|   alf_chroma_min_eg_order_minus1 | ue(v) |
|   for( i = 0; i < 2; i++ ) | |
|     alf_chroma_eg_order_increase_flag[ i ] | u(1) |
|   for( j = 0; j < 6; j++ ) { | |
|     alf_chroma_coeff_abs[ j ] | uek(v) |
|     if( alf_chroma_coeff_abs[ j ] > 0 ) | |
|       alf_chroma_coeff_sign[ j ] | u(1) |
|   } | |
|   if( alf_chroma_clip_flag ) { | |
|     alf_chroma_clip_min_eg_order_minus1 | ue(v) |
|     for( i = 0; i < 2; i++ ) | |
|       alf_chroma_clip_eg_order_increase_flag[ i ] | u(1) |
|     for( j = 0; j < 6; j++ ) { | |
|       if( alf_chroma_coeff_abs[ j ] ) | |
|         alf_chroma_clip_idx[ j ] | uek(v) |
|     } | |
|   } | |
| } | |
| } | | alf_chroma_filter_signal_flag equal to 1 specifies that a chroma filter is signaled. alf_chroma_filter_signal_flag equal to 0 specifies that a chroma filter is not signaled. When ChromaArrayType is equal to 0, alf_chroma_filter_signal_flag shall be equal to 0.

5.7 Embodiment #7

The added changes are underlined, and the removed parts are marked with [[ ]].

|  | Descriptor |
|---|---|
| slice_header( ) { | |
|   ... | |
|   if( sps_sao_enabled_flag ) { | |
|     slice_sao_luma_flag | u(1) |
|     if( ChromaArrayType != 0 ) | |
|       slice_sao_chroma_flag | u(1) |
|   } | |
|   if( sps_alf_enabled_flag ) { | |
|     slice_alf_enabled_flag | u(1) |
|     if( slice_alf_enabled_flag ) { | |
|       num_alf_aps_ids | tb(v) |
|       for( i = 0; i < num_alf_aps_ids; i++ ) | |
|         slice_alf_aps_id_luma[ i ] | u(5) |
|       <u>if( ChromaArrayType != 0 ){</u> | |
|       slice_alf_chroma_idc | tu(v) |
|       if( slice_alf_chroma_idc && (slice_type != I || num_alf_aps_ids != 1 ) ) | |
|         slice_alf_aps_id_chroma | u(5) |
|     <u>}</u> | |
|     } | |
|   } | |
|   dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|     } | |
|   } | |
|   if( sps_lmcs_enabled_flag ) { | |
|     slice_lmcs_enabled_flag | u(1) |
|     if( slice_lmcs_enabled_flag ) { | |
|       slice_lmcs_aps_id | u(5) |
|       <u>if( ChromaArrayType != 0 ) {</u> | |
|       if( !( qtbtt_dual_tree_intra_flag && slice-type == I ) ) | |
|         slice_chroma_residual_scale_flag | u(1) |
|     <u>}</u> | |
|   } | |

-continued

|  | Descriptor |
| --- | --- |
| if ( entropy_coding_sync_enabled_flag )<br>   num_entry_point_offsets | ue(v) |
| if( NumEntryPoints > 0 ) {<br>   offset_len_minus1 | ue(v) |
|    for( i = 0; i < NumEntryPoints; i++ )<br>     entry_point_offset_minus1[ i ] | u(v) |
| }<br>   byte_alignment( )<br>} |  | bit_depth_chroma_minus8 specifies the bit depth of the samples of the chroma arrays $BitDepth_C$ and the value of the chroma quantization parameter range offset $QpBdOffset_C$ as follows:

$$BitDepth_C = 8 + bit\_depth\_chroma\_minus8 \quad (7\text{-}5)$$

$$QpBdOffset_C = 6 * bit\_depth\_chroma\_minus8 \quad (7\text{-}6)$$

bit_depth_chroma_minus8 shall be in the range of 0 to 8, inclusive. When ChromaArrayType is equal to 0, bit_depth_chroma_minus8 is not used in the decoding process and decoders shall ignore its value.
slice_alf_chroma_idc equal to 0 specifies that the adaptive loop filter is not applied to Cb and Cr colour components.
slice_alf_chroma_idc equal to 1 indicates that the adaptive loop filter is applied to the Cb colour component.
slice_alf_chroma_idc equal to 2 indicates that the adaptive loop filter is applied to the Cr colour component.
slice_alf_chroma_idc equal to 3 indicates that the adaptive loop filter is applied to Cb and Cr colour components.
When slice_alf_chroma_idc is not present, it is inferred to be equal to 0. When ChromaArrayType is equal to 0 slice_alf_chroma_idc is not present, as it is not used in the decoding process and decoders shall ignore its value. The maximum value maxVal of the truncated unary binarization tu(v) is set equal to 3.
slice_alf_aps_id_chroma specifies the adaptation_parameter_set_id that the chroma component of the slice refers to. When slice_alf_aps_id_chroma is not present, it is inferred to be equal to slice_alf_aps_id_luma[0]. The TemporalId of the ALF APS NAL unit having adaptation_parameter_set_id equal to slice_alf_aps_id_chroma shall be less than or equal to the TemporalId of the coded slice NAL unit.
For intra slices and slices in an TRAP picture, slice_alf_aps_id_chroma shall not refer to an ALF APS associated with other pictures rather than the picture containing the intra slices or the IRAP picture.
When ChromaArrayType is equal to 0, slice_alf_aps_id_chroma is not present, as it is not used in the decoding process and decoders shall ignore its value.
slice_chroma_residual_scale_flag equal to 1 specifies that chroma residual scaling is enabled for the current slice.
slice_chroma_residual_scale_flag equal to 0 specifies that chroma residual scaling is not enabled for the current slice.
When slice_chroma_residual_scale_flag is not present, it is inferred to be equal to 0. When ChromaArrayType is equal to 0, slice_chroma_residual_scale_flag is not present, as it is not used in the decoding process.
alf_chroma_filter_signal_flag equal to 1 specifies that a chroma filter is signaled. alf_chroma_filter_signal_flag equal to 0 specifies that a chroma filter is not signaled. When ChromaArrayType is equal to 0, alf_chroma_filter_signal_flag shall be equal to 0.

6. Example Implementations of the Disclosed Technology

Figure 16:
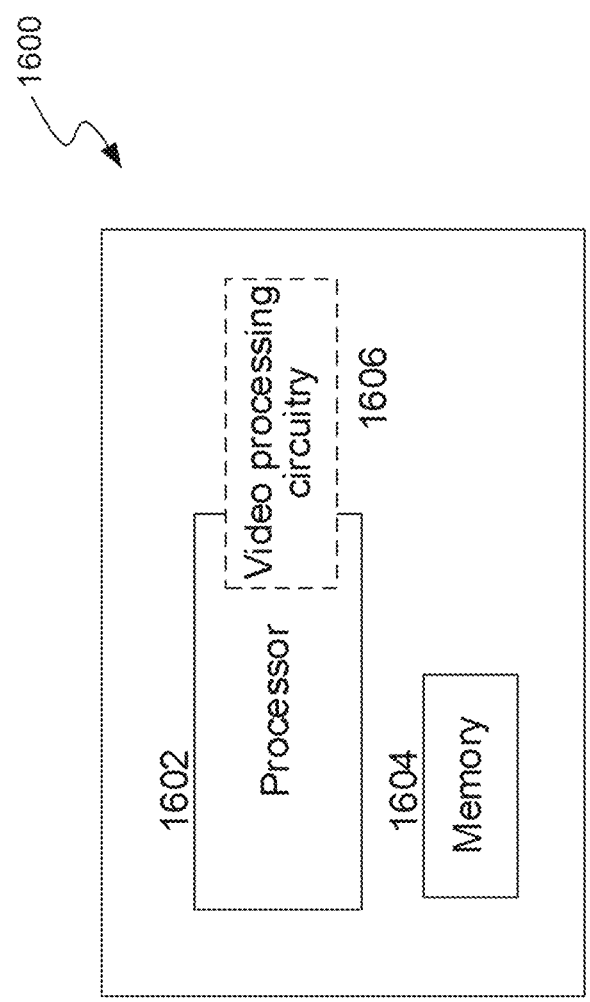
FIG. 16 is a block diagram of an example of a hardware platform for implementing a visual media decoding or a visual media encoding technique described in the present document.

FIG. 16 is a block diagram of a video processing apparatus 1600. The apparatus 1600 may be used to implement one or more of the methods described herein. The apparatus 1600 may be embodied in a smartphone, tablet, computer, Internet of Things (IoT) receiver, and so on. The apparatus 1600 may include one or more processors 1602, one or more memories 1604 and video processing hardware 1606. The processor(s) 1602 may be configured to implement one or more methods described in the present document. The memory (memories) 1604 may be used for storing data and code used for implementing the methods and techniques described herein. The video processing hardware 1606 may be used to implement, in hardware circuitry, some techniques described in the present document, and may be partly or completely be a part of the processors 1602 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a block may be encoded in terms of transformed and coded error residual values and also using bits in headers and other fields in the bitstream. Herein, the video block may be a logical unit corresponding to the processing operation being performed, e.g., a coding unit, a transform unit, a prediction unit, and so on.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 17:
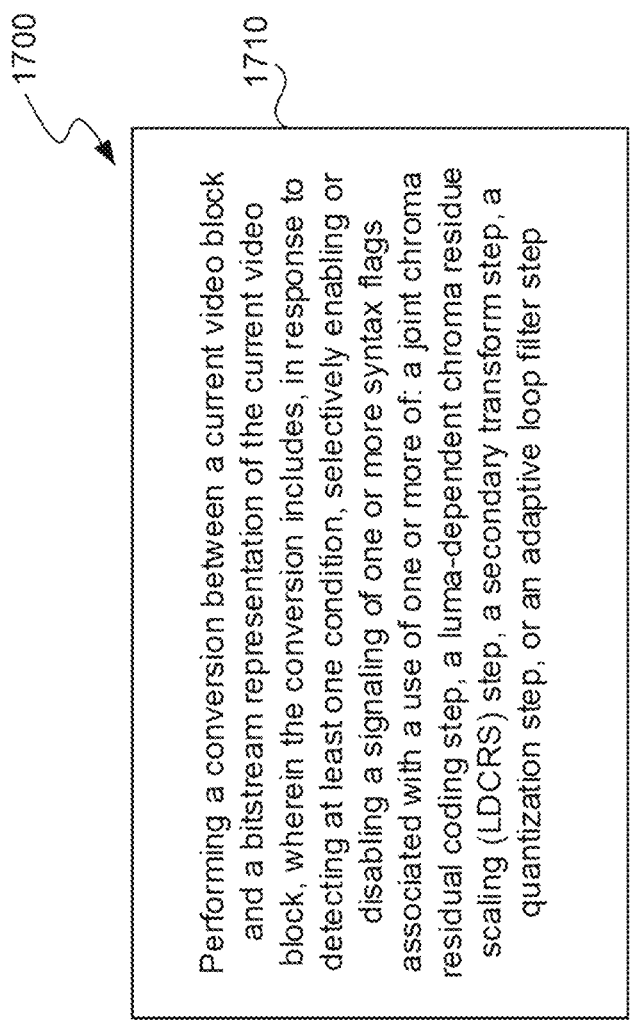
FIG. 17 shows a flowchart of an example method for video coding.

FIG. 17 is a flowchart for an example method 1700 of video processing. The method 1700 includes, at 1710, performing a conversion between a current video block and a bitstream representation of the current video block, wherein the conversion includes, in response to detecting at least one condition, selectively enabling or disabling a signaling of one or more syntax flags associated with a use of one or more of: a joint chroma residual coding step, a luma-dependent chroma residue scaling (LDCRS) step, or an adaptive loop filter step.

Some embodiments may be described using the following clause-based format.

1. A method for video processing, comprising: performing a conversion between a current video block and a bitstream representation of the current video block, wherein the conversion includes, in response to detecting at least one condition, selectively enabling or disabling a signaling of one or more syntax flags associated with a use of one or more of: a joint chroma residual coding step, a Luma-dependent chroma residue scaling (LDCRS) step, a secondary transform step, a quantization step, or an adaptive loop filter step.

2. The method of clause 1, wherein the one or more syntax flags are related to any of: chroma delta quantization parameters, a Binary value indicating whether the joint chroma residual coding is performed or not, a usage of a secondary transform step, a number of bits used to represent PCM sample values of a chroma component, an index of a chroma secondary transform matrix, a Binary value indicating whether the joint chroma residual coding is performed or not, or a Binary value indicating whether a dual tree coding step is performed or not.

3. The method of any one or more of clauses 1-2, wherein the one or more syntax flags correspond to values of one or more of the following: pps_joint_cbcr_qp_offset, tu_cb_cr_joint_residual, st_idx, pps_cb_qp_offset, pps_cr_qp_offset, slice_chroma_residual_scale_flag, pcm_sample_bit_depth_chroma_minus1, qtbtt_dual_tree_intra_flag, sps_cclm_enabled_flag, or sps_st_enabled_flag.

4. The method of any one or more of clauses 1-3, wherein the one or more syntax flags are associated with a sequence, a view, a picture, a slice, a tile, a tie group, a coding block, a transform block, a prediction unit, or other video data units.

5. The method of any one or more of clauses 1-4, wherein the at least one condition is associated with a chroma format, existence of a separate plane coding step, a value of a ChromaArrayType variable, or a value of a flag in the one or more syntax flags, or application of a secondary transform to the current video block.

6. The method of any one or more of clauses 1-5, further comprising:
based on the one or more syntax flags, determining to apply a decoding step to the current video block.

7. A method for video processing, comprising:
performing a conversion between a current video block and a bitstream representation of the current video block, wherein the conversion includes, in response to detecting at least one condition, selectively enabling or disabling a signaling of one or more syntax flags associated with a use of one or more of: a joint chroma residual coding step, a Luma-dependent chroma residue scaling (LDCRS) step, a secondary transform step, a quantization step, or an adaptive loop filter step, wherein a first chroma component of the current video block is associated with a first reduced secondary transform (RST) matrix, and a second chroma component of the current video block is associated with a second RST matrix.

8. The method of clause 7, wherein a first flag is associated with the first RST matrix and a second flag is associated with the second RST matrix, wherein the first flag and the second flag are included in the one or more syntax flags.

9. The method of clause 7, wherein the first RST matrix is sent in the bitstream representation and the second RST matrix is derived.

10. The method of clause 7, wherein the second flag is based, at least in part, on the first flag.

11. The method of clause 7, wherein the second RST matrix is derived from a representative luma block.

12. The method of clause 7, wherein the second RST matrix is derived from the first RST matrix, wherein the first RST matrix is unequal to the second RST matrix.

13. The method of clause 7, wherein the second RST matrix is derived from a chroma intra mode.

14. The method of clause 8, further comprising:
in response to determining that the joint chroma residual coding step is enabled for the current video block, disabling a signaling of the first RST flag and/or the second flag.

15. The method of any one or more of clauses 7-14, further comprising:
in response to determining that the joint chroma residual coding step is enabled for the current video block, applying the first RST matrix and/or the second matrix.

16. A method for video processing, comprising:
performing a conversion between a current video block and a bitstream representation of the current video block, wherein the conversion includes, in response to detecting at least one condition, selectively enabling or disabling a signaling of one or more syntax flags associated with a use of one or more of: a joint chroma residual coding step, a Luma-dependent chroma residue scaling (LDCRS) step, a secondary transform step, a quantization step, or an adaptive loop filter step, wherein a first chroma component of the current video block is associated with a first reduced secondary transform (RST) matrix, and a second chroma component of the current video block is associated with a second RST matrix; and
in response to determining that the joint chroma residual coding step is enabled for the current video block, disabling a signaling of a flag related to the usage of the CCLM on one or more chroma components of the current video block, wherein a flag in the one or more syntax flags are related to a usage of a cross-component linear model (CCLM).

17. The method of clause 16, further comprising:
in response to determining that the joint chroma residual coding step is enabled for the current video block, disabling a usage of the CCLM on the current video block.

18. The method of clause 16, further comprising:
in response to determining that the CCLM is applied to the current video block, disabling the joint chroma residual coding step on the current video block.

19. The method of clause 16, further comprising:
enabling a usage of the CCLM and the usage of the joint chroma residual coding step on the current video block.

20. The method of clause 16, wherein the joint chroma residual coding step spans at least two chroma residual components, wherein correlation between the two chroma residual components is based, at least in part on, coefficients related to the CCLM.

21. The method of any one or more of clauses 16-20, wherein the usage of the CLLM includes usage of a LM-T mode or a LM-L mode.

22. The method of any one or more of clauses 1-21, wherein the one or more syntax flags are individually signaled or combined into a single flag.

23. The method of any one or more of clauses 1-22, further comprising:
in response to determining that the joint chroma residual coding step is enabled, disabling the Luma-dependent chroma residue scaling (LDCRS) step.

24. The method of any one or more of clauses 1-23, wherein the one or more syntax flags are individually signaled or combined into a single flag.

25. A method for video processing, comprising making a decision, for a current video block, regarding a selective inclusion of one or more coded block flags in a bitstream representation of the current video block, and performing, based on the decision, a conversion between the current video block and the bitstream representation of the current video block, wherein the selective inclusion is based on a color format, a component coding method of the current video block or a coding mode of the current video block.

26. The method of clause 25, wherein a coded block flag for a coding unit (cu_cbf/cu_coded_flag) is not signaled when the color format is 4:0:0 or the component coding method is a separate plane coding method.

27. The method of clause 25, wherein a coded block flag for a luma component of the current video block (tu_cbf luma/tu_y_coded_flag) is not signaled when the color format is 4:0:0 or the component coding method is a separate plane coding method.

28. The method of clause 25, wherein a coded block flag for a luma component of the current video block (tu_cbf luma/tu_y_coded_flag) is not signaled when the color format is 4:0:0 and the current video block is coded with a non-skip inter mode.

29. The method of clause 25, where a coded block flag for one or more chroma components of the current video block (tu_cbf_cr/tu_cr_coded_flag or tu_cbf_cb/tu_cb_coded_flag) is not signaled when the color format is 4:0:0 or the component coding method is a separate plane coding method.

30. The method of clause 25, where signaling a coded block flag for one or more chroma components of the current video block (tu_cbf_cr/tu_cr_coded_flag or tu_cbf_cb/tu_cb_coded_flag) is based on a coded block flag for a luma component of the current video block (tu_cbf luma/tu_y_coded_flag).

31. A method for video processing, comprising making a decision, for a current video block, regarding a selective application of a reduced secondary transform (RST) to the current video block based on a number of non-zero coefficients in one or more color components of the current video block, and performing, based on the decision, a conversion between the current video block and a bitstream representation of the current video block.

32. The method of clause 31, wherein making the decision further comprises comparing the number of non-zero coefficients to a threshold that depends on a color format or a component coding method of the current video block.

33. The method of clause 32, wherein the threshold is 1, wherein the color format is 4:0:0 or the component coding method is a separate plane coding method.

34. The method of clause 32, wherein the threshold is 2, wherein the color format is different from 4:0:0 and the component coding method is different from a separate plane coding method.

35. The method of clause 31, wherein the selective application is based on the number of non-zero coefficients in only the luma component of the current video block.

36. A method of video processing, comprising: performing a conversion between a current video block and a bitstream representation of the current video block, wherein, the bitstream representation is based on selective inclusion of syntax elements indicative of an information about chroma coding based on a characteristic of chroma.

37. The method of clause 36, wherein the information about chroma coding includes bit depth information for chroma array samples and/or values of chroma quantization parameter range offsets and wherein the characteristic of chroma comprises a chroma format.

38. The method of clause 36, wherein the information about chroma coding includes inforamtion about adaptive loop filtering used during the conversion nad wherein the characteristic of chroma corresponds to whether or not ChromaArrayType syntax element is equal to a specific value.

39. The method of clause 36, wherein the information about chroma coding includes information about adaptive loop filtering used during the conversion and wherein the characteristic of chroma corresponds to whether or not a chroma format is 4:0:0.

40. The method of clause 36, wherein the information about chroma coding includes information about palette modes or intra block copy modes for chroma and wherein the characteristic of chroma corresponds to whether or not ChromaArrayType syntax element is equal to a specific value.

Additional examples and embodiments of clauses 36 to 40 are provided in items 5, 7, 8 and 12 of the previous section.

41. An apparatus in a video system comprising a processor and a non-transitory memory with instructions thereon, wherein the instructions upon execution by the processor, cause the processor to implement the method in any one of clauses 1 to 40.

42. A computer program product stored on a non-transitory computer readable media, the computer program product including program code for carrying out the method in any one of clauses 1 to 40.

Figure 22:
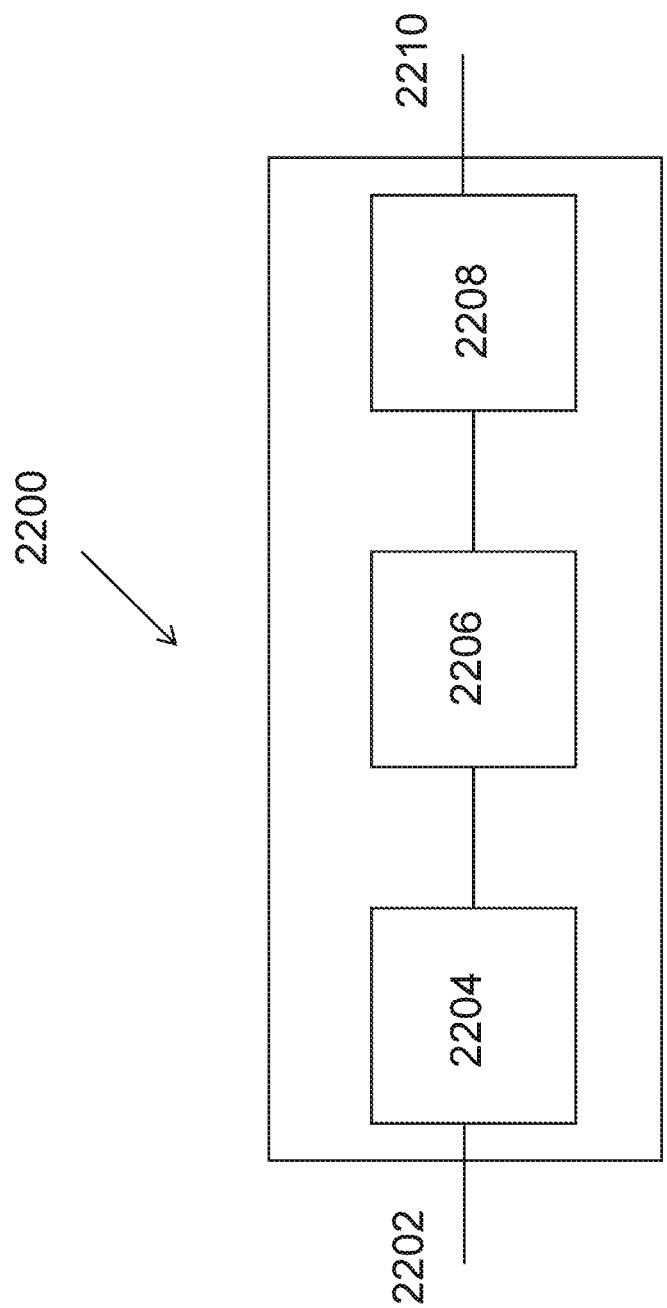
FIG. 22 is a block diagram of an example video processing system in which disclosed techniques may be implemented.

FIG. 22 is a block diagram showing an example video processing system 2200 in which various techniques disclosed herein may be implemented. Various implementations may include some or all of the components of the system 2200. The system 2200 may include input 2202 for receiving video content. The video content may be received in a raw or uncompressed format, e.g., 8 or 10 bit multi-component pixel values, or may be in a compressed or encoded format. The input 2202 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2200 may include a coding component 2204 that may implement the various coding or encoding methods described in the present document. The coding component 2204 may reduce the average bitrate of video from the input 2202 to the output of the coding component 2204 to produce a coded representation of the video. The coding techniques are therefore sometimes called video compression or video transcoding techniques. The output of the coding component 2204 may be either stored, or transmitted via a communication connected, as represented by the component 2206. The stored or communicated bitstream (or coded) representation of the video received at the input 2202 may be used by the component 2208 for generating pixel values or displayable video that is sent to a display interface 2210. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 23:
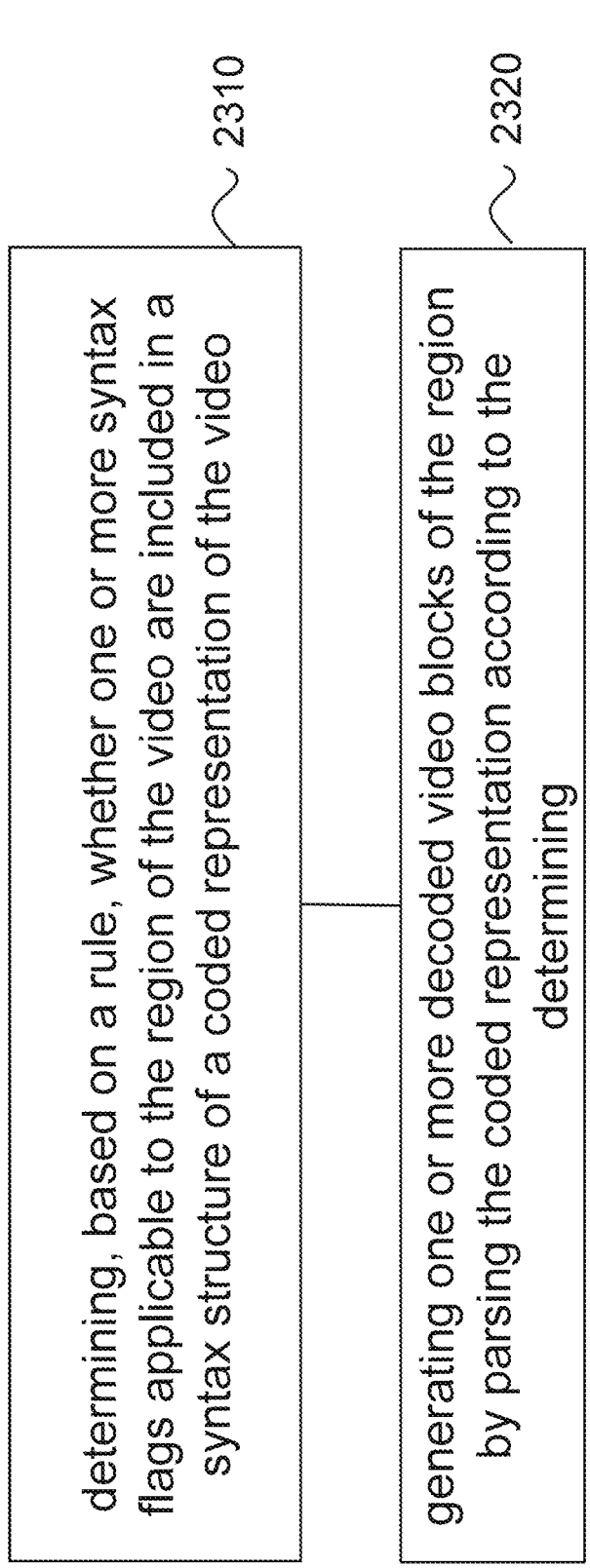
FIG. 23 is a flowchart representation of a method for video decoding in accordance with the present technology.

FIG. 23 is a flowchart representation of a method 2300 for video decoding in accordance with the present technology. The method 2300 includes, at opeartion 2310, determining, based on a rule, whether one or more syntax flags applicable to a region of the video are included in a syntax structure of a coded representation of the video. The one or more syntax flags are indicative of a joint chroma residual coding step for representing the region in the coded representation. The method 2300 also includes, at operation 2320, generating one or more decoded video blocks of the region by parsing the coded representation according to a presence or an absence of the one or more syntax flags in the coded representation.

Figure 24:
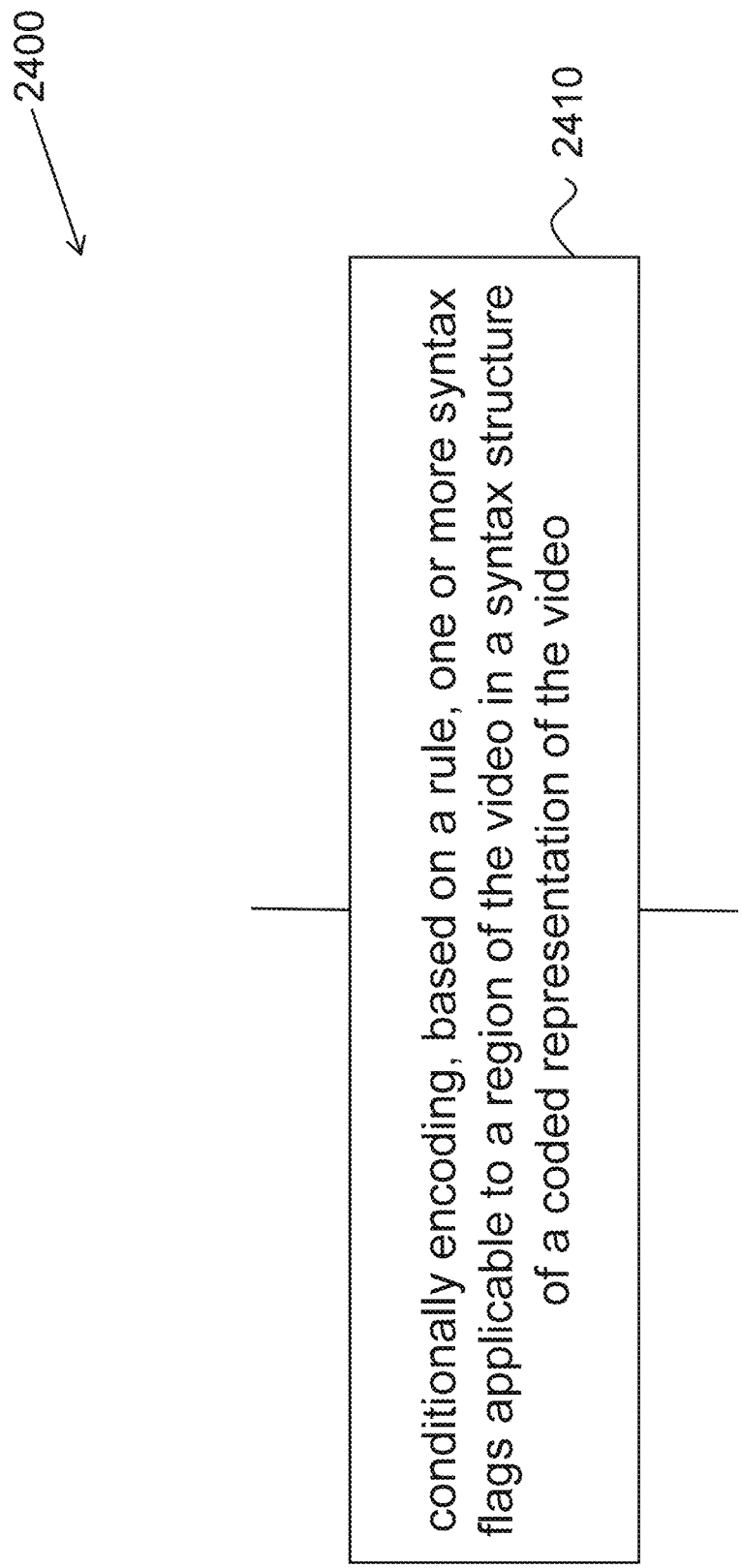
FIG. 24 is a flowchart representation of a method for video encoding in accordance with the present technology.

FIG. 24 is a flowchart representation of a method 2400 for video encoding in accordance with the present technology. The method 2400 includes, at operation 2410, conditionally encoding, based on a rule, one or more syntax flags applicable to a region of the video in a syntax structure of a coded representation of the video. The one or more syntax flags indicative of a joint chroma residual coding step for representing the region in the coded representation.

In some embodiments, the rule is indicated based on a chroma format of the region of the video. In some embodiments, determining the chroma format comprises determining whether chroma components are coded separately. In some embodiments, the one or more syntax flags are absent in the coded representation in case the chroma components are coded separately. In some embodiments, the one or more syntax flags are present in the coded representation in case the chroma components are not coded separately.

In some embodiments, the rule indicates that the one or more syntax flags are absent in the coded representation in case the chroma format is 4:0:0. In some embodiments, the rule indicates that the one or more syntax flags are present in the coded representation in case the chroma format is not 4:0:0. In some embodiments, the rule indicates that the chroma format is indicated by a variable ChromaArrayType in the coded representation. In some embodiments, the rule indicates that the one or more syntax flags are absent in the coded representation in case the variable ChromaArrayType is equal to a predetermined value. In some embodiments, the rule indicates that the one or more syntax flags are present in the coded representation in case the variable ChromaArrayType is not equal to a predetermined value. In some embodiments, the predetermined value is 0.

In some embodiments, the region comprises a sequence. In some embodiments, one flag is signaled in a sequence parameter set. In some embodiments, the region comprises a picture. In some embodiments, multiple flags are signaled in a picture parameter set, the multiple flags are related to a quantization paramter offset. In some embodiments, the region comprises a transform unit. In some embodiments, one flag associated with the transform unit is related to a usage of the joint chroma residual coding step. In some embodiments, the region comprises a slice. In some embodiments, the region comprises a view or a tile group.

Figure 25:
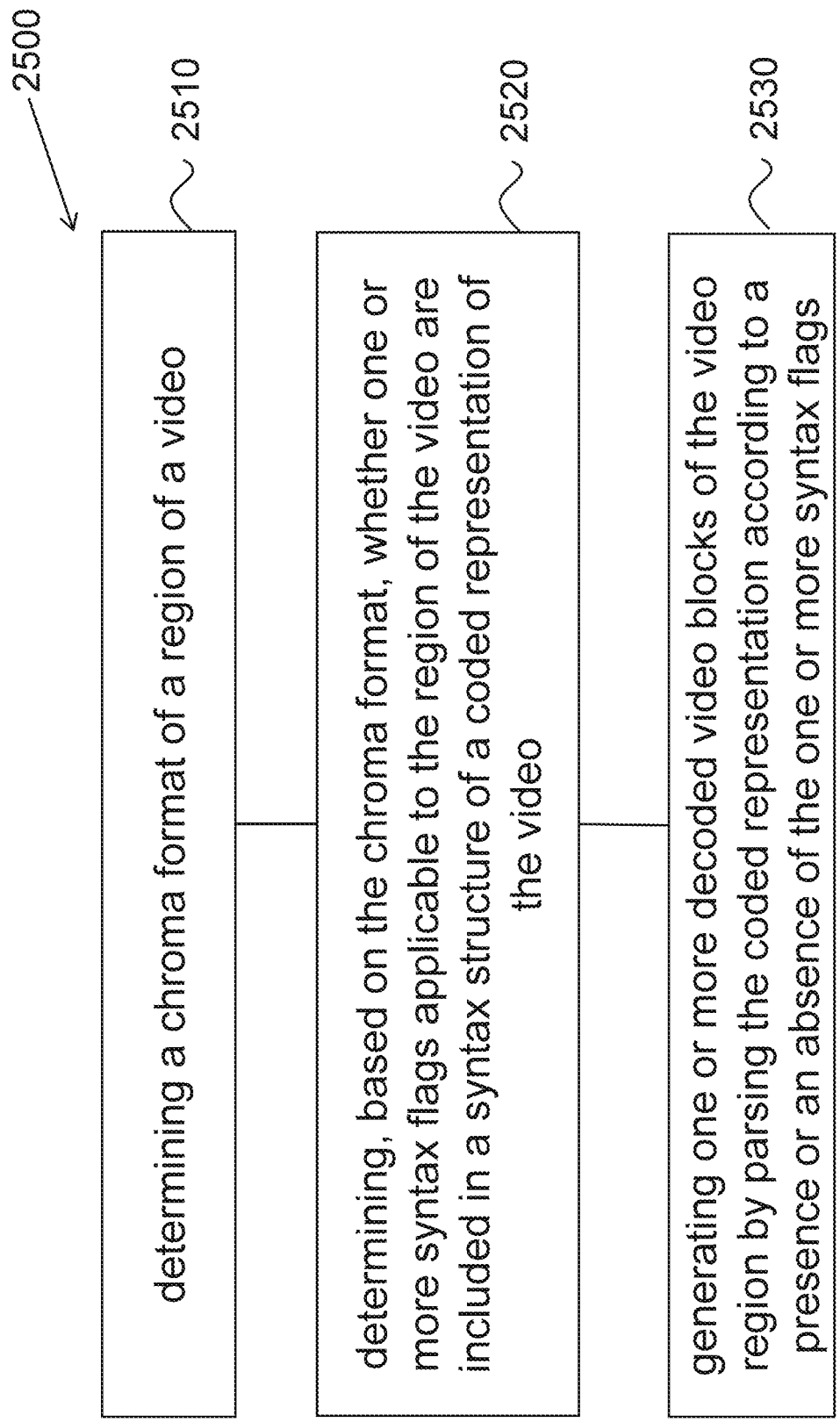
FIG. 25 is a flowchart representation of another method for video decoding in accordance with the present technology.

FIG. 25 is a flowchart representation of a method 2500 for video decoding in accordance with the present technology. The method 2500 includes, at opeartion 2510, determining a chroma format of a region of a video. The method 2500 includes, at operation 2520, determining, based on the chroma format, whether one or more syntax flags applicable to the region of the video are included in a syntax structure of a coded representation of the video. The one or more syntax flags are indicative of use of a quantization parameter offset for representing the region in the coded representation. The method 2500 also includes, at operation 2530, generating one or more decoded video blocks of the video region by parsing the coded representation according to a presence or an absence of the one or more syntax flags.

Figure 26:
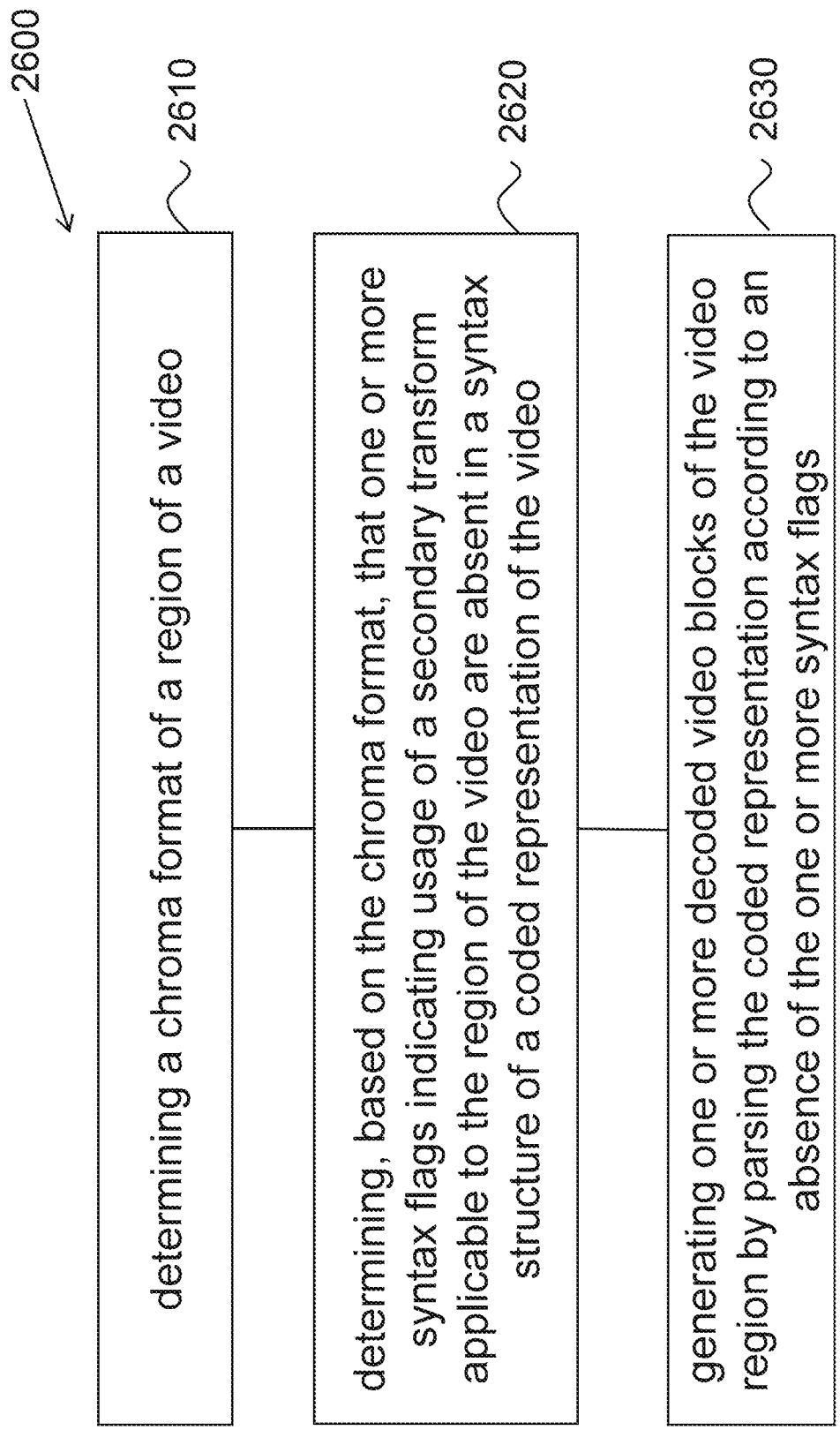
FIG. 26 is a flowchart representation of another method for video decoding in accordance with the present technology.

FIG. 26 is a flowchart representation of a method 2600 for video decoding in accordance with the present technology. The method 2600 includes, at opeartion 2610, determining a chroma format of a region of a video. The method 2600 includes, at operation 2620, determining, based on the chroma format, that one or more syntax flags indicating usage of a secondary transform applicable to the region of the video are absent in a syntax structure of a coded representation of the video. The secondary transform is applied between a de-quantization step and an inverse primary transform. The method 2600 also includes, at operation 2630, generating one or more decoded video blocks of the video region by parsing the coded representation according to an absence of the one or more syntax flags.

In some embodiments, generating the one or more decoded video blocks is based on the determining of the chroma format. In some embodiments, the method includes discarding, in case the one or more syntax flags are present in the coded representation, the one or more syntax flags for generating the one or more decoded video blocks.

Figure 27:
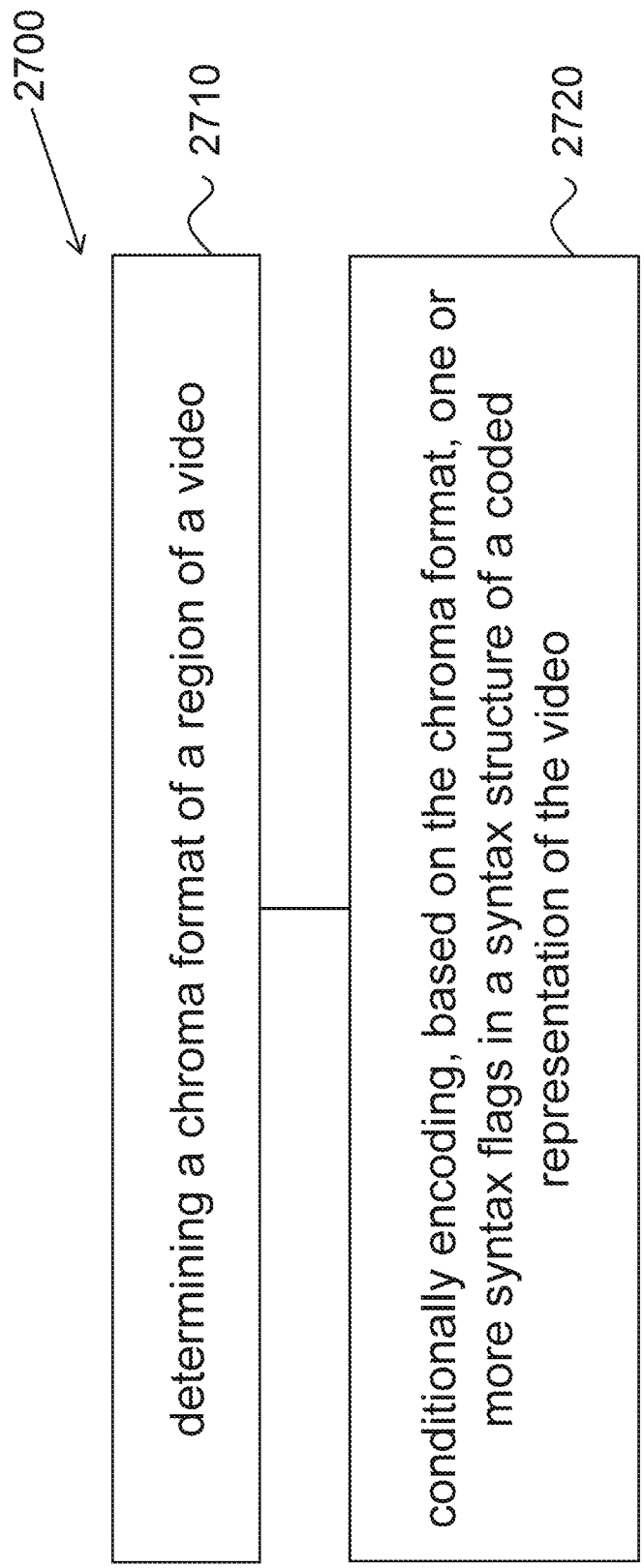
FIG. 27 is a flowchart representation of another method for video encoding in accordance with the present technology.

FIG. 27 is a flowchart representation of a method 2700 for video encoding in accordance with the present technology. The method 2700 includes, at operation 2710, determining a chroma format associated with a region of a video. The method 2700 also includes, at operation 2720, conditionally encoding, based on the chroma format, one or more syntax flags in a syntax structure of a coded representation of the video. The one or more syntax flags are indicative that use of a quantization parameter offset for representing the region in the coded representation is enabled.

Figure 28:
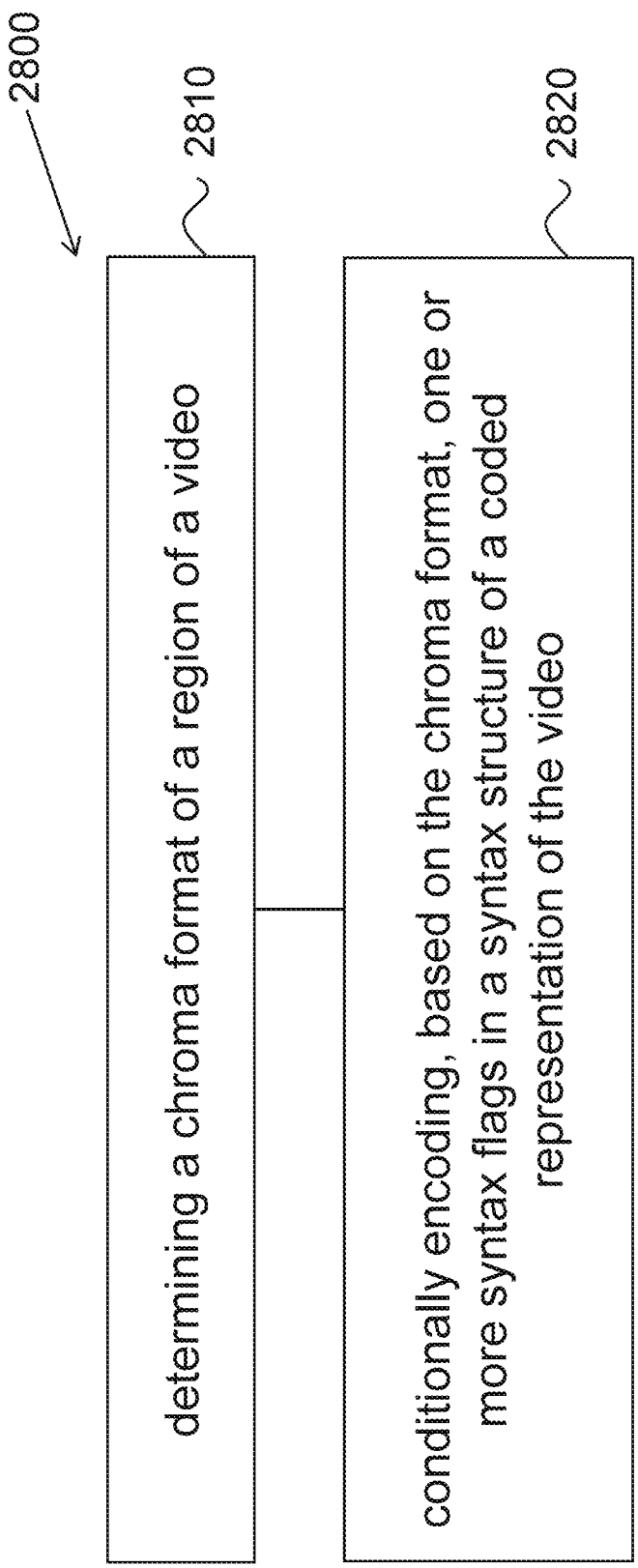
FIG. 28 is a flowchart representation of another method for video encoding in accordance with the present technology.

FIG. 28 is a flowchart representation of a method 2800 for video encoding in accordance with the present technology. The method 2800 includes, at operation 2810, determining a chroma format of a region of a video. The method 2800 also includes, at operation 2820, generating, based on the chroma format, a coded representation of the video by encoding the region without including one or more syntax flags indicating usage of a secondary transform in a syntax structure of the coded representation of the video. The secondary transform is applied between a forward primary transform and a quantization step.

In some embodiments, determining the chroma format comprises determining whether the color components of the chroma format are coded separately. In some embodiments, the region comprises a picture.

In some embodiments, the one or more syntax flags are absent in the coded representation in case (1) the chroma format is not 4:0:0, or (2) the color components of the chroma format are coded separately. In some embodiments, the one or more syntax flags are present in the coded representation in case (1) the chroma format is not 4:0:0, or (2) the color components of the chroma format are coded not separately.

In some embodiments, the chroma format is indicated by a variable ChromaArrayType in the bitstream representation. In some embodiments, the one or more syntax flags are absent in the coded representation in case the variable ChromaArrayType is equal to a predetermined value. In some embodiments, the one or more syntax flags are present in the coded representation in case the variable ChromaArrayType is not equal to a predetermined value. In some embodiments, the predetermined value is 0.

In some embodiments, the level corresponding to the region comprises a sequence level. In some embodiments, the determining of the chroma format comprises a single step of determining a variable ChromaArrayType. In some embodiments, the one or more syntax flags are ordered in the coded representation in case the variable ChromaArrayType is unequal to a predefined value. In some embodiments, the predefined value is 0. In some embodiments, the one or more syntax flags comprise at least one of (1) qtbtt_dual_tree_intra_flag, (2) sps_cclm_enabled_flag, or (3) pcm_sample_bit_ depth_chroma_minus1.

In some embodiments, the one or more decoded video blocks is generated without applying an adaptive loop filter, a secondary transform, a chroma residual scaling step, or a quantization scaling matrix to a block of the video in case (1) the variable ChromaArrayType is equal to a predetermined value, (2) the chroma format is 4:0:0, or (3) the color components of the chroma format are coded separately. In some embodiments, generating the one or more decoded video blocks comprises applying an adaptive loop filter, a secondary transform, a chroma residual scaling step, or a quantization scaling matrix to a block of the video in case (1) the variable ChromaArrayType is unequal to a predetermined value.

In some embodiments, a joint chroma residual coding step is indicated as disabled in the coded representation in case the chroma format is 4:0:0 or the color components of the chroma format are coded separately. In some embodiments, wherein a chroma adaptive loop filtering process is indicated as disabled in the coded representation in case the chroma format is 4:0:0 or the color components of the chroma format are coded separately. In some embodiments, a chroma secondary transform is indicated as disabled in the coded representation in case the chroma format is 4:0:0 or the color components of the chroma format are coded separately. In some embodiments, an index of a chroma secondary transform matrix is set to a predetermined value in the coded representation in case the chroma format is 4:0:0 or the color components of the chroma format are coded separately. In some embodiments, a chroma quantization parameter offset used in a joint chroma residual coding step is set to a predetermined value in the coded representation in case the chroma format is 4:0:0 or the color components of the chroma format are coded separately. In some embodiments, a usage of luma dependent chroma residual scaling is set to a predetermined value in the coded representation in case the chroma format is 4:0:0 or the color components of the chroma format are coded separately. In some embodiments, a chroma quantization parameter offset at a picture level is set to a predetermined value in the coded representation in case the chroma format is 4:0:0 or the color components of the chroma format are coded separately. In some embodiments, the predetermined value is 0.

FIG. 29A is a flowchart representation of a method 2900 for video encoding in accordance with the present technology. The method 2900 includes, at operation 2910, determining, based on a chroma format of a video comprising a region, whether one or more syntax flags applicable to the region of the video are absent in a syntax structure of a coded representation of the video. The one or more syntax flags are indicative of usage of a luma-dependent chroma residue scaling coding step for representing the region in the coded representation. The luma-dependent chroma residue scaling coding step comprises a multiplicative process that compensates a luma signal of the video with a chroma signal of the video. The method 2900 includes, at operation 2920, generating one or more decoded video blocks of the video region by parsing the coded representation according to the determining.

Figure 29B:
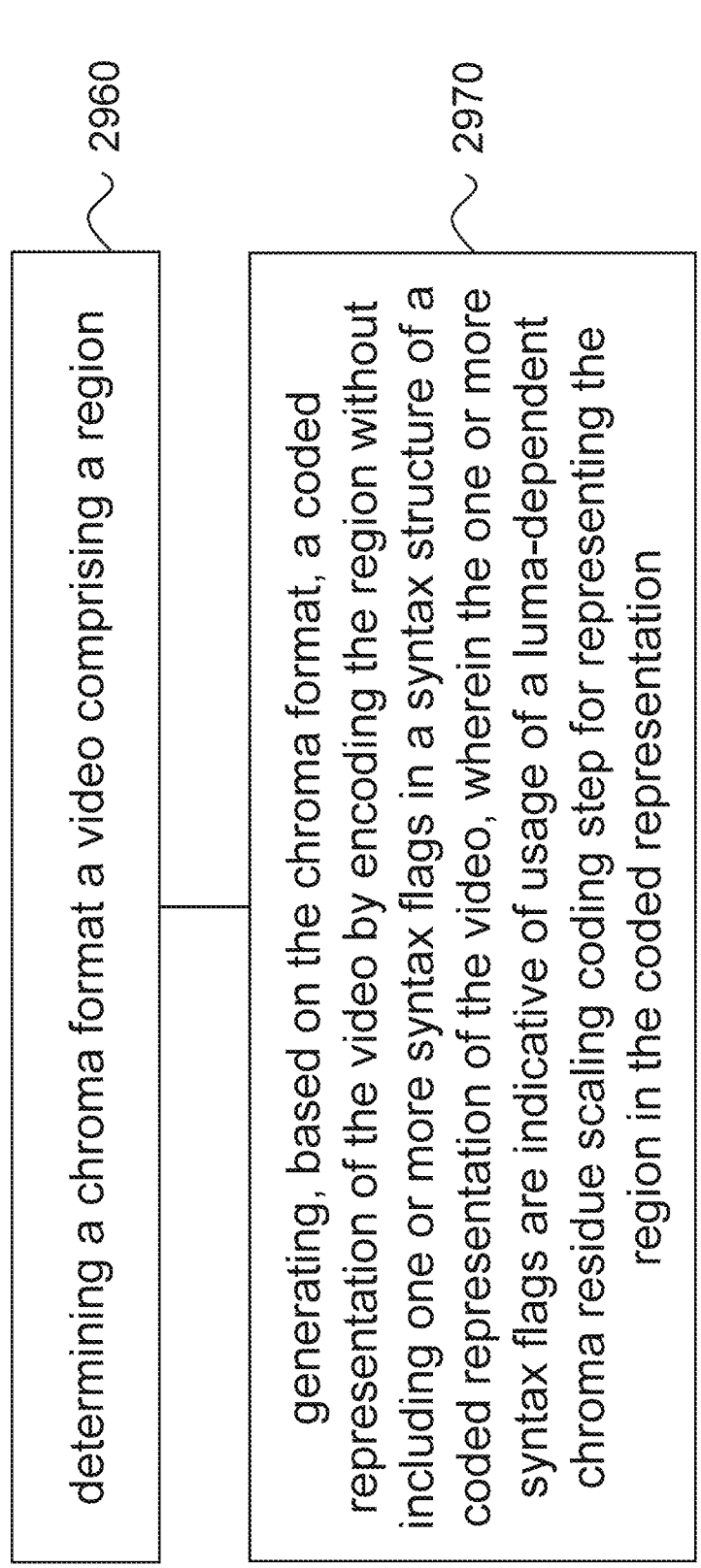
FIG. 29B is a flowchart representation of another method for video encoding in accordance with the present technology.

FIG. 29B is a flowchart representation of a method 2950 for video encoding in accordance with the present technology. The method 2950 includes, at operation 2960, determining a chroma format a video comprising a region. The method 2950 includes, at operation 2970, generating, based on the chroma format, a coded representation of the video by encoding the region without including one or more syntax flags in a syntax structure of a coded representation of the video, wherein the one or more syntax flags are indicative of usage of a luma-dependent chroma residue scaling coding step for representing the region in the coded representation, wherein the luma-dependent chroma residue scaling coding step comprising a multiplicative process that compensates a luma signal of the video with a chroma signal of the video.

FIG. 30A is a flowchart representation of a method 3000 for video encoding in accordance with the present technology. The method 3000 includes, at operation 3010, determining, based on a chroma format of a video comprising a region, that one or more syntax flags applicable to the region of the video are absent in a syntax structure of a coded representation of the video. The one or more syntax flags are indicative of a number of bits used to represent each of Pulse Code Modulation sample values of chroma components. The method 3000 includes, at operation 3020, generating one or more decoded video blocks of the video region by parsing the coded representation according to the determining.

Figure 30B:
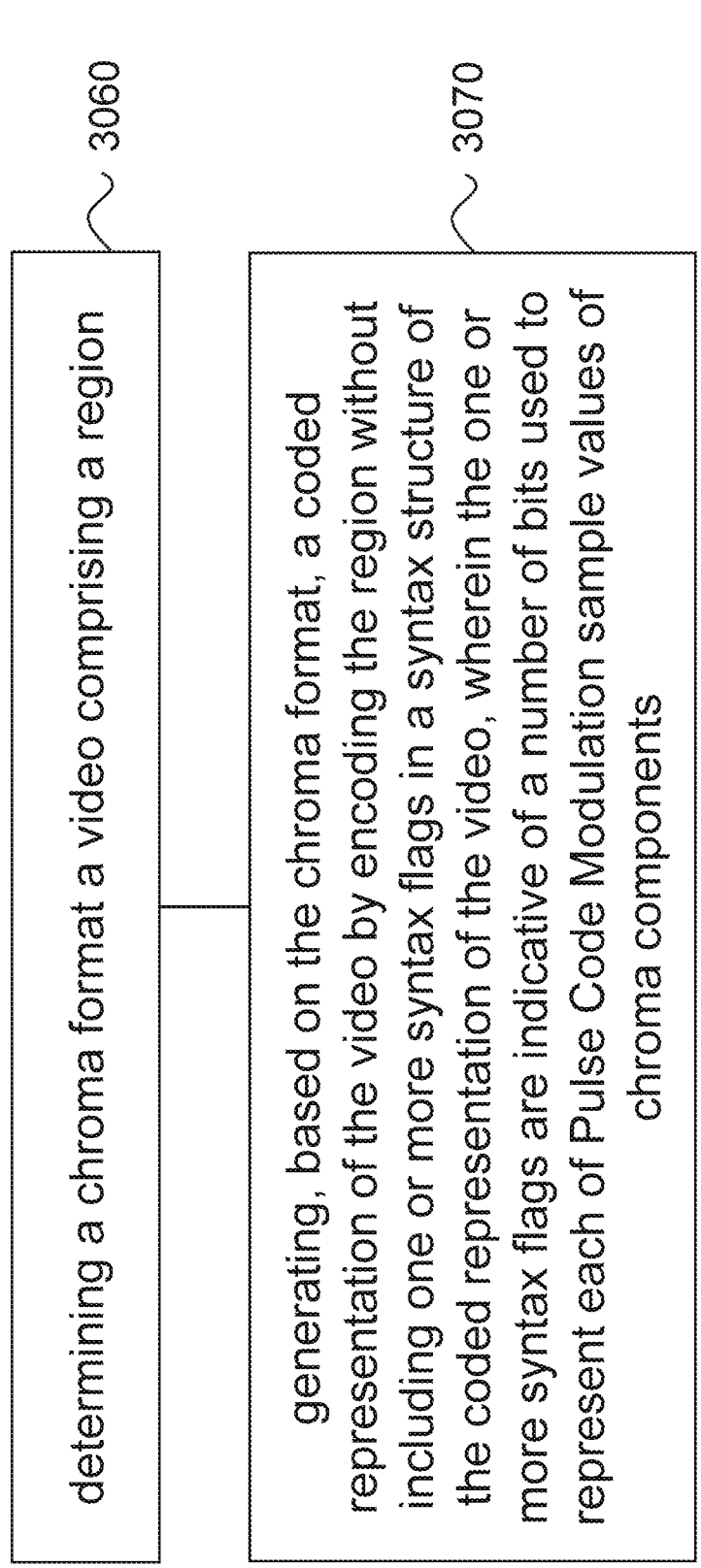
FIG. 30B is a flowchart representation of another method for video encoding in accordance with the present technology.

FIG. 30B is a flowchart representation of a method 3050 for video encoding in accordance with the present technology. The method 3050 includes, at operation 3060, determining a chroma format a video comprising a region. The method 3050 also includes, at operation 3070, generating, based on the chroma format, a coded representation of the video by encoding the region without including one or more syntax flags in a syntax structure of the coded representation of the video, wherein the one or more syntax flags are indicative of a number of bits used to represent each of Pulse Code Modulation sample values of chroma components.

FIG. 31A is a flowchart representation of a method 3100 for video encoding in accordance with the present technology. The method 3100 includes, at operation 3110, determining, based on a chroma format of a video comprising a region, whether one or more syntax flags applicable to the region of the video are included in a syntax structure of a coded representation of the video. The one or more syntax flags are related to an adaptive loop filter (ALF) temporal prediction step for chroma components. The method 3100 also includes, at operation 3120, generating one or more decoded video blocks of the video region by parsing the coded representation according to the determining.

Figure 31B:
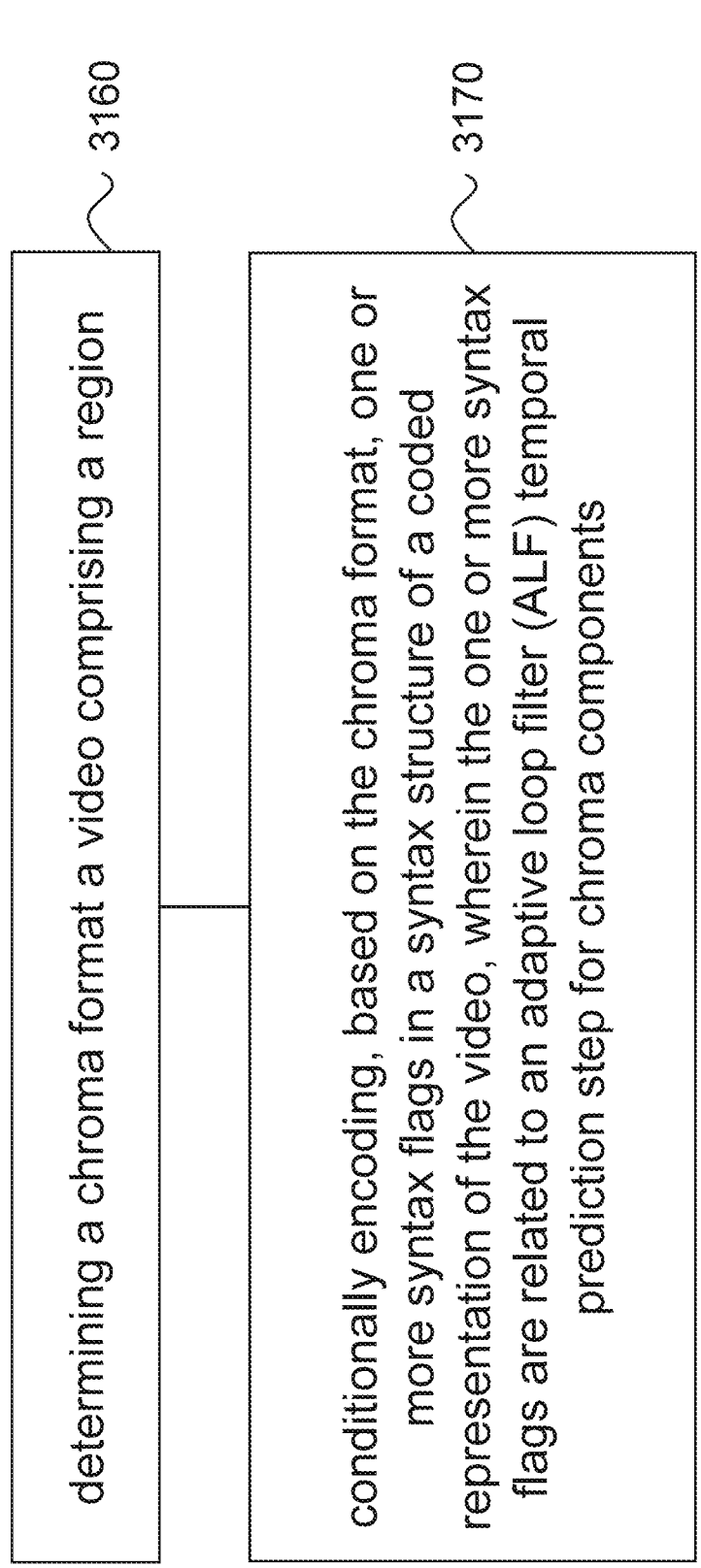
FIG. 31B is a flowchart representation of another method for video encoding in accordance with the present technology.

FIG. 31B is a flowchart representation of a method 3150 for video encoding in accordance with the present technology. The method 3150 includes, at operation 3160, determining a chroma format a video comprising a region. The method 3150 also includes, at operation 3170, conditionally encoding, based on the chroma format, one or more syntax flags in a syntax structure of a coded representation of the video, wherein the one or more syntax flags are related to an adaptive loop filter (ALF) temporal prediction step for chroma components.

In some embodiments, generating the one or more decoded video blocks is based on the determining of the chroma format. In some embodiments, the method includes discarding, in case the one or more syntax flags are present in the coded representation, the one or more syntax flags for generating the one or more decoded video blocks.

In some embodiments, determining the chroma format comprises determining whether the color components of the chroma format are coded separately. In some embodiments, the region comprises a slice. In some embodiments, the one or more syntax flags are absent in the coded representation in case (1) the chroma format is not 4:0:0, or (2) the color components of the chroma format are coded separately. In some embodiments, the one or more syntax flags are present in the coded representation in case (1) the chroma format is not 4:0:0, or (2) the color components of the chroma format are coded not separately. In some embodiments, the chroma format is indicated by a variable ChromaArrayType in the bitstream representation. In some embodiments, the one or more syntax flags are absent in the coded representation in case the variable ChromaArrayType is equal to a predetermined value. In some embodiments, the one or more syntax flags are present in the coded representation in case the variable ChromaArrayType is not equal to a predetermined value. In some embodiments, the predetermined value is 0.

In some embodiments, the one or more syntax flags comprise at least one of (1) a filter index, (2) an adaptive loop filter (ALF) adaptation parameter set (APS) index, or (3) a control flag. In some embodiments, the level corresponding to the region comprises a sequence level. In some embodiments, the determining of the chroma format comprises a single step of determining a variable ChromaArrayType. In some embodiments, the one or more syntax flags are ordered in the coded representation in case the variable ChromaArrayType is unequal to a predefined value. In some embodiments, the predefined value is 0. In some embodiments, the one or more syntax flags comprise at least one of (1) qtbtt_dual_tree_intra_flag, (2) sps_cclm_enabled_flag, or (3) pcm_sample_bit_depth_chroma_minus1.

In some embodiments, the one or more decoded video blocks is generated without applying an adaptive loop filter, a secondary transform, a chroma residue scaling step, or a quantization scaling matrix to a block of the video in case (1) the variable ChromaArrayType is equal to a predetermined value, (2) the chroma format is 4:0:0, or (3) the color components of the chroma format are coded separately. The secondary transform is applicable between a forward primary transform and a quantization step or between a de-quantization step and an inverse primary transform.

In some embodiments, generating the one or more decoded video blocks comprises applying an adaptive loop filter, a secondary transform, a chroma residue scaling step, or a quantization scaling matrix to a block of the video in case (1) the variable ChromaArrayType is unequal to a predetermined value. The secondary transform is applicable between a forward primary transform and a quantization step or between a de-quantization step and an inverse primary transform.

In some embodiments, a joint chroma residual coding step is indicated as disabled in the coded representation in case the chroma format is 4:0:0 or the color components of the chroma format are coded separately. The joint chroma residual coding step comprises determining a joint residual that is an average of residuals associated with chroma components.

In some embodiments, a chroma adaptive loop filtering process is indicated as disabled in the coded representation in case the chroma format is 4:0:0 or the color components of the chroma format are coded separately. In some embodiments, \ chroma secondary transform is indicated as disabled in the coded representation in case the chroma format is 4:0:0 or the color components of the chroma format are coded separately. The chroma secondary transform is applicable between a forward primary transform and a quantization step or between a de-quantization step and an inverse primary transform.

In some embodiments, an index of a chroma secondary transform matrix is set to a predetermined value in the coded representation in case the chroma format is 4:0:0 or the color components of the chroma format are coded separately. A chroma secondary transform is applicable between a forward primary transform and a quantization step or between a de-quantization step and an inverse primary transform.

In some embodiments, a chroma quantization parameter offset used in a joint chroma residual coding step is set to a predetermined value in the coded representation in case the chroma format is 4:0:0 or the color components of the chroma format are coded separately. The joint chroma residual coding step comprises determining a joint residual that is an average of residuals associated with chroma components. In some embodiments, usage of a luma dependent chroma residual scaling coding step is set to a predetermined value in the coded representation in case the chroma format is 4:0:0 or the color components of the chroma format are coded separately. In some embodiments, a chroma quantization parameter offset at a picture level is set to a predetermined value in the coded representation in case the chroma format is 4:0:0 or the color components of the chroma format are coded separately. In some embodiments, the predetermined value is 0.

Figure 32:
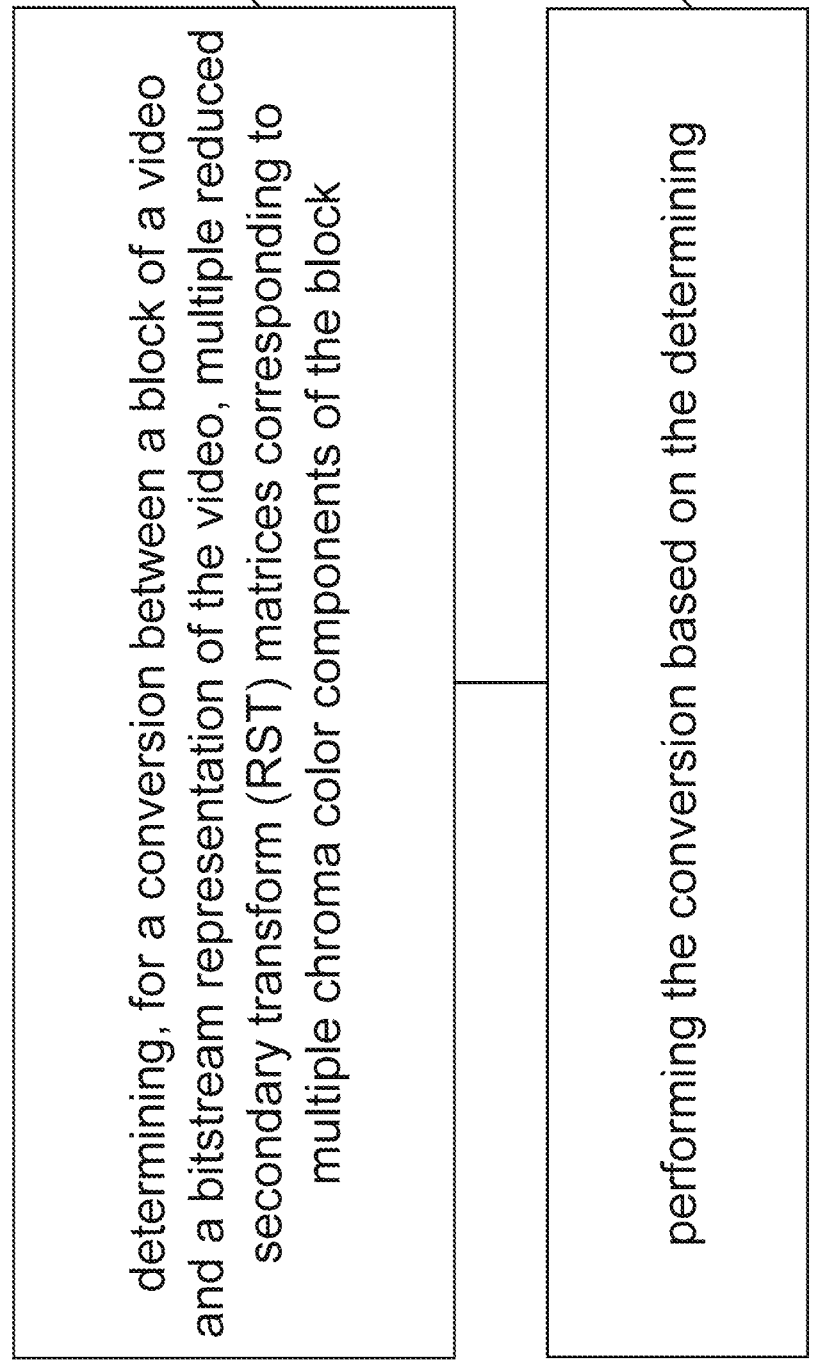
FIG. 32 is a flowchart representation of a method for video processing in accordance with the present technology.

FIG. 32 is a flowchart representation of a method 3200 for video processing in accordance with the present technology. The method 3200 includes, at operation 3210, determining, for a conversion between a block of a video and a bitstream representation of the video, multiple reduced secondary transform (RST) matrices corresponding to multiple chroma color components of the block. A secondary transform is applicable between a forward primary transform and a quantization step or between a de-quantization step and an inverse primary transform. The method 3200 also includes, at operation 3220, performing the conversion based on the determining.

In some embodiments, each of the multiple RST matrices is signaled for a corresponding chroma color component in the bitstream representation. In some embodiments, signaling of a second RST matrix for a second chroma color component is based on signaling of a first RST matrix for a first chroma color component.

In some embodiments, the multiple RST matrices comprise a first RST matrix and a second RST matrix, the first RST matrix is signaled in the bitstream representation and the second RST matrix absent in the bitstream representation. In some embodiments, the second RST matrix is derived based on an RST matrix for a luma block. In some embodiments, the second RST matrix is derived based on the first RST matrix, the first RST matrix and the second RST matrix being different. In some embodiments, the second RST matrix is derived based on a chroma intra mode coding step.

In some embodiments, a subset of the multiple RST matrices is signaled in the bitstream representation. In some embodiments, a number of the subset of the multiple RST matrices is determined based on a color subsampling format of the block. In some embodiments, a number of the subset of the multiple RST matrices is determined based on whether a dual tree coding step is enabled for the block. In some embodiments, a number of the subset of the multiple RST matrices is determined based on whether a joint chroma residual coding step is used. In some embodiments, a single RST matrix is signaled in the bitstream representation in case the joint chroma residual coding step is used.

FIG. 33 is a flowchart representation of a method 3300 for video processing in accordance with the present technology. The method 3300 includes, at operation 3310, determining, for a conversion between a block of a video and a bitstream representation of the video, that one or more matrix indices for a secondary transform are absent from the bitstream representation in case a joint chroma residual coding step is applied to the block. The secondary transform is applicable to the block between a forward primary transform and a quantization step or between a de-quantization step and an inverse primary transform. The joint chroma residual coding step comprises determining a joint residual that is an average of residuals associated with chroma components. The method 3300 also includes, at operation 3320, performing the conversion based on the determining.

In some embodiments, the secondary transform is disabled for chroma components of the block. In some embodiments, the secondary transform is applied using one or more predefined matrix indices. In some embodiments, a same predefined matrix index is used for chroma components of the block. In some embodiments, different predefined matrix indices are applied for different chroma components of the block. In some embodiments, a predefined matrix index is used for a first chroma component of the block, and wherein the secondary transform is disabled for a second chroma component of the block.

FIG. 34 is a flowchart representation of a method 3400 for video processing in accordance with the present technology. The method 3400 includes, at operation 3410, determining, for a conversion between a block of a video and a bitstream representation of the video, that a syntax flag indicating usage of a joint chroma residual coding step is absent from the bitstream representation in case a secondary transform is applied to the block between a forward primary transform and a quantization step or between a de-quantization step and an inverse primary transform. The joint chroma residual coding step comprises determining a joint residual that is an average of residuals associated with chroma components. The method 3400 also includes, at operation 3420, performing the conversion based on the determining. In some embodiments, the joint chroma residual coding step is disabled for the block.

FIG. 35 is a flowchart representation of a method 3500 for video processing in accordance with the present technology. The method 3500 includes, at operation 3510, determining, for a conversion between a block of a video and a bitstream representation of the video, that a syntax flag indicating usage of a cross-component linear model coding step is absent from the bitstream representation in case a joint chroma residual coding step is applied to the block. The joint chroma residual coding step comprises determining a joint residual that is an average of residuals associated with chroma components. The method 3500 also includes, at operation 3520, performing the conversion based on the determining. In some embodiments, the cross-component linear model coding step is disabled for chroma components of the block.

FIG. 36 is a flowchart representation of a method 3600 for video processing in accordance with the present technology. The method 3600 includes, at operation 3610, determining, for a conversion between a block of a video and a bitstream representation of the video, that a syntax flag indicating usage of a joint chroma residual coding step is absent from the bitstream representation in case a cross-component linear model is applied to the block. The joint chroma residual coding step comprises determining a joint residual that is an average of residuals associated with chroma components. The method 3600 also includes, at operation 3620, performing the conversion based on the determining. In some embodiments, the joint chroma residual coding step is disabled for the block.

FIG. 37 is a flowchart representation of a method 3700 for video processing in accordance with the present technology. The method 3700 includes, at operation 3710, determining, for a conversion between a block of a video and a bitstream representation of the video, a correlation between two chroma residuals used in a joint chroma residual coding step based on coefficients of a cross-component linear model coding step for the block. The joint chroma residual coding step comprises determining a joint residual that is an average of residuals associated with chroma components. The method 3700 includes, at operation 3720, performing the conversion based on the determining.

In some embodiments, a first chroma component is Cb, a second chroma component is Cr, a1, a2, b1 and b2 are coefficients of the cross-component linear model coding step, and Cb=a1*luma+b1 and Cr=a2*luma+b2. In some embodiments, the correlation between a first residual of the first chroma component resiCb and a second residual of the second chroma component resiCr is represented as resiCb=a2*(resiCr−b1)/a1)+b2. In some embodiments, the correlation between a first residual of a first chroma component resiCb and a second residual of a second chroma component resiCr is represented as resiCb=a2*(resiCr−b1)/a1). In some embodiments, the correlation between a first residual of a first chroma component resiCb and a second residual of a second chroma component resiCr is represented as resiCb=a2*resiCr/a1.

In some embodiments, the method includes determining one or more additional correlations between the two chroma residuals based on the coefficients of the cross-component linear model coding step. In some embodiments, the cross-component linear model coding step comprises a linear model (LM) mode, a LM-T mode, or a LM-L mode.

FIG. 38 is a flowchart representation of a method 3800 for video processing in accordance with the present technology. The method 3800 includes, at operation 3810, determining, for a conversion between a block of a video and a bitstream representation of the video, that a luma-dependent chroma residue scaling coding step is disabled in case a joint chroma residual coding step is applied to the block. The luma-dependent chroma residue scaling coding step comprising a multiplicative process that compensates a luma signal of the video with a chroma signal of the video. The method 3800 also includes, at operation 3820, performing the conversion based on the determining.

FIG. 39 is a flowchart representation of a method 3900 for video processing in accordance with the present technology. The method 3900 includes, at operation 3910, determining, for a conversion between a block of a video and a coded representation of the video, whether a syntax flag associated with the block indicative of a presence of at least one non-zero coefficient is included in a syntax structure in the coded representation based on a rule related to a coding characteristic of the video. The method 3900 also includes, at operation 3920, performing the conversion according to the determining.

In some embodiments, the coding characteristic comprises a color format of the video. In some embodiments, the coding characteristic comprises use of a component coding technique for representing the video in the coded representation. In some embodiments, the component coding technique comprises coding color components of the video separately.

In some embodiments, the syntax structure is for a coding unit. In some embodiments, the rule specifies that the syntax flag is omitted in the syntax structure in case the color format is 4:0:0 or the color components of the video are coded separately. In some embodiments, the color format is indicated by a variable ChromaArrayType in the coded representation, and wherein the rule specifies that the syntax flag is omitted in case ChromaArrayType is equal to a predefined value. In some embodiments, the coding unit is considered to be coded with at least one non-zero coefficient in case the syntax flag is omitted in the syntax structure.

In some embodiments, the block is divided into one or more transform units, and wherein the syntax structure is for a transform unit of the block. In some embodiments, the block belongs to a luma component of the video. In some embodiments, the rule specifies that the syntax flag is omitted in the syntax structure in case the color format is 4:0:0 or the color components of the block are coded separately. In some embodiments, the rule specifies that the syntax flag is omitted in the syntax structure in case the color format is 4:0:0 and the block is coded using an inter mode coding tool without using a skip mode coding. In some embodiments, the rule specifies that the syntax flag is omitted in the coded representation in case the color components of the block are coded separately and the block is coded using an inter mode coding tool without using a skip mode coding. In some embodiments, the color format is indicated by a variable ChromaArrayType in the coded representation, and wherein the rule specifies that the syntax flag is absent in case ChromaArrayType is equal to a predefined value and the block is coded using an inter mode coding tool without using a skip mode coding.

In some embodiments, the block belongs to a chroma component of the video. In some embodiments, the rule specifies that the syntax flag is absent in the syntax structure in case the color format is 4:0:0 or the color components of the block are coded separately. In some embodiments, the color format is indicated by a variable ChromaArrayType in the coded representation, and the rule specifies that the syntax flag is absent in the syntax structure in case ChromaArrayType is equal to a predefined value. In some embodiments, predefined value is 0.

In some embodiments, the rule specifies that whether the syntax flag is present in the syntax structure is based on one or more syntax flags for other blocks that belong to other components of the video. In some embodiments, the block belongs to a Cr component of the video, and the one or more syntax flags are for the other blocks that belong to a Cb component and/or a luma component of the video. In some embodiments, the syntax flag is omitted in the syntax structure and the block is considered to be coded with at least one non-zero coefficient in case the one or more syntax flags indicate that the other blocks are not coded with at least one non-zero coefficient. In some embodiments, the block belongs to a Cb component of the video, and wherein the one or more syntax flags are for the other blocks that belong to a Cr component and/or a luma component of the video. In some embodiments, the syntax flag is omitted in the syntax structure and the block is considered to be coded with at least one non-zero coefficient in case the one or more syntax flags indicate that the other blocks are not coded with at least one non-zero coefficient. In some embodiments, the block belongs to a luma component of the video, and the one or more syntax flags are for the other blocks that belong to a Cr component and/or a Cb component of the video. In some embodiments, the syntax flag is omiited in the syntax structure and the block is considered to be coded with at least one non-zero coefficient in case the one or more syntax flags indicate that the other blocks are not coded with at least one non-zero coefficient.

In some embodiments, a first order in which the block and the other blocks are processed is different than a second order in which the syntax flag and the one or more other syntax flags are arranged in the coded representation. In some embodiments, the rule is applicable in case the block includes only one transform unit, and the block is indicated to be coded with at least one non-zero coefficient by a second syntax flag in a coding unit syntax structure. In some embodiments, the rule is applicable in case the block has multiple transform units and only one of the multiple transform units has non-zero coefficients for a sub-block transform, and the block is indicated to be coded with at least one non-zero coefficient by a second syntax flag in a coding unit syntax structure.

In some embodiments, the rule specifies that whether the syntax flag is included in the syntax structure is based on usage of a sub-block transform for the block that includes the transform unit. In some embodiments, the block belongs to a luma component of the video, and the syntax flag is omitted in the syntax structure and the block is considered to be coded with at least one non-zero coefficient in case the sub-block transform is applied to a part of the block but not the transform unit. In some embodiments, the block belongs to a chroma component of the video, and the syntax flag is omitted in the syntax structure and the block is considered to be coded with at least one non-zero coefficient in case the sub-block transform is applied to a part of the block but not the transform unit. In some embodiments, the block belongs to a luma component of the video, and the syntax flag present in the syntax structure indicates that the block is coded with at least one non-zero coefficient in case the sub-block transform is enabled for the block. In some embodiments, the block belongs to one of a luma component, a Cr component, or a Cb component of the video, the syntax flag present in the syntax structure indicates that the block is coded with at least one non-zero coefficient in case the sub-block transform is enabled for the block.

In some embodiments, the block belongs to a luma component of the video, and wherein, in case a first syntax flag in the coding unit syntax structure indicates that the block is coded with at least one non-zero coefficient, a second syntax flag in the transform unit syntax structure indicates that the block is coded with at least one non-zero coefficient. In some embodiments, the block belongs to one of a luma component, a Cr component, or a Cb component of the video, and in case a first syntax flag in the coding unit syntax structure indicates that the block is coded with at least one non-zero coefficient, a second syntax flag in the transform unit syntax structure indicates the block is coded with at least one non-zero coefficient.

Figure 40:
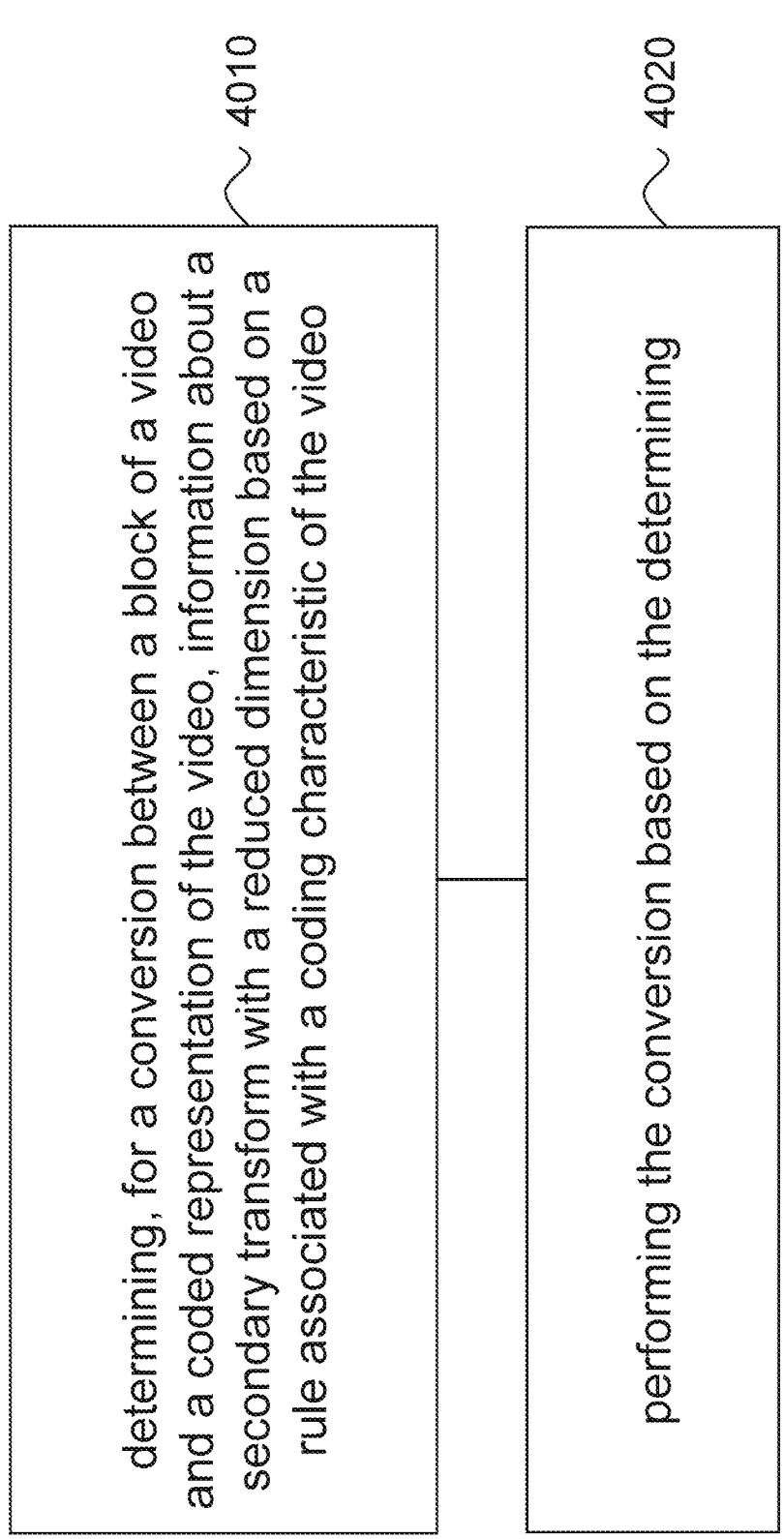
FIG. 40 is a flowchart representation of another method for video processing in accordance with the present technology.

FIG. 40 is a flowchart representation of a method 4000 for video processing in accordance with the present technology. The method 4000 includes, at operation 4010, determining, for a conversion between a block of a video and a coded representation of the video, information about a secondary transform with a reduced dimension based on a rule associated with a coding characteristic of the video. The secondary transform is applicable between a forward primary transform and a quantization step or between a de-quantization step and an inverse primary transform, and the reduced dimension is reduced based on a dimension of the block. The method 4000 also includes, at operation 4020, performing the conversion according to the determining.

In some embodiments, the information about the secondary transform comprises whether the secondary transform is enabled for the block. In some embodiments, the information about the secondary transform comprises a manner in which the secondary transform is applied to the block. In some embodiments, the information about the secondary transform specifies a secondary transform kernel applicable to the block.

In some embodiments, the coding characteristic comprises a color format of the video. In some embodiments, the coding characteristic comprises use of a component coding technique for representing the video in the coded representation. In some embodiments, the component coding technique comprises coding color components of the video separately.

In some embodiments, the block is coded using a single tree coding structure, and the threshold is based on whether the color format is 4:0:0 or the color components of the video are coded separately. In some embodiments, the threshold is 1 in case the color format is 4:0:0 or the color components are coded separately. In some embodiments, the threshold is 2 in case the color format is not 4:0:0 and the color components are coded together. In some embodiments, the color format is indicated by a variable ChromaArrayType in the coded representation. In some embodiments, the threshold is 1 in case ChromaArrayType is equal to a predefined value. In some embodiments, the threshold is 2 in case ChromaArrayType is not equal to a predefined value. In some embodiments, the predefined value is 0.

In some embodiments, the rule specifies that whether the information about the secondary transform is included in the coded representation is based on the number of non-zero coefficients associated with only the block that belongs to a luma component of the video. In some embodiments, the information about the secondary transform is included in the coded representation in case the number of non-zero coefficients associated with the block is greater than a threshold. In some embodiments, the threshold is 1. In some embodiments, the information about the secondary transform is omitted in the coded representation in case the number of non-zero coefficients associated with the block is 0, and the secondary transform is considered to be disabled for the block.

In some embodiments, the rule specifies that the information about the secondary transform is omitted in the coded representation in case a syntax flag for the block indicates that the block is not coded with at least one non-zero coefficient. The block belongs to a Cr component, a Cb component, or a luma component of the video, and the secondary transform is considered to be disabled for the block. In some embodiments, the rule is applicable in case the block is coded using a single tree coding structure. In some embodiments, the color format of the video is not 4:0:0. In some embodiments, the color components of the video are coded separately. In some embodiments, the rule specifies that whether the information about the secondary transform is included in the coded representation is based on syntax flags for the block. The block belongs to a chroma component of the video. In some embodiments, the block belongs to a chroma component of the video, and in case one syntax flag in a transform unit syntax indicates that the block is not coded with at least one non-zero coefficient, the information about the secondary transform is omitted in the coded representation. In some embodiments, the coding characteristic comprises a color format of the video, use of a component coding technique for representing the video in the coded representation, or a syntax flag in a transform unit syntax structure indicating whether the block is coded with at least one non-zero coefficient. In some embodiments, the component coding technique comprises coding color components of the video separately.

In some embodiments, the block belongs to a Cr component, a Cb component, or a luma component of the video, and the rule specifies that the information about the secondary transform is omitted in the coded representation in case the syntax flag indicates that the block is not coded with at least one non-zero coefficient and other syntax flags in the transform unit syntax structure indicate that other blocks that belong to other components of the video are not coded with at least one non-zero coefficient. In some embodiments, the block belongs to a luma component of the video, and the rule specifies that the information about the secondary transform is omitted in the coded representation in case the syntax flag indicates that the block is not coded with at least one non-zero coefficient. In some embodiments, the block belongs to a Cr component or a Cb component, and the rule specifies that the information about the secondary transform is omitted in the coded representation in case the syntax flag indicates that the block is not coded with at least one non-zero coefficient and a second syntax flag in the transform unit syntax structure indicate that a second block that belongs to another chroma component of the video is not coded with at least one non-zero coefficient. In some embodiments, the rule is applicable in case the color format is 4:0:0 or the color components are coded separately. In some embodiments, the block includes samples associated with multiple color components.

FIG. 41 is a flowchart representation of a method 4100 for video processing in accordance with the present technology. The method 4100 includes, at operation 4110, determining, for a conversion between a video and a coded representation of the video, whether a syntax element associated with an adaptive loop filtering (ALF) operation for a chroma component of the video is included in the coded representation based on a condition. The method 4100 includes, at operation 4120, performing the conversion according to the determining.

In some embodiments, the syntax element comprises a flag indicating whether at least a coefficient for the adaptive loop filtering operation is included in the coded representation. In some embodiments, the syntax element is signaled in an adaptation parameter set (APS) corresponding to the ALF operation. In some embodiments, the coded representation includes multiple syntax elements related to filter coefficients for the adaptive loop filtering operation.

In some embodiments, the syntax element comprises an index for an adaptation parameter set, the adaptation parameter set comprising information for one or more adaptive loop filters. In some embodiments, the syntax element is signaled in a slice header.

In some embodiments, the syntax element comprises an indication of whether the ALF operation is enabled for any chroma component. In some embodiments, the syntax element is signaled in a slice header.

In some embodiments, whether a color format of the video is present is indicated by a variable ChromaArrayType in the coded representation, and the condition comprises whether ChromaArrayType is unequal to a predefined value. In some embodiments, the predefined value is 0. In some embodiments, the syntax element comprises at least alf_chroma_filter_signal flag, slice_alf_chroma_idc, or slice_alf_aps_id_chroma.

In some embodiments, the syntax element comprises at least a clipping flag, a clipping parameter, or a filter coefficient. In some embodiments, the syntax element is omitted in the coded representation in case the condition is satisfied. In some embodiments, the condition specifying that a chroma component is not present, a color format of the video is 4:0:0, or color components of the video are coded separately. In some embodiments, in case the condition is satisfied, the syntax element is signaled in the coded representation with a coded value and an actual value of the syntax element is set to a default value regardless of the coded value. In some embodiments, the syntax element comprises alf_chroma_filter_signal_flag and the default value is 0.

In some embodiments, temporal prediction of the adaptive loop filtering operation is disabled based on the condition. In some embodiments, the syntax element indicates a temporal prediction of the adaptive loop filtering operation, and the syntax element is omitted in the coded representation in case the condition is satisfied. The condition specifies that a color format of the video is 4:0:0 or color components of the video are coded separately.

FIG. 42 is a flowchart representation of a method 4200 for video processing in accordance with the present technology. The method 4200 includes, at operation 4210, determining, for a conversion between a video and a coded representation of the video, whether a syntax element associated with a coding technique for a chroma component of the video is included in the coded representation based on a condition. The method 4200 includes, at operation 4220, performing the conversion according to the determining.

In some embodiments, the coding technique comprises at least a palette mode coding technique in which sample values of a video block are represented using a palette of representative pixel values or an intra block copy coding mode coding technique. In some embodiments, the syntax element comprises a flag or an index indicating whether the coding technique is enabled for the chroma component. In some embodiments, the syntax element comprises pred_mode_ibc_flag.

In some embodiments, a color format of the video is indicated by a variable ChromaArrayType in the coded representation, and wherein the condition comprises whether ChromaArrayType is unequal to a predefined value. In some embodiments, the predefined value is 0. In some embodiments, the syntax element associated with the palette mode coding technique is omitted in the coded representation in case the condition is satisfied. The condition specifies that a color format of the video is 4:0:0 or color components of the video are coded separately.

In some embodiments, in case the condition is satisfied, the syntax element is signaled in the coded representation with a coded value and an actual value of the syntax element is set to a default value regardless of the coded value. In some embodiments, the syntax element comprises a flag indicating usage of the palette mode coding technique, and the default value is 0 indicating that the palette mode coding technique is disabled.

FIG. 43 is a flowchart representation of a method 4300 for video processing in accordance with the present technology. The method 4300 includes, at operation 4310, determining, for a conversion between a video and a coded representation of the video, whether a syntax element indicating a characteristic for a chroma component of the video is included in the coded representation based on a condition associated with a color format of the video. The method 4300 includes, at operation 4320, performing the conversion according to the determining.

In some embodiments, the characteristic comprises a sample bit depth of a chroma array of the video. In some embodiments, the characteristic comprises a chroma quantization parameter range offset. In some embodiments, the syntax element comprises bit_depth_chroma_minus8. In some embodiments, the syntax element comprises pps_joint_cbcr_qp_offset.

In some embodiments, the syntax element is omitted in the coded representation in case the condition specifying the color format of the video is 4:0:0 or color components of the video are coded separately is satisfied. In some embodiments, the color format of the video is indicated by a variable ChromaArrayType in the coded representation, and the syntax element is omitted in the coded representation in case the condition specifying ChromaArrayType is equal to a predefined value is satisfied. In some embodiments, the syntax element is included in the coded representation in case the condition specifying the color format of the video is not 4:0:0 or color components of the video are not coded separately is satisfied. In some embodiments, the color format of the video is indicated by a variable ChromaArrayType in the coded representation, and the syntax element is included in the coded representation in case the condition specifying ChromaArrayType is not equal to a predefined value is satisfied. In some embodiments, the predefined value is 0.

In some embodiments, the syntax element is included in the coded representation in case the condition is satisfied, the condition specifying that the color format of the video is 4:0:0, color components of the video are coded separately is satisfied, or a variable ChromaArrayType indicating the color format of the video is equal to a predefined value. The syntax element is ignored during the conversion. In some embodiments, at least one other syntax element associated with whether the condition is satisfied is processed prior to processing or ignoring the syntax element.

In some embodiments, performing the conversion includes generating the bitstream representation based on the block of the video. In some embodiments, performing the conversion includes generating the block of the video from the bitstream representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
determining, for a conversion between a video region of a video and a bitstream of the video, whether at least one syntax element associated with an adaptive loop filtering operation for a chroma component of the video region is included in the bitstream based on a chroma format of the video; and
performing the conversion according to the determining,
wherein a first temporal identifier of a first network abstraction layer unit of an adaptation parameter set corresponding to the adaptive loop filtering operation for the chroma component of the video region is less than or equal to a second temporal identifier of a second network abstraction layer unit of the video region,
wherein the at least one syntax element comprises multiple syntax elements related to filter coefficients for the adaptive loop filtering operation for the chroma component of the video region,
wherein the multiple syntax elements are included in the adaptation parameter set corresponding to the adaptive loop filtering operation, and
wherein the at least one syntax element further comprises a flag indicating whether at least one coefficient for the adaptive loop filtering operation for the chroma component of the video region is included in the bitstream and the flag is included in the adaptation parameter set corresponding to the adaptive loop filtering operation for the chroma component of the video region.

2. The method of claim 1, wherein in response to the flag being not present in the bitstream, a value of the flag is inferred to be equal to a default value indicating that none of the at least one coefficient for the adaptive loop filtering operation for the chroma component of the video region is included in the bitstream.

3. The method of claim 1, wherein the at least one syntax element further comprises an index for the adaptation parameter set, and wherein the index is included in a slice header or a picture header and the adaptation parameter set comprising information for one or more adaptive loop filters.

4. The method of claim 3, wherein an adaptation parameter set identifier included in the adaptation parameter set is same as the index for the adaptation parameter set that the chroma component of the video region refers to.

5. The method of claim 1, wherein the at least one syntax element further comprises a first indication of whether the adaptive loop filtering operation is enabled for any chroma component.

6. The method of claim 5, wherein the first indication is included in a slice header.

7. The method of claim 1, wherein the at least one syntax element further comprises a second indication related to filter temporal prediction for the adaptive loop filtering operation of the chroma component.

8. The method of claim 1, wherein the at least one syntax element is included in the bitstream in case of that the chroma format is unequal to a specific value.

9. The method of claim 8, wherein the specific value is 4:0:0.

10. The method of claim 1, wherein the conversion includes encoding the video region into the bitstream.

11. The method of claim 1, wherein the conversion includes decoding the video region from the bitstream.

12. An apparatus for processing video data comprising a processor and a non-transitory memory with instructions thereon, wherein the instructions upon execution by the processor, cause the processor to:
determine, for a conversion between a video region of a video and a bitstream of the video, whether at least one syntax element associated with an adaptive loop filtering operation for a chroma component of the video region is included in the bitstream based on a chroma format of the video; and
perform the conversion according to the determining,
wherein a first temporal identifier of a first network abstraction layer unit of an adaptation parameter set corresponding to the adaptive loop filtering operation for the chroma component of the video region is less than or equal to a second temporal identifier of a second network abstraction layer unit of the video region,
wherein the at least one syntax element comprises multiple syntax elements related to filter coefficients for the adaptive loop filtering operation for the chroma component of the video region, wherein the multiple syntax elements are included in the adaptation parameter set corresponding to the adaptive loop filtering operation, and
wherein the at least one syntax element further comprises a flag indicating whether at least one coefficient for the adaptive loop filtering operation for the chroma component of the video region is included in the bitstream and the flag is included in the adaptation parameter set corresponding to the adaptive loop filtering operation for the chroma component of the video region.

13. The apparatus of claim 12, wherein the at least one syntax element is included in the bitstream in case of that the chroma format is unequal to 4:0:0,
wherein the at least one syntax element further comprises an index for the adaptation parameter set, wherein the index is included in a slice header or a picture header and the adaptation parameter set comprising information for one or more adaptive loop filters, and
wherein an adaptation parameter set identifier included in the adaptation parameter set is same as the index for the adaptation parameter set that the chroma component of the video region refers to.

14. The apparatus of claim 12,
wherein in response to the flag being not present in the bitstream, a value of the flag is inferred to be equal to a default value indicating that none of the at least one coefficient for the adaptive loop filtering operation for the chroma component of the video region is included in the bitstream.

15. A non-transitory computer-readable storage medium storing instructions that cause a processor to:
determine, for a conversion between a video region of a video and a bitstream of the video, whether at least one syntax element associated with an adaptive loop filtering operation for a chroma component of the video region is included in the bitstream based on a chroma format of the video; and
perform the conversion according to the determining,
wherein a first temporal identifier of a first network abstraction layer unit of an adaptation parameter set corresponding to the adaptive loop filtering operation for the chroma component of the video region is less than or equal to a second temporal identifier of a second network abstraction layer unit of the video region,
wherein the at least one syntax element comprises multiple syntax elements related to filter coefficients for the adaptive loop filtering operation for the chroma component of the video region, wherein the multiple syntax elements are included in the adaptation parameter set corresponding to the adaptive loop filtering operation, and
wherein the at least one syntax element further comprises a flag indicating whether at least one coefficient for the adaptive loop filtering operation for the chroma component of the video region is included in the bitstream and the flag is included in the adaptation parameter set corresponding to the adaptive loop filtering operation for the chroma component of the video region.

16. The non-transitory computer-readable storage medium of claim 15, wherein the at least one syntax element is included in the bitstream in case of that the chroma format is unequal to 4:0:0,
wherein the at least one syntax element further comprises an index for the adaptation parameter set, wherein the index is included in a slice header or a picture header and the adaptation parameter set comprising information for one or more adaptive loop filters, and
wherein an adaptation parameter set identifier included in the adaptation parameter set is same as the index for the adaptation parameter set that the chroma component of the video region refers to.

17. The non-transitory computer-readable storage medium of claim 15, wherein in response to the flag being not present in the bitstream, a value of the flag is inferred to be equal to a default value indicating that none of the at least one coefficient for the adaptive loop filtering operation for the chroma component of the video region is included in the bitstream.

18. A non-transitory computer-readable recording medium storing a bitstream of a video which is generated by a method performed by a video processing apparatus, wherein the method comprises:
determining, whether at least one syntax element associated with an adaptive loop filtering operation for a chroma component of a video region of the video is included in the bitstream based on a chroma format of the video;

generating the bitstream according to the determining, wherein a first temporal identifier of a first network abstraction layer unit of an adaptation parameter set corresponding to the adaptive loop filtering operation for the chroma component of the video region is less than or equal to a second temporal identifier of a second network abstraction layer unit of the video region, wherein the at least one syntax element comprises multiple syntax elements related to filter coefficients for the adaptive loop filtering operation for the chroma component of the video region, wherein the multiple syntax elements are included in the adaptation parameter set corresponding to the adaptive loop filtering operation, and wherein the at least one syntax element further comprises a flag indicating whether at least one coefficient for the adaptive loop filtering operation for the chroma component of the video region is included in the bitstream and the flag is included in the adaptation parameter set corresponding to the adaptive loop filtering operation for the chroma component of the video region.

19. The non-transitory computer-readable recording medium of claim 18, wherein the at least one syntax element is included in the bitstream in case of that the chroma format is unequal to 4:0:0, wherein the at least one syntax element comprises an index for the adaptation parameter set, wherein the index is included in a slice header or a picture header and the adaptation parameter set comprising information for one or more adaptive loop filters, and wherein an adaptation parameter set identifier included in the adaptation parameter set is same as the index for the adaptation parameter set that the chroma component of the video region refers to.

20. The non-transitory computer-readable recording medium of claim 18, wherein in response to the flag being not present in the bitstream, a value of the flag is inferred to be equal to a default value indicating that none of the at least one coefficient for the adaptive loop filtering operation.

* * * * *